United States Patent [19]

Lemoine et al.

[11] 4,315,331

[45] Feb. 9, 1982

[54] APPARATUS FOR PROVIDING DROP-OUT COMPENSATION IN RECORDING AND REPRODUCING SYSTEMS

[75] Inventors: Maurice G. Lemoine; Leonard A. Pasdera, both of Redwood City, Calif.

[73] Assignee: Ampex Corporation, Redwood City, Calif.

[21] Appl. No.: 117,422

[22] Filed: Feb. 1, 1980

[51] Int. Cl.³ .................. H04N 5/94; G06F 11/00
[52] U.S. Cl. .................. 371/31; 358/127; 360/38; 371/65
[58] Field of Search ............... 371/31, 51, 65; 360/33, 360/38, 53; 358/127, 8

[56] References Cited

U.S. PATENT DOCUMENTS

| | | | |
|---|---|---|---|
| 3,569,934 | 3/1971 | Parr, Jr. | 371/31 |
| 3,688,039 | 8/1972 | Ishiguro | 371/31 |
| 4,001,496 | 1/1977 | Clemens et al. | 360/38 |
| 4,146,099 | 3/1979 | Matsushima et al. | 371/31 |
| 4,183,058 | 1/1980 | Taylor | 358/127 |
| 4,206,440 | 6/1980 | Doi et al. | 360/38 |
| 4,216,504 | 8/1980 | Boussina et al. | 360/33 |
| 4,223,356 | 9/1980 | Renelt et al. | 371/31 |
| 4,232,340 | 11/1980 | Fuhrer | 360/38 |

FOREIGN PATENT DOCUMENTS

| | | | |
|---|---|---|---|
| 2846939 | 5/1979 | Fed. Rep. of Germany | 360/38 |
| 2020140 | 11/1979 | United Kingdom | 371/31 |

Primary Examiner—Charles E. Atkinson
Attorney, Agent, or Firm—Roger D. Greer; Robert G. Clay; Joel D. Talcott

[57] ABSTRACT

Apparatus is disclosed for providing compensation for missing, incorrect or otherwise defective data in a data stream preferably comprised of video information. The apparatus is particularly useful in a magnetic recording and reproducing system for digital video data signals. The apparatus effectively stores the digital video data that occurred 262 video lines prior to the current data at the input and continuously updates, (i.e., stores in place of) the stored data with current data unless defects occur in the current data, in which case the defective current data is not stored. The data from the store is inserted in the video data streams when the drop-outs or parity information associated with the data stream indicates that the current data is defective. By inserting digital data which represents data that occurred 262 horizontal lines previously, the content of the substituted video information has a high probability of being visually equivalent to that of the original current data, since in most cases, it represents data from an adjacent horizontal line in a prior television field. The apparatus inhibits writing of data during substantial portions of the horizontal and vertical blanking intervals and thereby reduces the capacity of the storing means which is required to provide compensation for essentially a full field of active video information.

12 Claims, 42 Drawing Figures

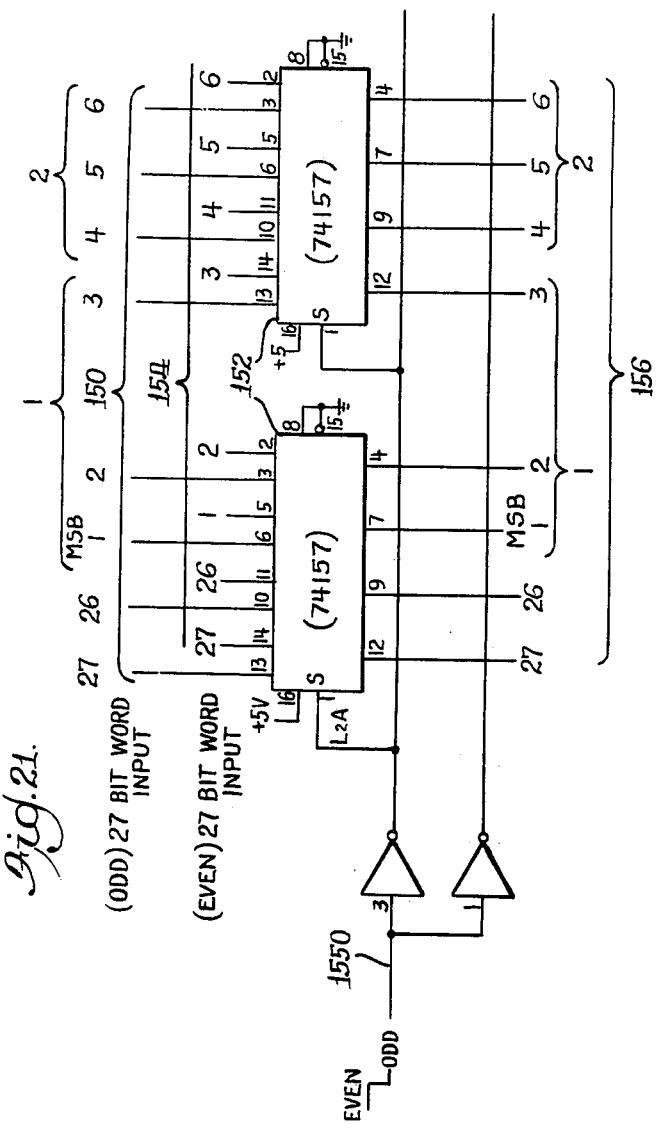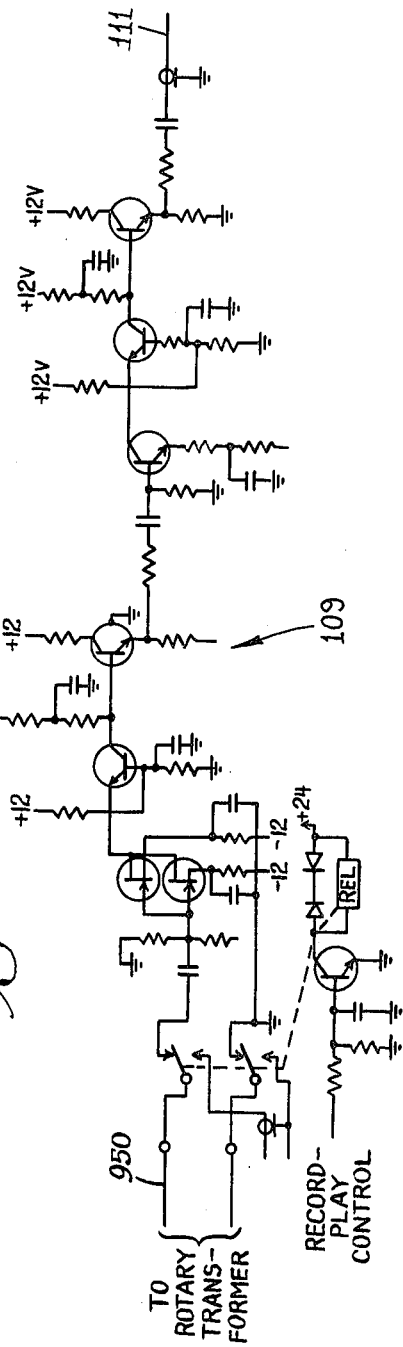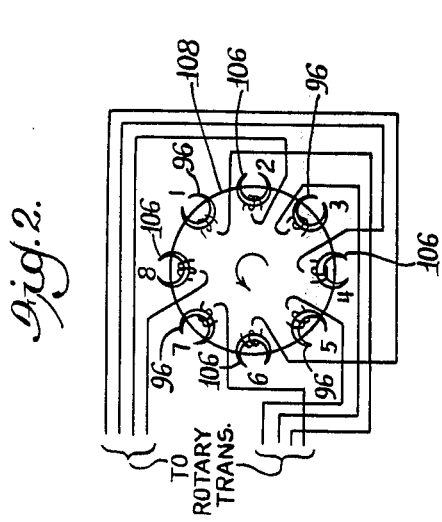

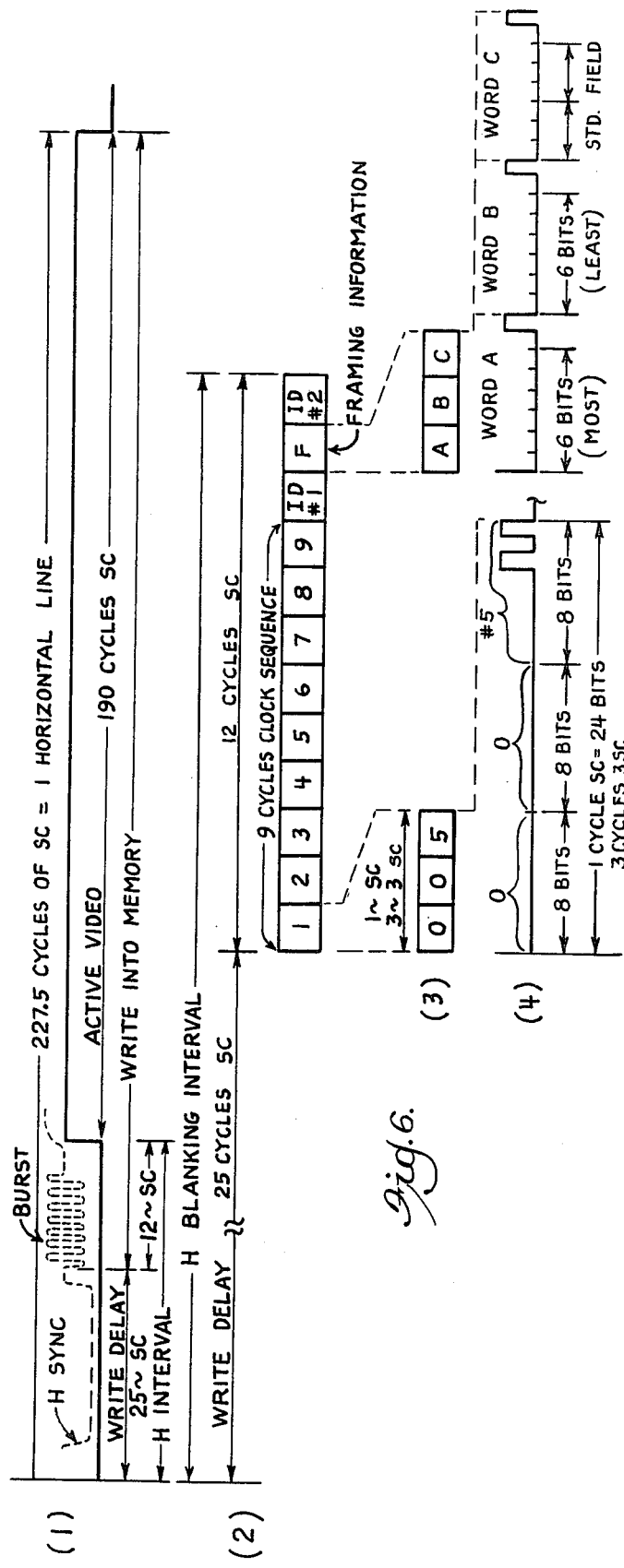
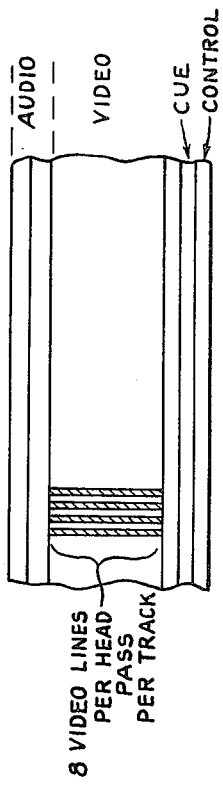
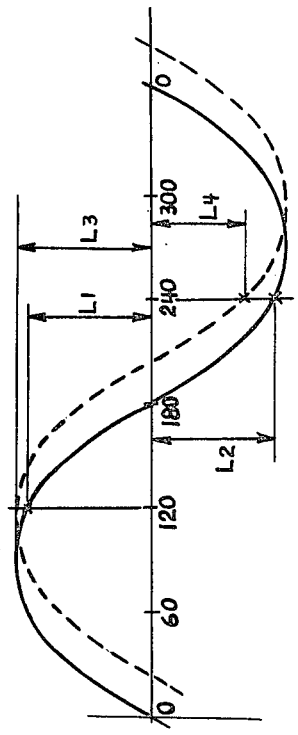

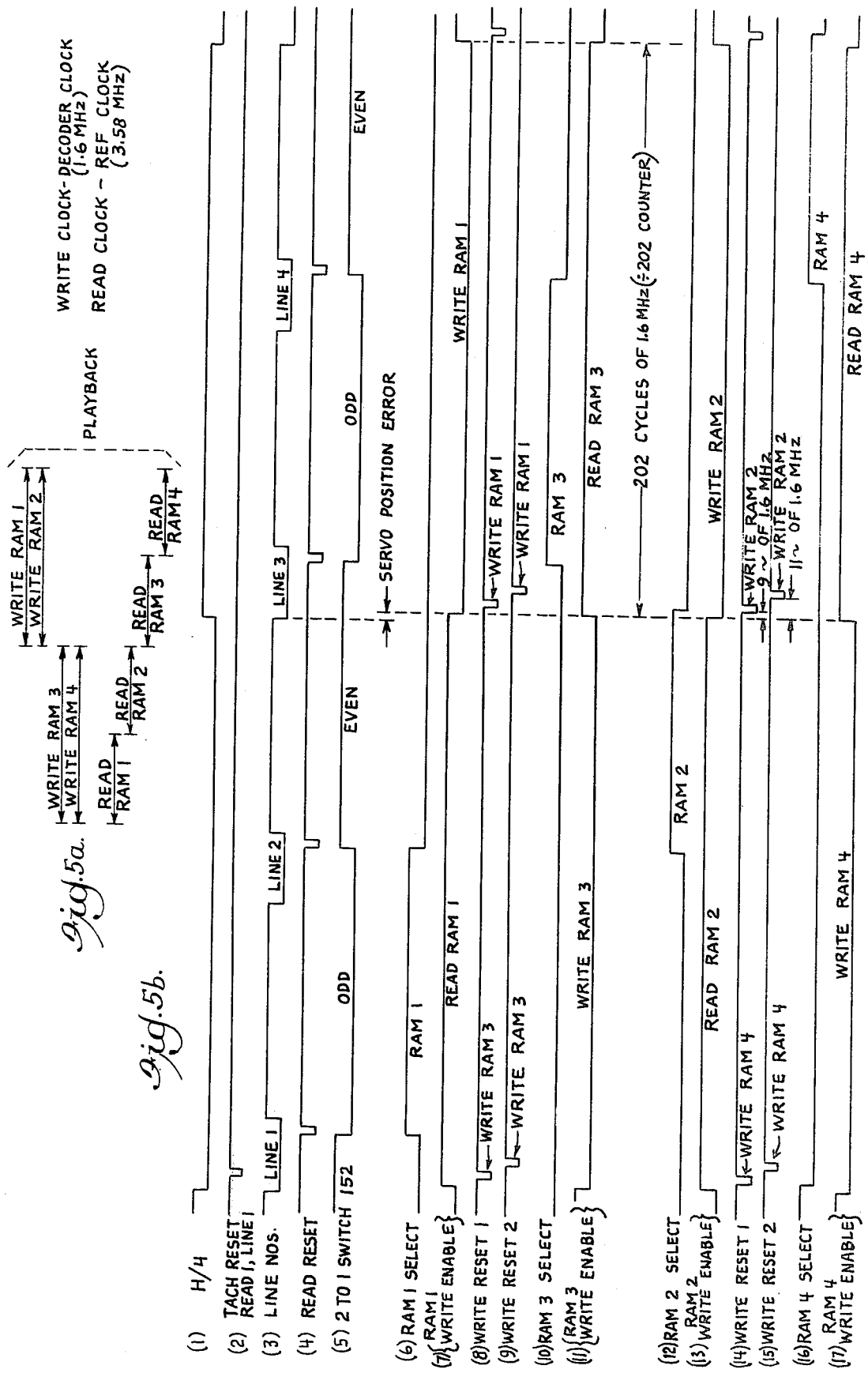

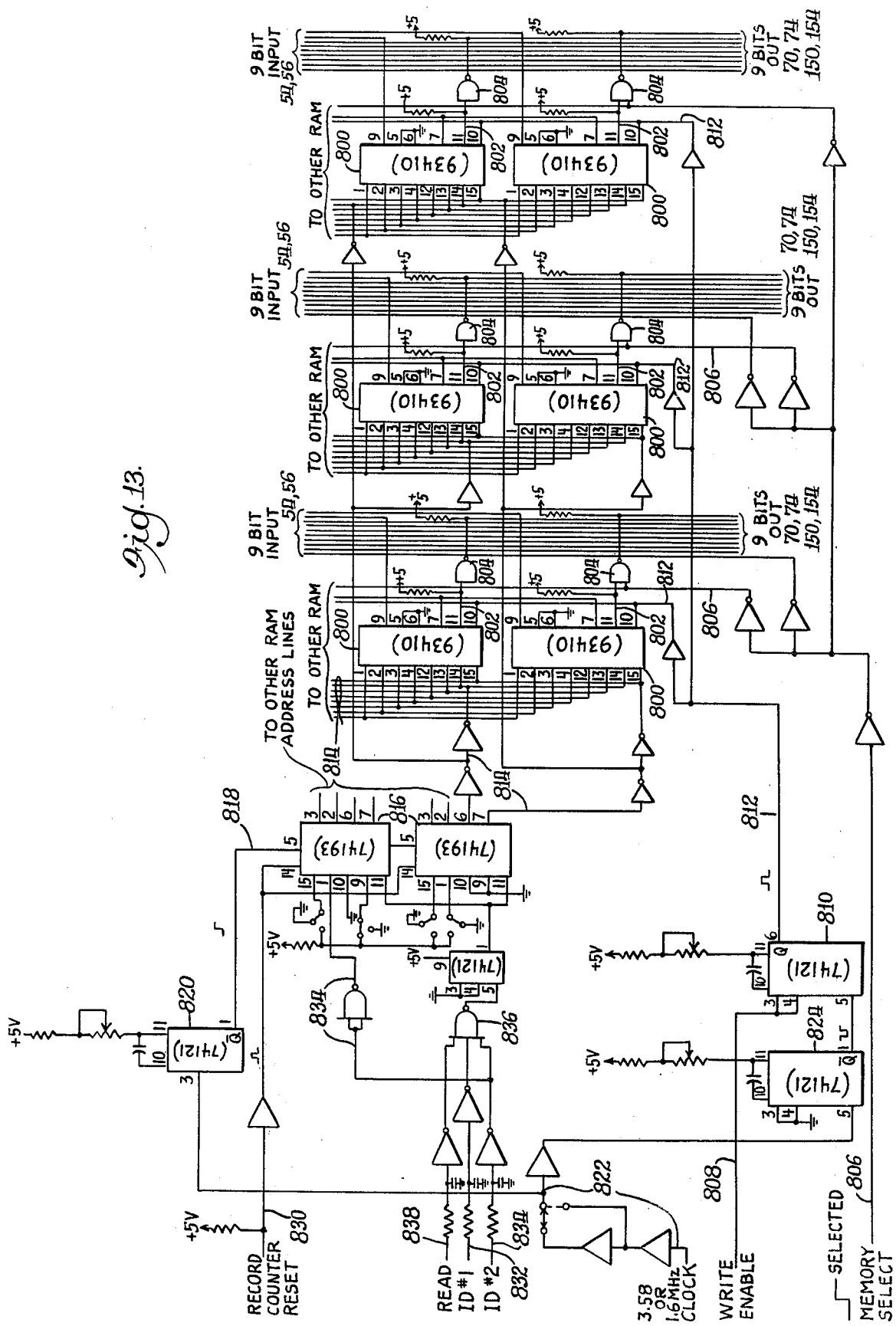

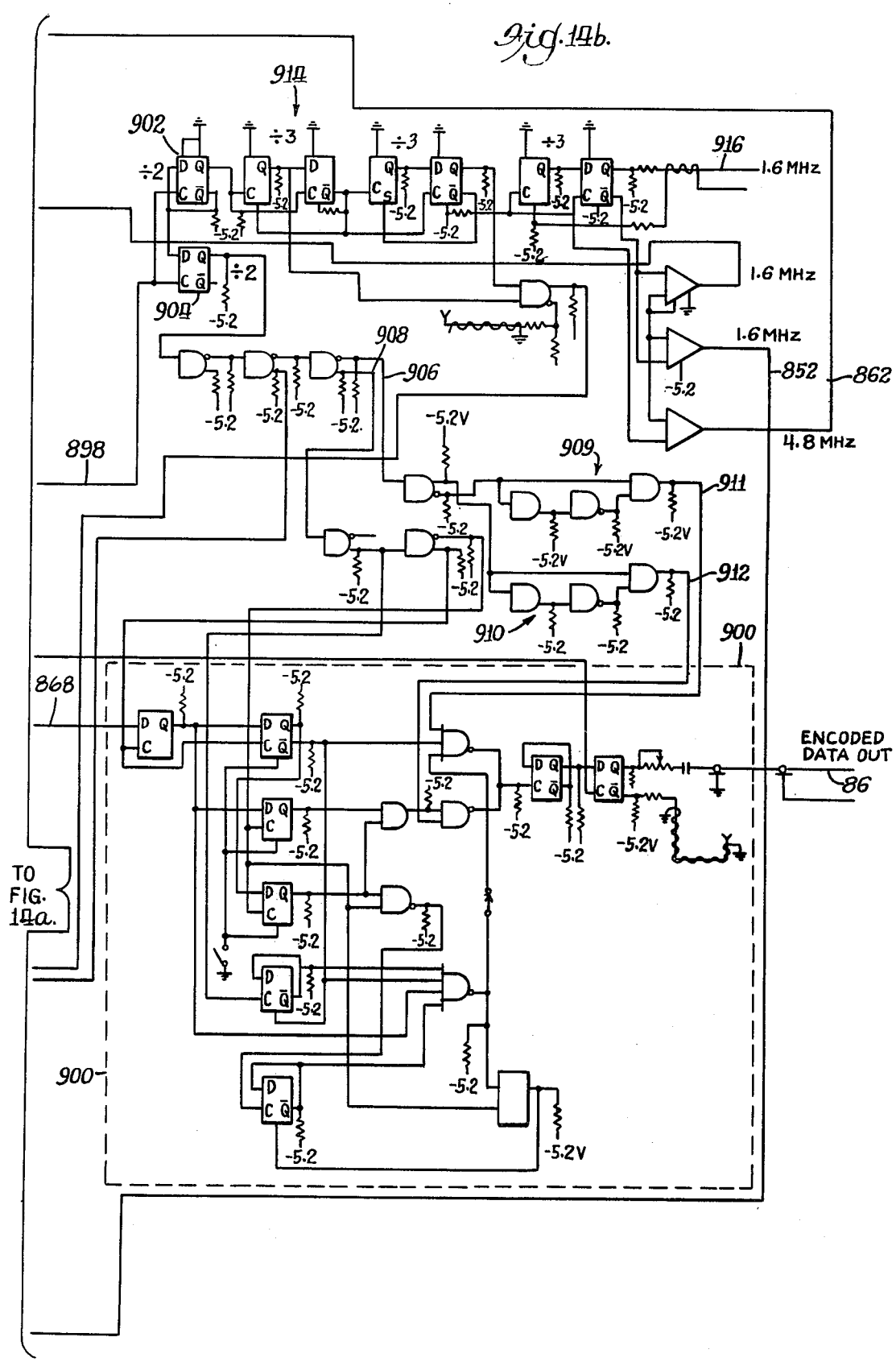

Fig. 16a.
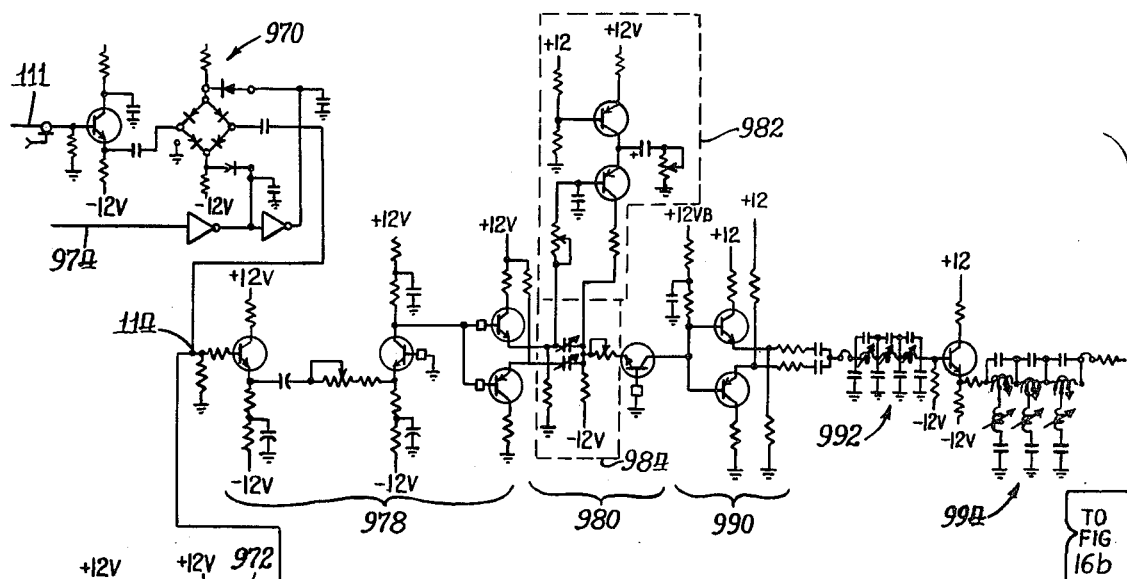
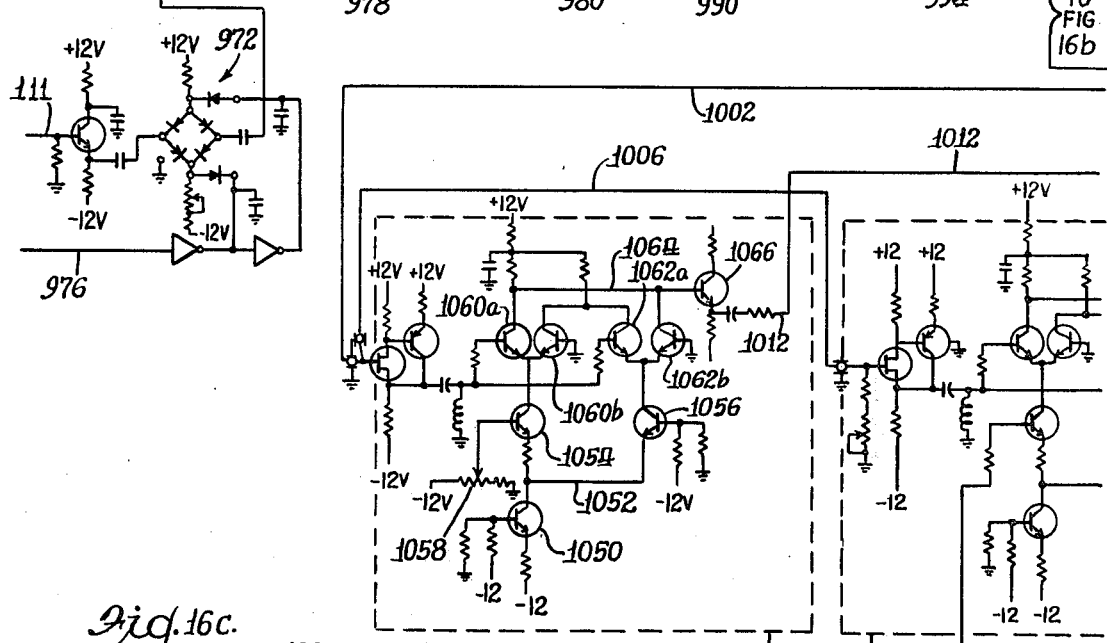
Fig. 16c.
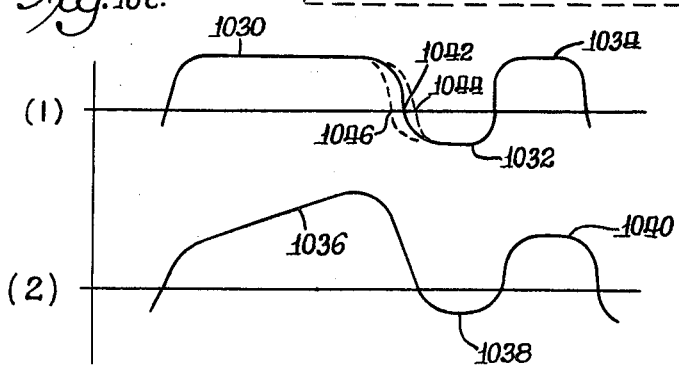

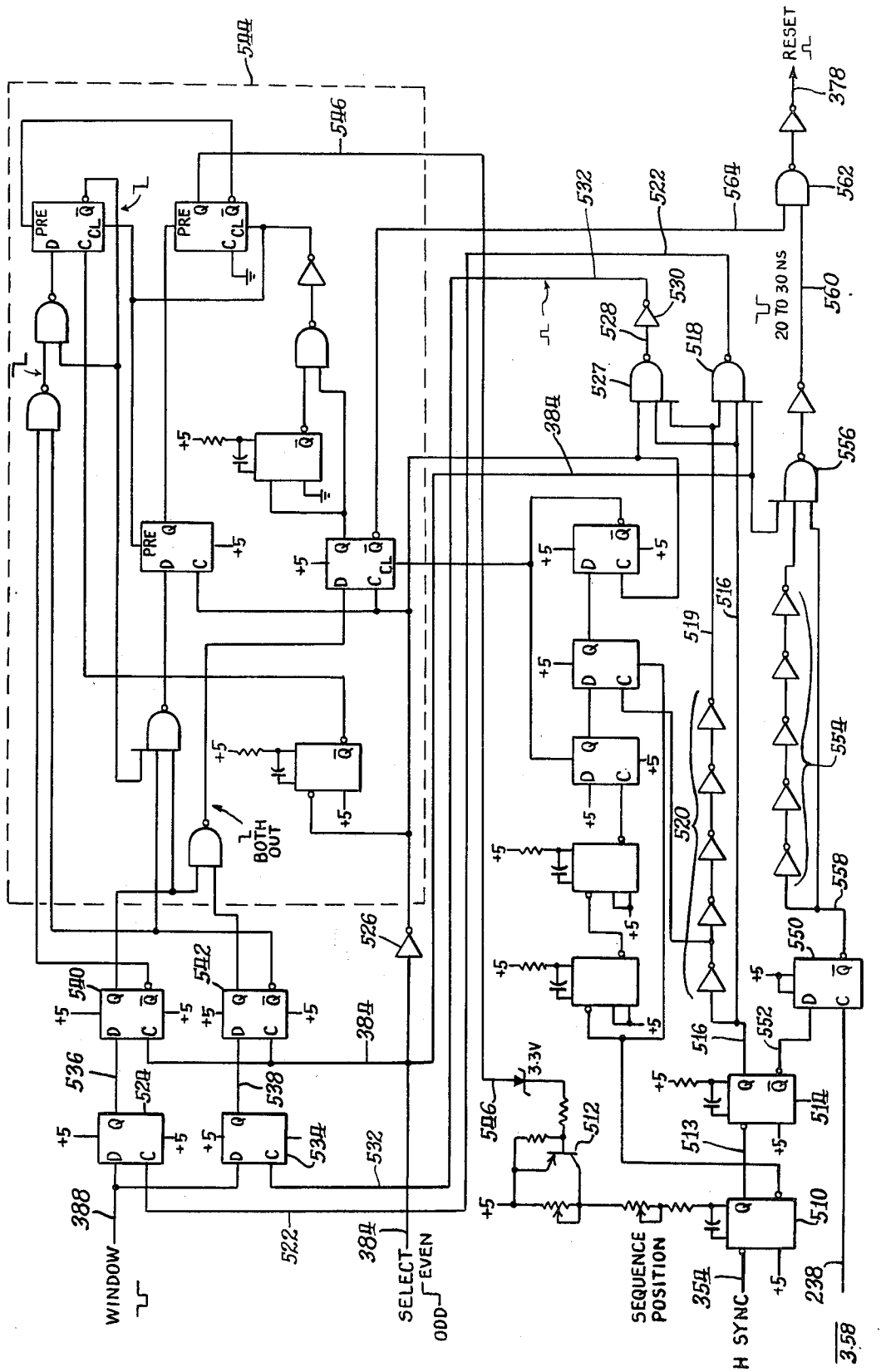

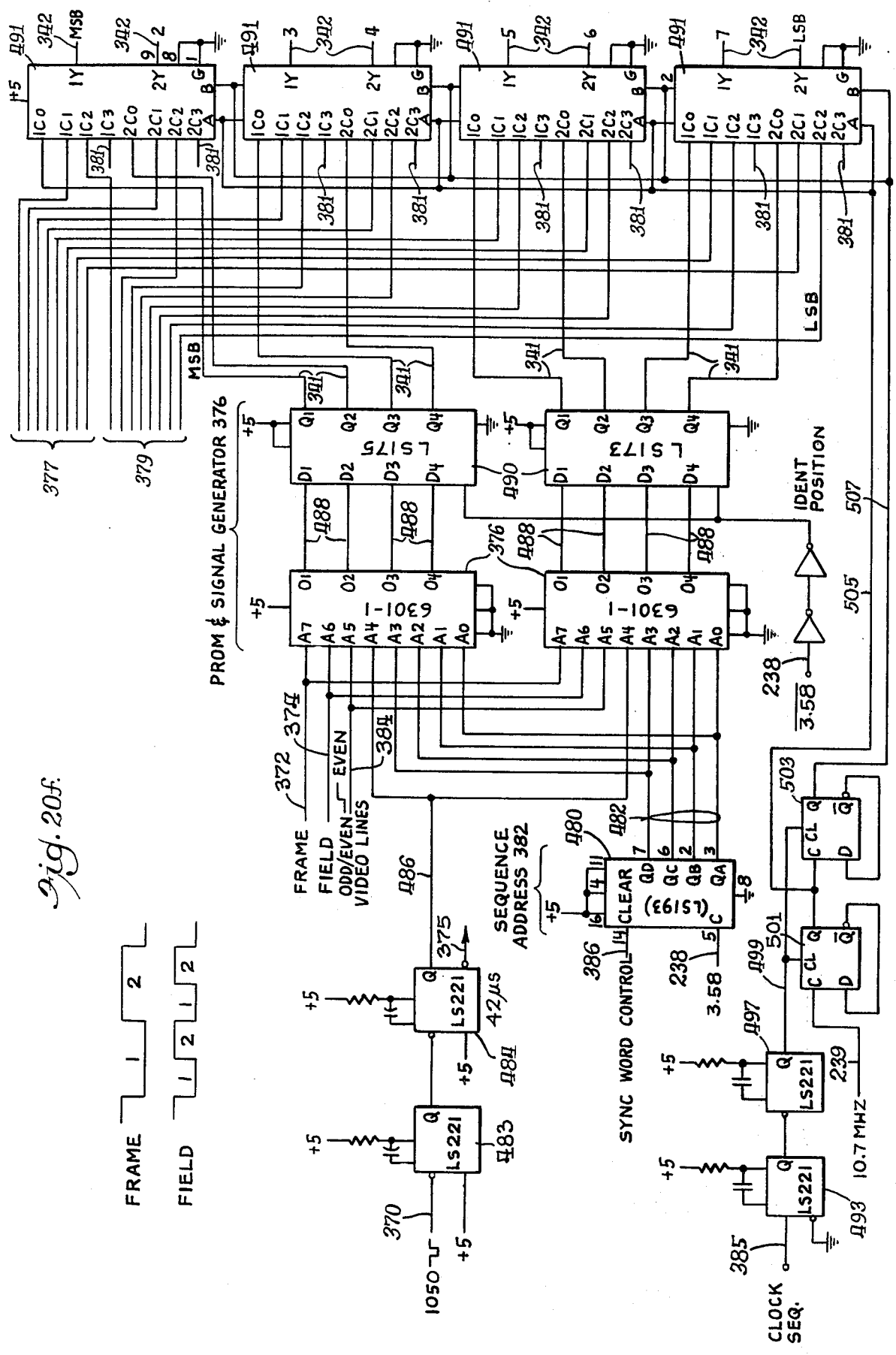

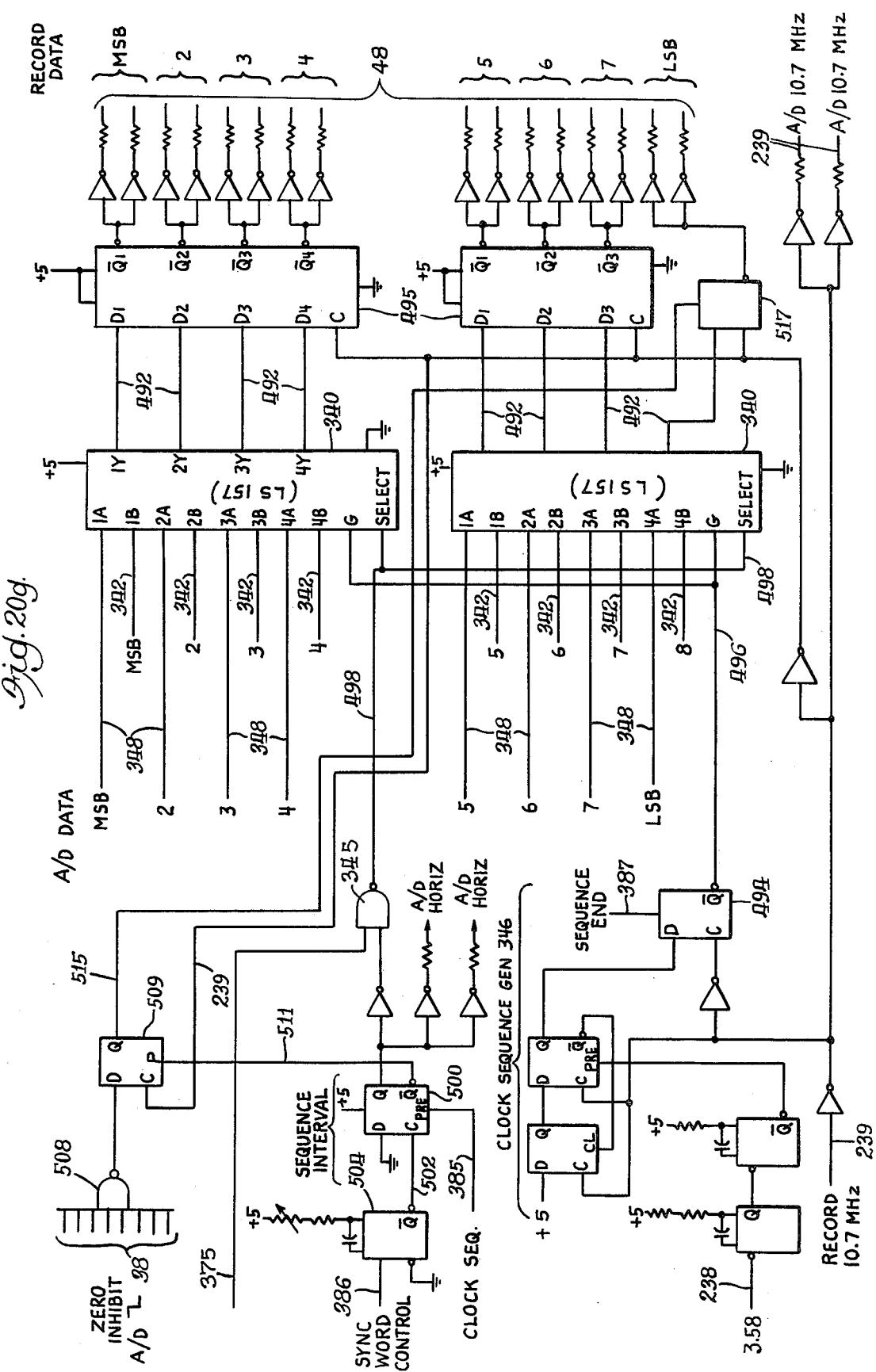

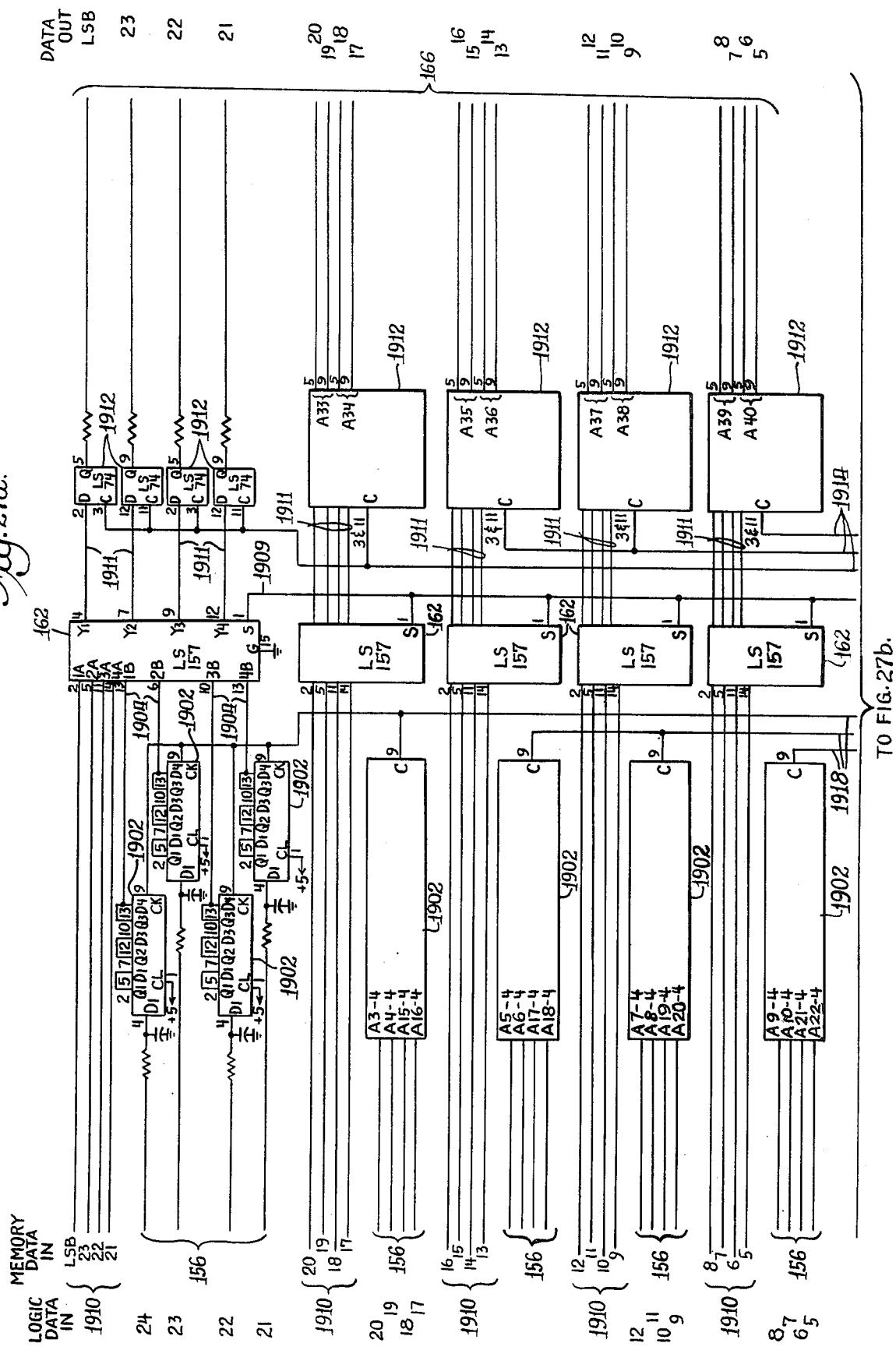

APPARATUS FOR PROVIDING DROP-OUT COMPENSATION IN RECORDING AND REPRODUCING SYSTEMS

CROSS REFERENCE TO RELATED APPLICATIONS

Digital Recording and Reproducing Apparatus, Ser. No. 117,428, filed Feb. 1, 1980, by Maurice G. Lemoine and Leonard A. Pasdera.

High Frequency Digital PCM Decoding Apparatus, Ser. No. 117,881, filed Feb. 1, 1980, by Maurice G. Lemoine and Leonard A. Pasdera.

Fast Acting Phase Shifting Apparatus for Use in Digital Sampling Systems, Ser. No. 117,752, filed Feb. 1, 1980, by Maurice G. Lemoine and Leonard A. Pasdera.

Parity Checking Circuitry for Use in Multi-Bit Cell PCM Recording and Reproducing Apparatus, Ser. No. 117,428, filed Feb. 1, 1980, by Maurice G. Lemoine.

BACKGROUND AND FIELD OF THE INVENTION

The present invention generally relates to drop-out compensation apparatus, and more specifically, to apparatus for providing drop-out compensation in a digital data stream having reoccurring intervals of similar information.

A magnetic recording and reproducing apparatus is disclosed in our copending application Ser. No. 117,428, which is of the type which records tracks substantially transversely relative to the longitudinal direction of the tape, but which does not utilize a FM recording technique that is currently most widely used in commercial quality television broadcasting. The apparatus disclosed therein records and reproduces pulse code modulated digital signals and offers many significant advantages compared to FM recording and reproducing apparatus. While the apparatus disclosed therein offers significantly improved overall performance compared to commercial quality television signal FM recording apparatus, an occasional loss of the recovered signal during reproducing occurs in magnetic tape recording systems, due to tape irregularities such as scratches and surface roughness and the like which cause drop-outs in the recovered signal. The apparatus of the present invention provides compensation for such drop-outs in that substitute digital data is inserted into the data stream in place of data that is detected to be either defective for some reason, wherein defective data as used herein may include incorrect or missing data.

While drop-out compensators, as they are known in the art, have been in existence for some time, they generally merely insert substitute signals that occurred a short time prior to the occurrence of the drop-out and hopefully provide a value that has a high probability of being visually equivalent to the defective signal. However, by utilizing a substitute data value that is horizontally displaced relative to the missing information in a video raster, the resulting image can be easily detrimentally affected, particularly if the preceding-in-time substitute data had a much different intensity, as would occur on opposite sides of a sharp vertical line, e.g., the edge of a building where the left side of the vertical edge is light and the right side dark. In such case, replacing the data on the dark side with preceding-in-time data that is light in intensity provides no improvement in the resulting image that is viewed on the raster. Similarly, by using data from a few preceding horizontal lines having the same chroma phase relationship as the data being replaced, wherein the data is at the same relative horizontal location along the line, similar effects are produced if a significant intensity transition occurs in the vertical direction of the image represented by the data. Moreover, by automatically inserting the data from a lateral location in the same horizontal line or from the same relative lateral position from a correspondingly phased preceding line, there is the possibility that defective data will be substituted, since there is no assurance that the automatically substituted data is not itself defective.

OBJECTS OF THE PRESENT INVENTION

Accordingly, it is a general object of the present invention to provide an improved apparatus for compensating data having reoccurring intervals of associated information for the presence of defective portions.

More particularly, it is an object of the present invention to provide an apparatus for providing drop-out compensation in video data so that the substitute data is provided that is very similar in intensity and chroma information content to the defective data and thereby provides a resulting video image that has a high probability of being free of visual disturbances.

Another object of the present invention is to provide an apparatus for substituting non-defective data for defective data in a stream of digital video data wherein the substitute data has the intensity and chroma information content from substantially the same location in the immediately preceding video field.

Yet another object of the present invention is to provide a drop-out compensation apparatus of the aforementioned type which includes a storing means having sufficient capacity to store the data representing the video data portion of a complete television field.

Still another object of the present invention is to provide a drop-out compensation apparatus of the aforementioned type which insures that the substitute data is not defective by inhibiting writing of defective data into the storing means from which the substitute data is provided.

A related object of the present invention is to provide a drop-out compensation apparatus of the aforementioned type wherein the storing means is not operated to store television signal data occurring during the horizontal and vertical blanking intervals of the television fields, and thereby enable the overall capacity of the storing means to be lower than would otherwise be required.

Other objects and advantages will become apparent upon reading the following detailed description, while referring to the attached drawings.

DESCRIPTION OF THE DRAWINGS

FIG. 2 is a simplified end view of a rotatable head wheel carrying a plurality of transducing heads that can be incorporated in the apparatus described herein.

FIG. 3 is a simplified plan view of a segment of a magnetic tape, generally illustrating the quadruples recording format including the transversely recorded television signal data tracks and the longitudinally recorded cue, control and audio tracks.

FIGS. 4a and 4b are timing diagrams which illustrate the relationship of the timing sequences that occur during operation of portions of the apparatus described herein during a recording operation.

FIGS. 5a and 5b are timing diagrams which illustrate the relationship of the timing sequences that occur during operation of portions of the apparatus described herein during a reproducing operation.

FIG. 6 illustrates the relation of a single line of a color television signal with the horizontal sync pulse and the color burst interval contained in the horizontal blanking interval, together with the relative timing of digital synchronizing information that is inserted in a portion of the horizontal blanking interval for each line.

FIG. 13 is an electrical schematic diagram of one of the random access memories, with portions removed for purposes of drawing economy.

FIGS. 14a and 14b together comprise an electrical schematic diagram of the 24-to-8 bit converter, parallel-to-serial converter and encoder.

FIG. 15 is an electrical schematic diagram of one of the preamplifying circuits of the apparatus described herein.

FIGS. 16a and 16b together comprise an electrical schematic diagram of one of the equalizer circuits that is used to correct for inter-symbol interference of the off-tape reproduce signal.

FIG. 16c(1) and (2) are graphs illustrating the waveform and depth of recording respectively, of a portion of a data stream.

FIGS. 20a, 20b, 20c, 20d, 20e, 20f and 20g comprise the electrical schematic diagrams of circuitry that can be used to carry out the operation of the block diagram of FIG. 12.

FIG. 21 is an electrical schematic diagram of a 2-to-1 switch.

FIG. 22 is a diagram illustrating a single cycle of color subcarrier and the proper phase relation when sampling is correctly performed, together with a single subcarrier cycle shown in phantom with the sampling being performed at incorrect phase locations.

FIGS. 27a and 27b together comprise the switching circuitry that can be used to carry out the operation of the drop-out compensator shown in FIG. 23.

DETAILED DESCRIPTION OF THE APPARATUS

Figure 1:
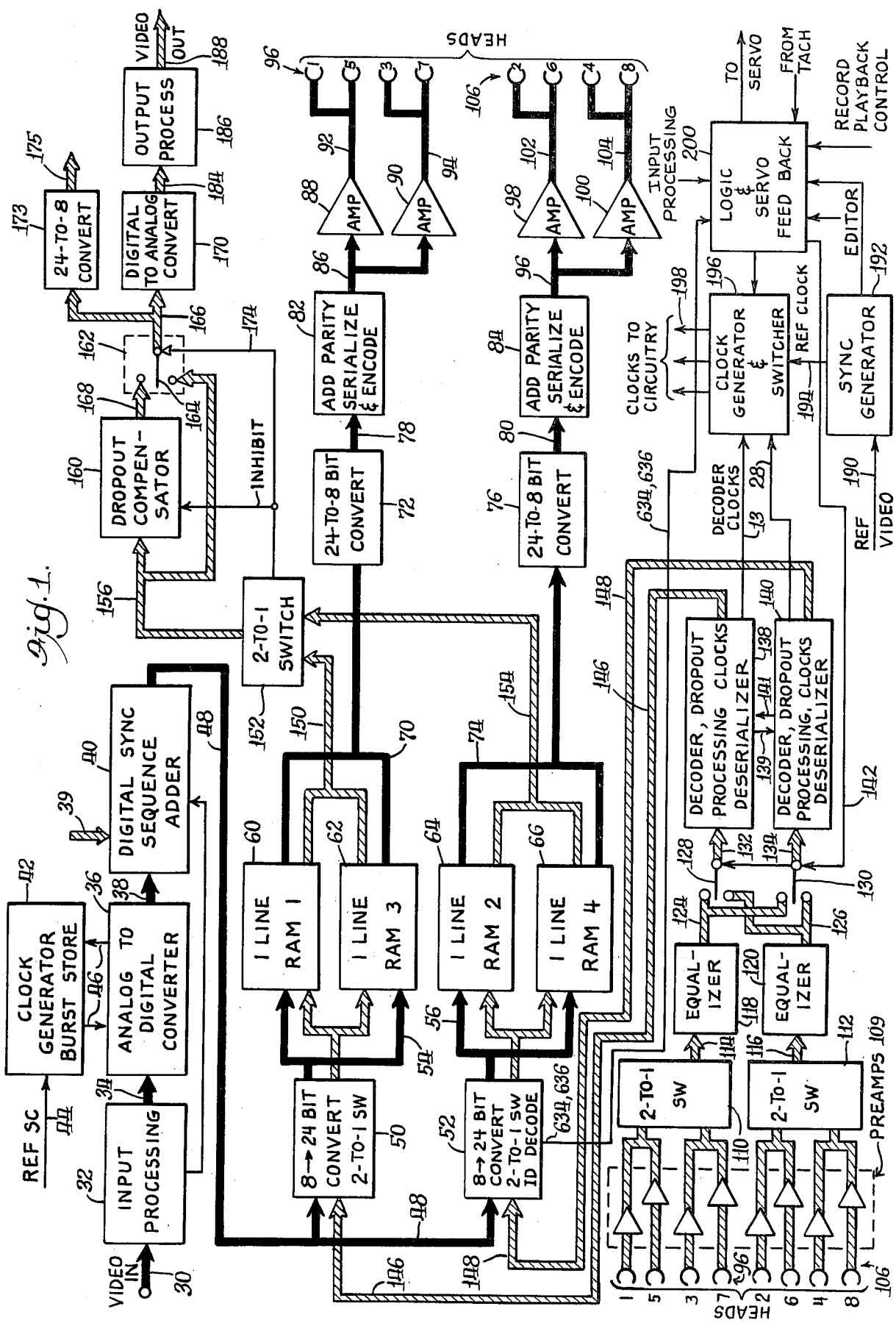
FIG. 1 is a system block diagram for the digital recording and reproducing apparatus that is described herein.

Turning now to the drawings, and particularly the functional block diagram of FIG. 1 which broadly illustrates the recording and reproducing apparatus described herein, it is shown to have a number of blocks that are interconnected with broad solid lines that are intended to illustrate the signal flow path during a recording operation, together with broad cross hatched lines which illustrate the signal path during a reproducing operation. The relatively thin lines reflect control signals, clock signals and other signals which do not specifically define the signal flow path of the video signals. It should be understood that the width of the lines are not intended to reflect the number of separate parallel conductors or lines that exist and, as will be fully explained herein, the signal path may be comprised of a single line serial data, or eight bits of parallel data or 24 bits of parallel data. The apparatus will be broadly described in conjunction with the block diagram of FIG. 1, first during a recording process and subsequently for a reproducing process, although certain blocks are utilized during both processes and may be described with respect to both processes when they are initially introduced.

The composite analog color television input signal is applied via line 30 to an input processing circuit 32 which performs various functions with respect to the signal, such as DC clamping, filtering, stripping the horizontal sync signals from the composite signal and the like, and the processed signal is then applied via line 34 to an analog-to-digital converter 36. The input processing circuitry 32 will not be described in detail inasmuch as it is disclosed in the Digital Time Base Corrector, Model No. TBC-800, manufactured by Ampex Corporation of Redwood City, Calif., the assignee of the present invention. The specific electrical schematic diagrams of the input processing circuitry are shown in Schematic Nos. 1374104 and 1374156 which respectively appear on pages 3 5/6 and 3 21/22 of the TBC-800 Digital Time Base Corrector Catalog No. 7896382-02 issued October, 1975. The schematic circuit diagrams are incorporated by reference herein.

The clamped and horizontal sync stripped analog color television signal from the input processing circuitry 32 is applied via line 34 to the analog-to-digital converter 36 which is operable to convert the signal to an eight bit binary coded signal format that is applied via 8 parallel lines 38 to a digital synchronization sequence adder 40. The analog-to-digital converter samples the analog color television signal at a rate that is preferably three times the frequency of the subcarrier component of the composite color television signal, although it could sample the signal at a higher rate of four times subcarrier. With respect to NTSC television signal format systems, the frequency of the subcarrier is approximately 3.58 MHz and for PAL and SECAM color television signal format systems, the subcarrier frequency is approximately 4.45 MHz. Thus, the sampling rate for NTSC systems is preferably three times the 3.58 MHz subcarrier frequency or approximately 10.7 MHz, while PAL and SECAM systems would utilize a sampling rate of about 13.3 MHz.

The clock used to control the sampling that is performed by the analog-to-digital converter 36 is generated by clock generator and burst store circuitry 42 that is capable of performing phase shifting of the sampling clock so that the samples are always taken of the analog color television signal at precise positions relative to the phase of the color burst component and, more specifically, on the positive going zero crossing or 0° phase position with respect to the blanking level, the 120° and 240° phase positions. In this regard, it should be understood that the 0°, 120° and 240° phase positions refer to the burst of subcarrier cycles occurring during the horizontal blanking interval and that although the sampling oviously continues during the video information interval of the color television signal; the reference to the 0°, 120° and 240° positions is only relevant during the presence of burst. By precisely controlling the sampling so that they coincide with these phase positions, several advantages result during subsequent operations of the apparatus, including the significant advantage of making the apparatus during reproducing not required to measure subcarrier phase changes as in FM recording apparatus time base correctors. A stable reference subcarrier signal (from the broadcasting station reference, for example) is applied to the clock generator via line 44 and the clock generator and burst store circuitry 42 is interconnected to the A/D converter 36 via lines 46. As will be described in detail, the burst store portion of the circuitry 42 interacts with a burst store associated with the A/D converter 36 to phase shift the clock signal as required so that analog color television signal is always sampled at the same phase positions. This is accomplished by examining the samples of the burst obtained from the input video signal every other horizontal line as a result of sampling by the clock signal derived from previously stored burst samples until it is determined that the phase of sampling the incoming burst has changed, whereupon the burst store from which the sampling clock signal is derived is updated or refreshed to provide a new "standard" for generating the sampling clock signal. After a phase adjustment has been performed, the burst store of the A/D converter 36 is not refreshed until the circuitry 42 detects that the phase relation of the incoming analog color television signal has changed sufficiently to require new burst information to be stored in the burst store of the A/D converter 36 for the purpose of rephasing the sampling. As will be comprehensively described herein, the clock generator and A/D converter 36 burst store is extremely fast acting and can completely rephase the sampling in less than the time of a single television line, after the refresh decision has been made. If a "wild switch" occurs in the input signal whereby it has a radically different phase relation relative to the signal that was present before the switch, the decision to rephase the sampling will be made within a few lines and the A/D converter 36 burst store will be rephased within the next television line.

The digital samples that are taken by the A/D converter 36 are applied in the form of an eight bit parallel digital word on eight lines to the digital synchronization sequence adder 40 which inserts digital synchronizing and other information in a portion of the horizontal blanking interval for the purpose of providing the necessary synchronization information that is used during the recording and reproducing operations. Although the digital words are supplied via lines 38 to the sequence adder 40, they may also be provided on lines 39 which can be supplied by another apparatus such as would be used in the editing process, for example. It should be appreciated that there is no precise phase relationship between the horizontal synchronization pulse and the phase of the subcarrier of the composite analog color television signal in commonly used television signal systems. It is for this reason that the horizontal synchronization pulse has been stripped and will be subsequently reconstructed at the output. However, when the horizontal synchronization pulses are removed, there must be some means of determining the active video information on a line-by-line basis and the digital synchronization sequence adder circuitry 40 performs this operation by inserting information into the data stream. With the digital synchronization information added to the digital samples of the video data interval of the television signal, if forms a processed color television signal, which is applied via lines 48 to circuits 50 and 52, each of which has an 8-to-24 bit converter as well as a 2-to-1 switch for applying either of two inputs to the output thereof. During recording, the signals on line 48 are applied to the output and during reproducing, the signals appearing on the reproduce signal paths 146 or 148 are applied to the output. The 8-to-24 bit converter merely converts three successive eight bit words into one 24 bit parallel word for processing through random access memories and may be uncessary if the particular memories used in the apparatus are sufficiently fast to process information at the eight bit rate. In this regard, it should be appreciated that converting three 8 bit words to one 24 bit word enables the data to be clocked at one third of the clock rate of the 8 bit data. The data from the circuits 50 and 52 are respectively applied via lines 54 and 56 to a group of random access memories as shown. The block diagram is also shown to have the signal flow path from the switches 50 and 52 during reproducing extending to the memories; it should be appreciated that only one group of lines are used for this interconnection, i.e., the signal path during recording uses the same conductors as the signal path during reproducing.

The lines 54 from the circuit 50 extend to random access memories 60 and 62 which are identified as RAM 1 and RAM 3, respectively, and the lines 56 extend to memories 64 and 66 which are identified as RAM 2 and RAM 4, respectively. Since the operation of the memories 60–66 will be described in detail with respect to the timing diagrams shown in FIGS. 4a, 4b, 5a and 5b in terms of the writing and reading of data with respect thereto, the use of the identification "RAM 1" or "RAM 4" will be predominantly used in the interest of clarity when the timing diagrams are discussed. The output of memories 60 and 62 are applied via lines 70 to a 24-to-8 converter 72, and in a similar manner, the outputs of memories 64 and 66 are applied via lines 74 to a 24-to-8 bit converter 76. It should be appreciated that if the memories are capable of handling data at the 8 bit word rate, then the 24-to-8 bit converter would obviously be unnecessary. The outputs of the converters 72 and 76 are applied via respective lines 78 and 80 to circuits 82 and 84 which add a parity information bit, convert the parallel 8 bit information to serial data and encode the same using a pulse code modulation scheme that encodes the data in an advantageous coded format that can be characterized as a DC free, self-clocking nonreturn to zero format. The encoded data from circuit 82 is applied via line 86 to amplifiers 88 and 90 which have their output lines 92 and 94, respectively, extending to transducing heads 96 which are designated 1, 3, 5 and 7 for reasons that will be hereinafter explained. The parity and encoding circuitry 84 has its output on line 96 similarly extending to amplifiers 98 and 100, which respectively have output lines 102 and 104 which extend to transducing heads 106 which are designated 2, 4, 6 and 8. As is evident from the drawing, the transducing heads 96 record the encoded data from one signal channel while the transducing heads 106 record the encoded data from the second channel.

In this regard, reference is made to FIG. 2 which shows transducing heads designated 1 through 8 being mounted on a head wheel 108 in a manner whereby the heads are equally spaced around the circumference thereof in a common axial plane. The signals that are applied to the transducing heads are recorded on the magnetic tape when recording current is applied to them and they are in contact with the tape. By utilizing 8 heads rather than the customary four heads for conventional quadruplex recorders, two heads can be simultaneously recording on two separate tracks. Thus, one set of four heads will record data from one channel while the other set records data from the second. Such an arrangement is described in U.S. Pat. No. 3,497,634 by Damron et al. entitled Wide Band Instrumentation Rotary Head System Using Redundant Recording and Reproducing. As the title implies, the 8 heads in the Damron et al. patent are used for the purpose of redundant recording as opposed to that which is disclosed herein, namely, recording two channels of separate information at the same time.

Referring again to FIG. 1, the operation of the block diagram during reproducing will now be described with respect to the block diagram, it being understood that the reproducing signal flow path is shown by the wider cross-hatched lines. The transducing heads 96 and 106 apply signals to preamplifiers 109 which amplify the recovered signal and forward it to two 2-to-1 switches 110 and 112 which select the appropriate signals from the preamplifiers and apply them to the respective output lines 114 and 116 which extend to respective equalizers and drop-out processing circuits 118 and 120. The outputs 124 and 126 of the equalizers extend through switches 128 and 130 which are adapted to switch the output of either equalizer 118 or 120 to the input lines 132 and 134 that extend to decoder, drop-out processing, clock acquisition and deserializing circuits 138 and 140. Since two channels of information are being reproduced, and as will be hereinafter described, each channel simultaneously processes successive lines of processed television signal information, the reversing of the two channels of information during playback would have the effect of reversing the vertical location of adjacent pairs of horizontal lines and would therefore produce a somewhat garbled video picture. For this reason, the switches 128 and 130 can apply the output of either equalizer 118 or 120 to either decoder circuit 138 or 140. The position of switches 128 and 130 is controlled by a control signal that extends from the reproduce memory control logic circuitry (FIG. 10) via line 142, which signal is determined by the line identification signal detected by the decoding circuitry contained in the circuit 52.

After the respective circuits 138 and 140 have decoded the data, performed parity checking to determine if errors are present in the data, acquired clocks from the data itself for use during reproducing and have converted the serial data to parallel data, i.e., converted the serial data back to 8 bit parallel digital words, the data is applied on lines 146 and 148 to the circuits 50 and 52, respectively, for application to the memories 60–66 as shown. The data is then read out of the memories 60 and 62 on line 150 that extends to a 2-to-1 switch 152 and the data from memories 64 and 66 is also applied to the switch 152 via line 154. The switch 152 selects the data from either of the lines 150 and 154 and applies it on line 156 to a drop-out compensator 160 which is adapted to insert information in the data stream to compensate for missing, errors or other defects that have been detected in the data during reproducing. In the event the drop-out compensator 160 comprises a two line delay, it inserts a data word that occurred at the same relative location along the horizontal video line, but which occurred two lines earlier and therefore four horizontal line positions earlier in the video raster, which is relatively representative of the information that has been lost in the data stream. In this regard, the NTSC 525 line television picture has approximately 570 eight bit samples in the video data portion of each line and, since the second previous line has information that is of the same subcarrier phase and in most instances is relatively close in content to the actual video information in the line being replace, insertion of that digital word in the data stream for the defective information does not introduce noticeable disturbances in the video information in most instances. However, for more accurate compensation, the drop-out compensator 160 is constructed to comprise a 262 line delay (for a NTSC system apparatus) and insert the data word that occurred in the previous field. This results in a more accurate compensation for detective data, since the inserted data is one line position away in the 525 line television raster from the defective data and, while the inserted information occurred 1/60 of a second prior to the defective information, it appears to viewer upon display to be nearly identical.

During operation of the apparatus, if the data from the 2-to-1 switch 152 has not been detected as being either lost, erroneous or otherwise defective, it is passed via line 156 to a switch 162 that has a movable contact 164 placed in the lower position 2 and the data passes through the switch 162 to the digital-to-analog converter 170 via line 166. In the event the data is determined to be defective, the switch is controlled to have the movable contact in position 1 where it receives data from the drop-out compensator 160 via line 168. By switching between positions 1 and 2, either current data or replacement data from the drop-out compensator 160 is passed to the D/A converter 170.

To control the operation of the switch as well as the drop-out compensator 160, a control line 174 is provided. The signals on line 174 effectively place switch 162 in position 2 when the data has been determined to be lost or in error through the detection of an RF drop-out or a parity error, respectively, as will be described in detail herein. Line 174 also extends to the drop-out compensator 160 for controlling certain aspects of its operation, particularly the storing or writing of data therein. Since it is desired to only substitute reasonably good data from the drop-out compensator, it should be appreciated that the storing of bad data into the compensator 160 could result in bad data being applied by the switch 162 at a later time. For this reason, the signals on line 174 which operate the switch 162 also inhibit the writing of lost or erroneous data in the compensator 160.

The two line delay drop-out compensators will not be shown or described in detail herein, since it can comprise the two line delay circuitry that is contained in the Ampex Corporation Digital Time Base Corrector No. TBC-800, the schematic diagram of which is shown on Schematic No. 1374060 on page 3-91/92 of the Catalog No. 7896382-02 issued October, 1975. This schematic is for an NTSC system and a companion schematic for a PAL-SECAM circuit is shown in the same catalog, Schematic No. 1374064 located on page 3-97/98. It should be appreciated that the 262 line delay drop-out compensator 160 is for an NTSC system and that a drop-out compensator that essentially stores a full field of information for a PAL or SECAM system would require a 312 line delay and 180° chroma phase inverter.

After the data stream has undergone drop-out compensation, it is applied via the switch 162 and line 166 to the digital-to-analog converter 170 which converts the 8 bit digital words to an analog signal using conventional circuitry such as disclosed in the Ampex Corporation Digital Time Base Corrector Model No. TBC-800. The digital data on line 166 can also be applied to a separate 24-to-8 bit converter 173 to provide an 8 bit word on line 175 that can be interfaced to another apparatus for editing purposes. The schematic diagram for the digital-to-analog converter is shown in Schematic No. 1374068 located on page 3-105/106 of the Catalog No. 7896382-02 issued October, 1975 and such schematic is incorporated by reference herein.

After the data has been converted to an analog signal, it is applied via line 184 to output processing circuitry 186 which provides the proper DC level to the analog signal, filters it, equalizes the amplitude, provides black clipping and inserts horizontal sync, subcarrier color burst, vertical sync and equalizer pulses to the signal so that a complete composite analog color television signal is present at the output on line 188 as is desired. The specific schematics shown in the output processing circuitry 186 are not shown herein and may be supplied by conventional circuitry shown in the video output circuitry for the Ampex Corporation Digital Time Base Corrector Model No. TBC-800. The schematics for this circuitry are shown on page 3-115/116, Schematic No. 1374224 of Ampex Catalog No. 7896382-02 issued October, 1975. Use of the specifically identified schematic diagrams referred to herein are incorporated by reference herein.

The reference video from the station is also applied via line 190 to a sync generator 192 that provides a reference clock signal iva line 194 to a clock generator and switching circuitry 196 that is used to supply various clocks on lines indicated generally at 198 for use by the circuits throughout the block diagram of FIG. 1. Also, logic and servo feedback circuitry 200 is operatively connected to the servo control circuits for driving the tape and head wheel and receives tape transport servo signals from, for example, the tachometers operatively associated with the tape drive capstan and rotating head wheel as will be described further hereinbelow. Moreover, editor and master record and playback mode control signals are applied to the circuitry 200 which provides control signals to the clock generator and switcher 196 for controlling the operation of the recording and reproducing apparatus disclosed herein.

While the foregoing description of FIG. 1 has provided a general description of the operation of the apparatus in terms of the signal paths during recording and reproducing and of the general operations that are carried out by the circuitry shown herein, what has not been described is the relative timing of the reproduce and recording operations, other than in a very general way in that the composite color television signal applied at the input 30 during recording operations and the color television signal provided at the output on line 188 during reproducing operations are intended to be real time data, i.e., the signal is continuous and synchronous with the station reference and has the basic timing in terms of horizontal and vertical synchronization pulses, subcarrier frequency and the like. However, the processing of the digital signal that is recorded on the magnetic tape is done so as to time expand the data to minimize the effect of tape imperfections on the recorded signal. Stated in other words, the signal is recorded on tape at a slower clock rate than the real time clock rate, but is recorded on two channels rather than a single channel so that no information is lost.

Referring again to FIG. 1 and viewing the entire apparatus from an overview perspective, the recording and reproducing can be broadly described as occurring in four separate steps, i.e., the processed digital color television signal is (1) written into the memories RAM 1 through RAM 4 at a real time clock rate, (2) read out of the memories at a slower rate but on two separate channels and recorded, (3) reproduced from the tape on the two channels and written into the memories at the slower rate, and (4) read out of the memories at the faster real time rate and combined into a single channel so as to reproduce the color television signal at the real time rate. From the foregoing, it should be appreciated that the random access memories or any other memory device which can be written into and read from are used during both the record and reproducing operations and have data written into them at a fast rate which is read out at a slower rate during recording and have the data written into them at the slower rate and read out at a faster rate during reproducing.

Figures 4A, 4B:
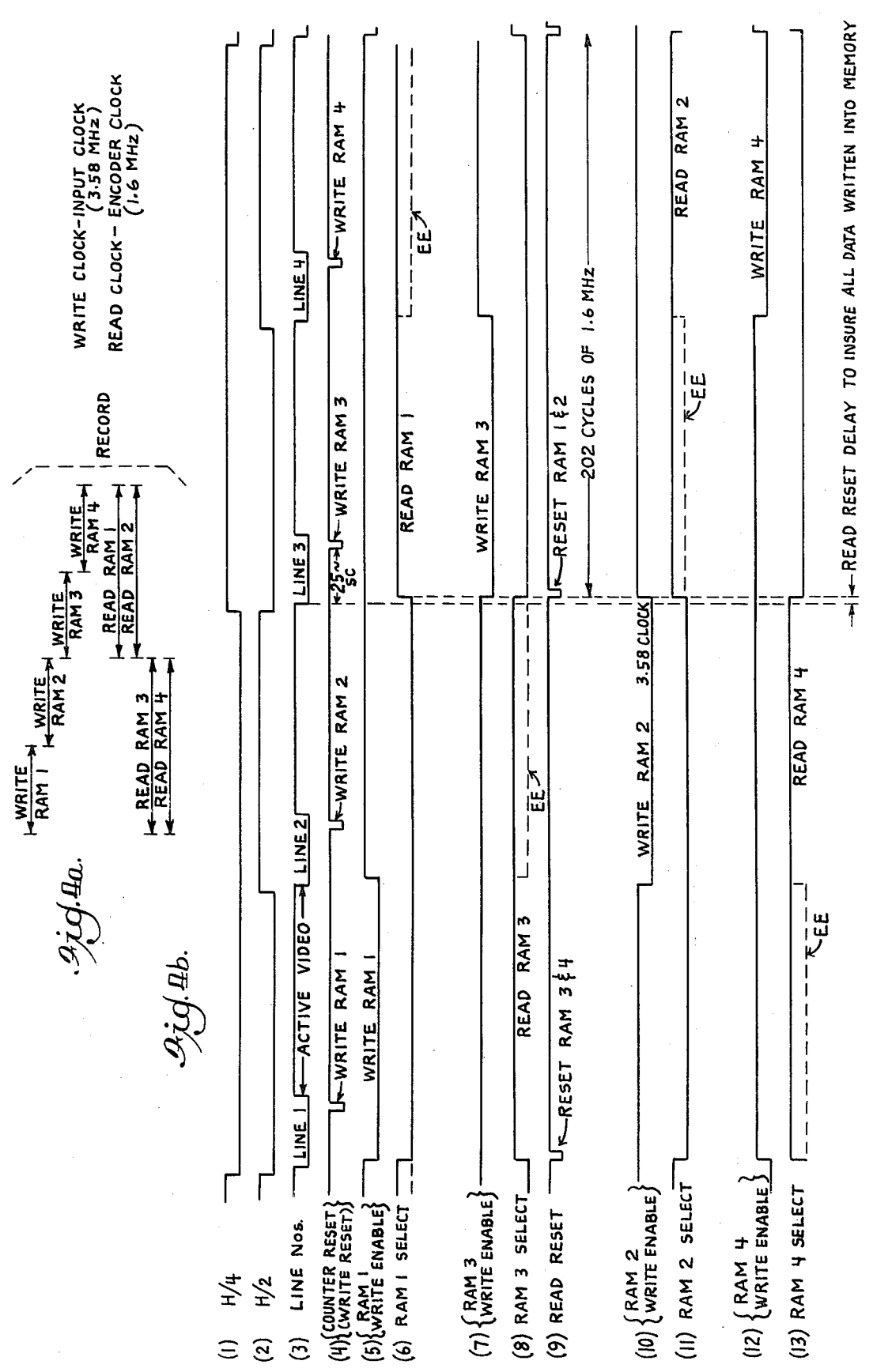

With respect to the record operation, and referring to FIG. 4a in conjunction with FIG. 1, keeping in mind that the input data on line 48 is applied via circuits 50 and 52 to each of the four memories RAM 1 through RAM 4, the data is selectively written into the memories and read therefrom on a television line-by-line basis, with each memory being capable of storing the data for a processed television line. Thus, the television signal on line 48 can be considered to be comprised of successive groups of four lines of data which are selectively written into the memories on a line-by-line basis. With respect to the order of the writing of the lines of data, and referring to FIG. 4a, the first line is written into RAM 1 followed by writing line 2 data into RAM 2, line 3 data in RAM 3 and finally line 4 data in RAM 4. It should be apparent that RAMs 1 and 3 are operatively connected together as are RAMs 2 and 4 and that the data is written into the RAMs at a real time rate. As is also shown in FIG. 4a, the line 1 and line 2 data is simultaneously read from RAMs 1 and 2 at a slower or time expanded rate as depicted by the longer lines in the timing diagram of FIG. 4a, with the reading of the information from RAMs 1 and 2 occurring during the writing of lines 3 and 4 into RAMs 3 and 4. Similarly, the reading of the line 3 and line 4 data from RAM 3 and RAM 4 occurs while subsequently occurring line 1 and line 2 data is being written into RAM 1 and RAM 2. Thus, it should be realized that writing into the memories during the recording operation occurs at a real time rate and reading of the data out of the memory occurs at a slower, time expanded rate and that none of the RAMs can have a reading and writing operation occurring simultaneously. Moreover, line 1 and line 2 data are applied to the separate channels and the simultaneous reading on line 3 and line 4 data from RAM 3 and RAM 4 occurs on the separate channels as well. The writing of data into the memories is done at a clock rate that is derived from the video signal itself and the clock that is used to read the data from the memories at the slower rate is the timing signal used by the system following the memories to control the signal processing operations and is generated by circuitry in the encoder 82.

During reproducing, the relative timing of the read and write operations of the memories can be easily understood by referring to FIG. 5a in conjunction with the block diagram of FIG. 1 wherein the line 1 and line 2 data is simultaneously written into RAM 1 and RAM 2 at the time expanded, slower rate followed by simultaneously writing line 3 and line 4 data into RAM 3 and RAM 4 at the same slower rate. While writing is occurring in RAM 3 and RAM 4, the line 1 and line 2 data is sequentially read at the faster real time rate from respective RAM 1 and RAM 2 and reading of the line 3 and line 4 data occurs sequentially from RAM 3 and RAM 4 at the faster real time rate during the simultaneous writing of line 1 and line 2 data into the RAM 1 and RAM 2. Thus, the output of the RAMs provide the correct sequence of lines of data at the faster real time rate even though the data is written into the memories at the time expanded, slower rate and none of the memories simultaneously read or write. The clock that controls the writing of the data into the memories is generated by the decoder circuitry and is acquired from the data itself. The clock for reading the data from the memories is synchronized to the station reference and is labeled the reference clock which is, of course, at real time.

With the general understanding of the timing for the writing and reading operations of the random access memories during recording and reproducing as has been described, the actual data that is recorded on and reproduced from the magnetic tape will be described before the detailed timing diagrams of FIGS. 4b and 5b will be described. In this regard, reference is made to FIG. 6 which illustrates the processed television signal data that will be recorded for each horizontal line of the television picture and is shown for an NTSC system as opposed to a PAL or SECAM system. Thus, referring to FIG. 6(1), there is shown a complete horizontal line which has 227.5 cycles of color subcarrier (SC), with the first portion shown to the left comprising the horizontal blanking interval, followed by the active video portion which has about 190 cycles of subcarrier occurring during this time. As is well known, the composite analog color television signal has the horizontal sync pulse at the beginning of each television line followed by a burst of about eight to eleven cycles of the subcarrier frequency signal before the active video information occurs. In FIG. 6(1), the horizontal sync and burst cycles are shown in the dotted representation in the horizontal blanking interval which is shown to have a duration equal to 37 cycles of subcarrier.

As previously mentioned, the horizontal sync signal and the burst of subcarrier are removed from the composite color television signal by the digital synchronizing adder circuitry 40, and the apparatus described herein is adapted to insert the digital synchronizing information within this time period. The requisite information is written within the horizontal blanking interval in a time that is significantly less than the duration of the complete horizontal blanking interval, with the writing of the data delayed at the beginning of each horizontal line interval for a period equal to about 25 cycles of subcarrier to be placed in the last 12 cycles subcarrier interval of the horizontal blanking interval. It should be appreciated that the delay is shown in the drawing to be equal to 25 cycles of the color subcarrier. However, the signal that controls the writing of the data into the memory is actually delayed 25.5 cycles and the write signal is synchronized to write 12 cycles of synchronizing sequence followed by 190 cycles of active video information for each line and this total of 202 cycles forms the processed television signal line interval that is always written into memory. The remaining 25.8 cycles are disregarded. It should be appreciated that the digital synchronization sequence may be determined to be somewhat greater or smaller than 12 cycles of subcarrier and also that the number of subcarrier cycles of the active video interval of each television line may be somewhat greater than 190. However, the total of the active video interval, synchronization sequence and the delay must equal 227.5 for each horizontal television line. The synchronizing information inserted into the television line provides significantly more information than was provided by the horizontal sync and color burst, as will become apparent. Thus, as is shown in FIG. 6(1), writing data into the random access memories is delayed for a period during the beginning of each horizontal line corresponding to approximately 25 cycles of subcarrier, and during the final 12 cycles subcarrier period of the horizontal blanking interval, the digital synchronizing sequence is added to the data stream, this being accomplished by the digital synchronization sequence adder circuitry 40. The digital synchronization sequence together with the video information interval of the television line is then written into memory as processed television line information, with the video information interval extending for a time period equal to 190 cycles of subcarrier.

Since the input analog color television signal was preferably sampled at a rate of three times the subcarrier frequency, 570 eight bit digital samples are present for the video interval portion of each television line. This data, in addition to the added synchronization data sequence, appears on line 48 for writing into one of the memories RAM 1 through RAM 4.

It should also be appreciated that the 25 cycle subcarrier delay in writing the processed television signal information into memory provides a time interval during every line interval where data is not written in memory, which means that this time interval can be subsequently used to perform head switching and time base correction. Stated in other words, since the delay occurs before writing of the information is begun during recording, and also during reproducing when the processed television signal data is again written into the memories, there will necessarily be a commensurate delay that can be used to advantage before reading the data from memories to reconstruct the line-by-line sequence of the television signal.

The digital synchronizing information that is inserted within the latter portion of the horizontal blanking interval contains clocking information, frame and field identification information as well as information that identifies whether the line is an odd or even line.

The servo systems which control the rotation of the head wheel 108 carrying the transducing heads and the transport of the magnetic tape are generally conventional and are described hereinbelow with respect to the block diagram of FIG. 28. During recording, the head wheel and transport servo systems use a horizontal line interval related signal, which in the apparatus described herein is a H/64 signal derived from the input television signal by the input processor 32, and this signal is used to control the rotation of the head wheel 108 whereby the head wheel rotation and capstan or tape transport are locked together. During reproducing, the identification signal is used to provide horizontal line synchronizing information and a vertical synchronizing related signal is used to provide information for deriving a vertical synchronizing signal and for color framing. In apparatus designed for the NTSC color television format, the information added by the sequence adder circuitry 40 contains the actual line interval number for each line interval in the four field sequence, i.e., the line intervals are numbered from 1 to 1050.

During the vertical interval following each fourth field of the four field sequency of an NTSC color television signal, the circuitry 40 inserts a series of unique digital words into the active video interval of line interval 1050. It is this series of words that are used by the servo systems to derive vertical sync to perform proper color framing.

Referring to FIG. 6(2), which is an expanded representation of the horizontal blanking interval, the write delay of 25 cycles of subcarrier is shown at the left, followed by an interval of 12 cycles of subcarrier during which the digital synchronization sequence is added. There are nine cycles of clock sequency proceding an identification No. 1 or "ID 1" clock cycle, which is followed by a framing information cycle and subsequently by an identification No. 2 or "ID 2" cycle. The ID 1 and ID 2 information results in several advantages during subsequent operations of the apparatus, including the significant advantage of making the apparatus greatly immune to cycle hops that are prevalent in FM recording apparatus. This advantage is due to the synchronization of the horizontal line to subcarrier phase being determined prior to recording, which is contained in the nine cycle clock sequence and ID 1 and ID 2 information. Each of the nine cycles of clock sequence comprise what is shown in the left portion of the expanded line FIG. 6(3) and specifically comprises the binary coded numbers 0, 0 and 5. The binary representation of a clock sequence cycle is also shown in the left portion of FIG. 6(4) and comprises two series of eight bits of low level for the zeros with the binary coded, number 5 having the $2^0$ bit and $2^2$ bit high and the 2' bit low, which is the binary number for the decimal number 5. As will be shown herein, a parity bit is also added to the data, which, when the sequence is serialized, causes the sequence to appear as 24 successive zeros, followed by the sequence "101". This is used in decoding upon reproduction to identify the word sync as will be described herein. The cycle that is marked ID 1 includes three samples of a particular number, such as the digital representation for two in the event that the video line is an odd numbered line and the digital representation for twenty in the event that it is an even line. Similarly, the cycle marked ID 2 may contain the digital representation for ten, for example, for an odd line and the digital representation for forty for an even line. Thus, four separate numbers are provided in the ID 1 and ID 2 cycles with the numbers effectively identifying whether a line is even or odd.

In the eleventh cycle located between the ID 1 and ID 2, framing information can be provided so that the apparatus can instantly have the information that will indicate the field and frame in which the line is located. In this regard, the NTSC system contains a four field sequence and the information contained in the framing cell can identify whether it is the first or second field of either the first or second frame of the full four field sequence. Moreover, since a four field sequence would necessarily include 1,050 television lines of information, the particular line of the four fields of lines may be provided, i.e., the number 526 may be provided which would indicate that the first line of the first field of the second frame is identified. The line number as well as other information is added as shown in the right portion of FIG. 6(3) and comprises three words labeled A, B and C. The number 1050 requires 11 binary bits and, for a PAL system having a total of 2500 lines in a color frame sequence, a total of 12 bits is required. These bits are separated so that the first 6 most significant bits are contained in word A, followed by the 6 least significant bits in word B. Word C can contain 3 bits of data which identifies such information as a NTSC, PAL, SECAM system, whether it is color or a monochrome system, for example. Three other bits can be used to identify the field number in the full sequence. While the exact line number would also provide the field number, a less sophisticated apparatus or a portable apparatus may utilize only the field number rather than the actual line number. The last bit in each of words A, B and C are high, so that a consecutive zero counter will not be able to detect an incorrect word synchronization as will be described in detail herein. By providing this information, the exact color framing and line identification is available on a line-by-line basis, which information can be advantageously used in an editing operation. Thus, in the time period of 12 cycles of color subcarrier, considerably more information is provided in the recorded television signal than is present in the entire horizontal interval of the analog color television signal.

As has been previously mentioned, the data in the memories is read-out for recording on the two channels comprised of lines 70 and 74 at a slower rate than the rate in which the data is written into the memories. Since the samplne rate of the A/D converter 36 is a multiple of the subcarrier frequency, preferably 3 SC (approximately 10.7 MHz), the data on lines 48 is at a 10.7 MHz rate. However, by virtue of being converted from 8 bits of parallel data to 24 bits of parallel data, the effective rate in which the data is written into the memory during recording is at the subcarrier frequency of approximately 3.58 MHz. The slower rate in which the data is read from the memories onto lines 70 and 74 is approximately 1.6 MHz. However, the precise frequency in which this is done will now be discussed in conjunction with FIG. 6(1), which shows that the active video interval of the horizontal line together with the 12 subcarrier cycles of digital synchronizing sequence information. The data associated with each SC cycle of the 12 subcarrier cycles of the digital synchronizing sequence and the following video data interval are read from the memories as 24 bits of parallel data using 202 cycles of the 1.6 MHz clock, whereby the single line of processed television information is read from the memories and recorded over a time corresponding to two horizontal line intervals. With this frequency being chosen, the frequency at which data in each channel must be recorded is as follows:

$$F = (\text{horiz. freq.}/2) \times 202 \text{ cycles/line} \times 3 \text{ samples/cycle} \times 9 \text{ bits/sample}$$

$$F = 7.86713185 \text{ kHz} \times 202 \times 3 \times 9 = 42.90733711 \text{ MHz}$$

The 9 bits per sample reflect the addition of a parity bit to the 8 bit data word. Since the 9 bit data word, before being serialized by the serializing and encoding circuitry 82 and 84 is in parallel, the frequency of the data will be the about 42.90733711 MHz divided by 9 or 4.767481901 MHz. However, the recorded data read from the memories during reproducing is at a rate corresponding to 27 bits of parallel data (providing for the addition of 3 parity bits to the 24 bit word read from the memories) rather than 9 bits and, accordingly, the frequency in which the data is read from memories will be 4.767481901 MHz divided by 3 or 1.589160634 MHz which will hereinafter be referred to as 1.6 MHz. The foregoing calculations of the frequencies are for a NTSC system rather than a PAL or SECAM system which would necessarily involve different frequencies which can be similarly calculated but which will not be presented herein. It should also be apparent that if the data is read from the memories for recording using the 1.6 MHz clock, the same clock frequency will be used during reproducing to write the data into the memories and the subcarrier frequency of 3.58 MHz will similarly be used to read the data therefrom for application to the switch 152.

With the above description of the clock frequencies that are used during writing and reading from the memory, together with the operational sequence of writing and reading data into and out of the memories during the record and reproducing operations for the apparatus described herein with respect to FIGS. 4a and 5a and the digital information and the timing relation of the digital information relative to the processed television signal described with respect to FIG. 6 in mind, the specific operation of the random access memories will now be described in more detail in conjunction with FIGS. 4b and 5b.

Turning initially to the record process and referring to FIG. 4b(3), there is illustrated a series of four consecutive television lines with the horizontal blanking interval being shown as a low level and the active video information interval being shown as a high level. Lines 4b(1) and 4b(2) respectively illustrate the horizontal sync rate divided by 4 and by 2, (H/4 and H/2). As previously mentioned with respect to the description of FIG. 6, the initial portion of the horizontal blanking interval is effectively discarded by delaying the writing of the digital information into the memories, with the delay being equal to approximately 25 cycles of subcarrier. FIG. 4b(4) illustrates the reset pulses that occur for the purpose of causing a counter to be reset which controls the writing of data into the memories. FIGS. 4b(5), 4b(10), 4b(7) and 4b(12) respectively show the timing for writing data into RAMs 1-4 in the time sequence that has been described with respect to FIG. 4a. Thus, the write enable control signals to the respective memories enable writing to occur when they are low and reading to occur when they are high. Similarly, the memory select lines control whether the outputs of the four memories RAM 1-RAM 4 can be applied to the output lines, it being realized that the memories are connected in pairs. Effectively, the data from a memory is gated to the output line when its corresponding memory select line is high. FIGS. 4b(6), 4b(11), 4b(8) and 4b(13) respectively illustrate the timing for the memory select lines for memories RAM 1-RAM 4.

For reading the data from the memories, FIG. 4b(9) shows reset pulses occurring for each two lines with the left reset pulse resetting RAM 3 and RAM 4 and the subsequently occurring reset pulse resetting RAM 1 and RAM 2 so that the data for each line can be read-out at the 1.6 MHz clock rate. In this regard, it should be recalled that RAM 1 and RAM 2 are simultaneously read onto two separate channels as are RAM 3 and RAM 4. The reset pulses for reading the memories is delayed to occur during the discarded horizontal blanking interval for the purpose of insuring that all data is written into the respective memories during the write operation. The dotted lines shown in FIGS. 4b(6), 4b(8), 4b(11) and 4b(13) are intended to illustrate the timing sequence during operation of the apparatus in the EE mode which is a test mode where the data is processed through the memories from the input 30 to the output 188 without recording or reproducing the data. The input television signal is processed through memory directly to the output using a real time 3.58 MHz clock and the time required to read the data from memory corresponds to the time required to write the data therein.

With respect to the operation of the random access memories RAM 1 through RAM 4 during reproducing operations, as has been broadly described with respect to FIG. 5a, the more detailed operation is shown in the timing diagrams of FIG. 5b, which includes the equivalent of four successive video lines in FIG. 5b(3), a H/4 signal on line 5b(1), as well as a tachometer reset pulse on line 5b(2), which occurs for each revolution of the head wheel 108 carrying the eight heads. Since each transducing head writes a total of eight lines of processed television signal information per pass on the video tape, and there are eight heads on the head wheel as shown in FIG. 2, the tachometer reset pulse will occur every 64 lines. A read reset pulse occurs in the latter part of the horizontal interval, as shown by comparing line FIG. 5b(4) with FIG. 5b(3), with the read reset pulse being timed to correspond with the delay that occurs in writing the information from the memories during recording operations, the reset pulse appearing so as to read only the ID 1, ID 2, and framing information that is present in the digital synchronizing sequence that was added during the latter portion of the horizontal interval and the following video data interval. As has been described with respect to the block diagram of FIG. 1, the output from RAM 1 and RAM 3 appears on line 150 while the output of RAM 2 and RAM 4 appears on line 154, with both lines being connected to the 2-to-1 switch 152 which alternately switches the data from the two lines onto line 156 which is connected to the drop-out compensator 160 or 162, depending upon the one in use. The signal for switching the 2-to-1 switch 152 comes from the clock generator and switcher circuitry 196 and the timing diagram for the control to the 2-to-1 switch appears on FIG. 5b(5), which switches at the beginning of the read reset pulse so as to receive a full line of processed television signal data from either line 150 or 154 and alternates between the two. FIGS. 5b(8), 5b(9), 5b(14) and 5b(15) illustrate pulses which are used by the memory control logic 200 to reset the memories for writing the data into them. As is shown in the middle portion of FIGS. 5b(14 and 5b(15), the first reset occurs after nine cycles of the 1.6 MHz clock and the second pulse appears after 11 cycles of the clock. These pulses are used by the reproduce memory control logic and timing circuitry contained in the logic and servo feedback circuit 200 and the clock generator and switcher circuit 196 to inhibit the memories from writing the nine cycles of clock sequence included in digital synchronizing information that is inserted in the processed television signal during the record operation, as discussed with respect to FIG. 6(2). The nine cycles of clock sequence are added to the digital synchronization sequence to enable detection of the "101" word sync and recovery of the correctly phased clock from the data during reproducing operations, which occurs in the decoder circuitry 138 and 140 located before the inputs of the memories 60–66. Since that occurs before the memories, it is unnecessary to write the clock sequence into the memory during reproducing operations and it is therefore not done. However, the timing of the memory control write pulses effectively write the ID 1, framing information and ID 2 data into memory at predetermined memory address locations. Then, using read reset pulses that are timed relative to a station reference, the memories are read from predetermined address locations and the recovered data is correctly timed.

FIGS. 5b(6), 5b(12), 5b(10) and 5b(16) are the timing diagrams for selecting RAMs 1 through 4, respectively, while FIGS. 5b(7), 5b(13), 5b(11) and 5b(17) illustrate the write enable signals which permit reading and writing operations to be performed with respect to the memories RAMs 1 through 4, respectively. The duration of the read and write operations shown in 5b are similar to, but are time reversed relative to the corresponding diagrams previously described with respect to FIG. 4b, it being understood that during reproducing, writing of the data occurs at the slower 1.6 MHz rate while reading thereof is at the faster 3.58 MHz rate in contrast to the writing at 3.58 MHz and reading at the 1.6 MHz rate during recording.

In accordance with an important aspect of the apparatus described herein, and referring briefly to the block diagram of FIG. 1, the sampling of the analog color television signal by the A/D converter 36 is done at a rate of three samples per subcarrier cycle, which for the NTSC system is at a rate of about 10.7 MHz and is controlled by a clock signal received over line 46. Referring to FIG. 22, which illustrates a single cycle of subcarrier, the television signal is sampled at phase locations relative to the zero phase crossing point, the 120° phase point and the 240° phase point of the color burst time and the timing of the sampling is controlled so as to obtain samples throughout the television signal from locations that are precisely defined relative to the phase of the color burst contained in the signal that is to be recorded. By so doing, the subsequent recording and reproducing can be performed in a manner whereby phase shifting of the subcarrier will not complicate the operation of the apparatus for reliable recovery of the color television signal information. In this regard, and as previously mentioned, the phase of the color subcarrier is not synchronized with respect to horizontal sync pulse in a NTSC composite video signal. The clock generator and burst store circuitry 42 interacts with the analog-to-digital converter 36 so as to provide accurate sampling that is synchronous with respect to subcarrier in the manner whereby samples are taken precisely at the zero phase crossing point, the 120° phase and 240° phase points relative to the color burst. The clock signal that controls the time of sampling of the analog color television signal is phase adjusted so that the sampling always occurs at the aforesaid phase points. As will be described herein, in the event that a "wild switch" occurs wherein the input line 30 is switched from one source of color television signals to another unsynchronized source which provides a signal with a radically different subcarrier phase, the circuitry 42 can very rapidly rephase the sampling so that samples are accurately taken at the 0°, 120° and 240° phase points as is desired.

Figure 11:
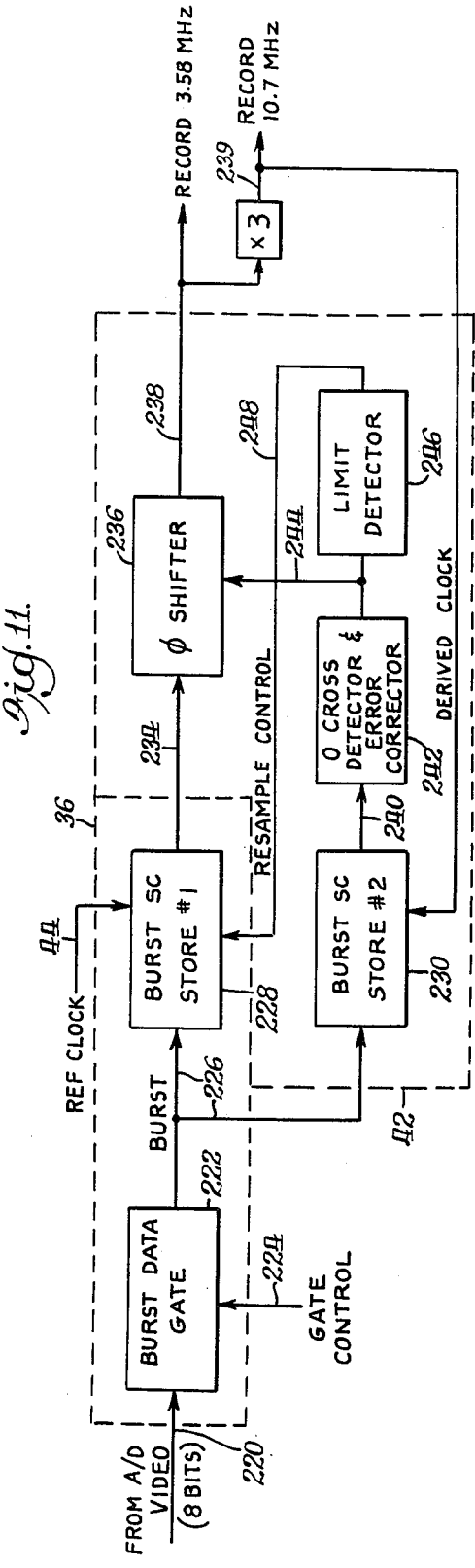
FIG. 11 is a functional block diagram of circuitry that is used to adjust the phase relation of the sampling of the analog color television signal, so that the samples are taken at proper locations with respect to the phase of the color subcarrier of the composite color television signal.

To provide the phase adjustment of the sampling clock so as to maintain the desired timing of the sampling relative to the color burst, reference is made to the block diagram shown in FIG. 11 which broadly illustrates the operation of the clock generator and burst store circuitry 42 in conjunction with the analog-to-digital converter 36. After the A/D converter 36 has sampled the television signal information and the obtained samples encoded into 8 bit digital words, the digital samples are applied to line 220 which is applied to a burst data gate 222 that is controlled by a gate control line 224 so that the samples of the color burst cycles are gated through to line 226 for application to either a first burst store 228 or a second burst store 230. The first burst store 228 is adapted to receive and store the samples representative of five cycles of burst and utilizes this data for generating a 3.58 MHz clock that is phase synchronized to color burst, hence, also phased for the input signal to be processed for recording. The burst data is clocked into the first burst store 228 using a reference clock signal applied over line 44 from station reference or the like, the only requirements for this clock being that it be a phase stable clock signal and essentially frequency stable relative to the color subcarrier of the input television signal. The output of burst store 228 appears on line 234 which is applied to a phase shifter 236 that controls the phase shifting of the generated clock signals, which for the apparatus described herein are at a rate of 3.58 MHz and 10.7 MHz. These clock signals appear on lines 238 and 239, respectively, and are used to control the sampling of the input signal and clocking of the resulting data into the random access memories RAM 1 through RAM 4 during the record process.

The second burst store 230 is also adapted to receive and store the samples representative of a few cycles of the burst of the signal using the derived clock on line 238 to effect the generation and storage of the burst samples. The signal from the second burst store 230 is applied via line 240 to a zero crossing detector and error corrector 242, which examines the samples of the burst and determines whether the zero phase sample is actually occurring on the zero crossing point of the color burst and whether the other samples taken during the color burst cycle are similarly correctly taken. If there is an error in the location of the sampling points, it appears as a signal on line 244 which is applied to the phase shifter 236 as well as to a limit detector 246. The limit detector 246 determines the amount of error that is present in the actual sampling points compared to the desired sampling points and, if the error is outside of a predetermined limit, issues a command on line 248 to cause the first burst store 228 to refresh itself, i.e., to store a new set of samples from the incoming burst on line 226. The new set of burst cycle samples are obtained from the A/D converter 36 by sampling the incoming color burst at times determined by the reference clock. At times other than the refreshing of the first burst store 238, the A/D converter 36 is clocked by the 10.7 MHz derived clock signal on line 239. The output of the error corrector 242 also provides a signal to the phase shifter 236 for rephasing the clock signals on line 234 so that the derived record clock signals on lines 238 and 239 are correctly phased and thereby corrects for slow or minor drifts of the sampling phase points that can occur.

It should be appreciated that the circuitry shown in the block diagram of FIG. 11 is particularly adapted for use with a color television information signal having color burst cycles which function as a time-base synchronizing component of the information signal. However, the circuitry of FIG. 11 can be used to provide a rephase adjustable clock signal for sampling other types of information signals, provided they have periodically occurring intervals of a time-base synchronizing component. It should also be appreciated that if the phase adjusting circuitry was used in apparatus where the slow or minor drifts in phase were not particularly critical, the aspect of its operation where the shifting is performed by the phase shifter 236 may not be required and in such event, only a refreshing of the first burst store need be done when the phase error exceeds a predetermined limit. On the other hand, if the phase adjusting circuitry is used in apparatus that seldom experiences fast or large phase changes, the phase shifter 236 may desirably be employed to make the corrections of the slow or minor drifts, and the circuitry would not include the limit detector 246 to refresh the burst store 228.

The error correcting signals on line 244 are intended and are coupled to control the phase shifter 236 to correct for slow moderate errors in the sampling of the signal relative to the precise desired sampling points and the phase shifter 236 is not operable to make corrections for large fast errors that are outside of the predetermined limit that is detected by the limit detector 246. Large changes in the phase of the color burst, for example, as a consequence of a wild switch, are corrected by the operation of the limit detector 246, which issues a command on line 248 for causing the first burst store 228 to receive a new series of reference samples for generating the record clock signals that appear on lines 234 and 239.

An important aspect of the phase shifting circuitry shown in FIG. 11 is the interaction of the two burst stores 228 and 230 and the ability of the circuitry to rapidly correct for errors that may be present. In this regard, the operation of the first burst store 228 is such that it receives five cycles of burst and stores this information, indefinitely, using the stable reference clock on line 44 to write the burst samples into the memory of the burst store. The 3.58 MHz clock signal that is generated from the burst samples stored in burst store 228 is employed by the A/D converter 36 to sample the input television signal and the first burst store 228 is not refreshed every line or even every second line, but is kept indefinitely until the phase of the burst on line 226 is determined to be outside of the predetermined limits. The operation of the circuitry is such that the burst cycles will not be simultaneously written into both burst stores 228 and 230. If the first burst store 228 is given a command to store the samples of the burst, burst store 230 will be inhibited from storing the samples until the next successive horizontal line of burst occurs. The reference clock is used to sample the burst in the A/D converter 36 and store the burst samples in the first burst store 228 and the derived 10.7 MHz output clock on line 239 is used to sample the burst in the A/D converter 36 and store the burst samples in the second burst store 230. If the phase of the incoming burst changes from line-to-line by an amount that is outside of the predetermined limits, the sequence would be to sample the burst of a television line and refresh the first burst store 228, using the reference 10.7 MHz clock, use the derived 10.7 MHz clock on line 239 to sample the burst of the next or second television line and store the burst samples in the second burst store 230. If the phase of the burst on the second line was outside of the predetermined error limit from the burst of the first line, a new command would cause the first burst store 228 to refresh itself again on the third television line, creating a different phase clock on line 239, which is used to sample the burst of the fourth television line and store the samples in the second burst store 230. Once the phase of the incoming burst on line 226 settles down and is relatively constant, so as to not be outside of the predetermined phase error limits, the first burst store 228 would not be refreshed and minor phase corrections would be accomplished by the error corrector circuitry 242 applying error correcting signals over line 244 to the phase shifter 236.

Figure 10:
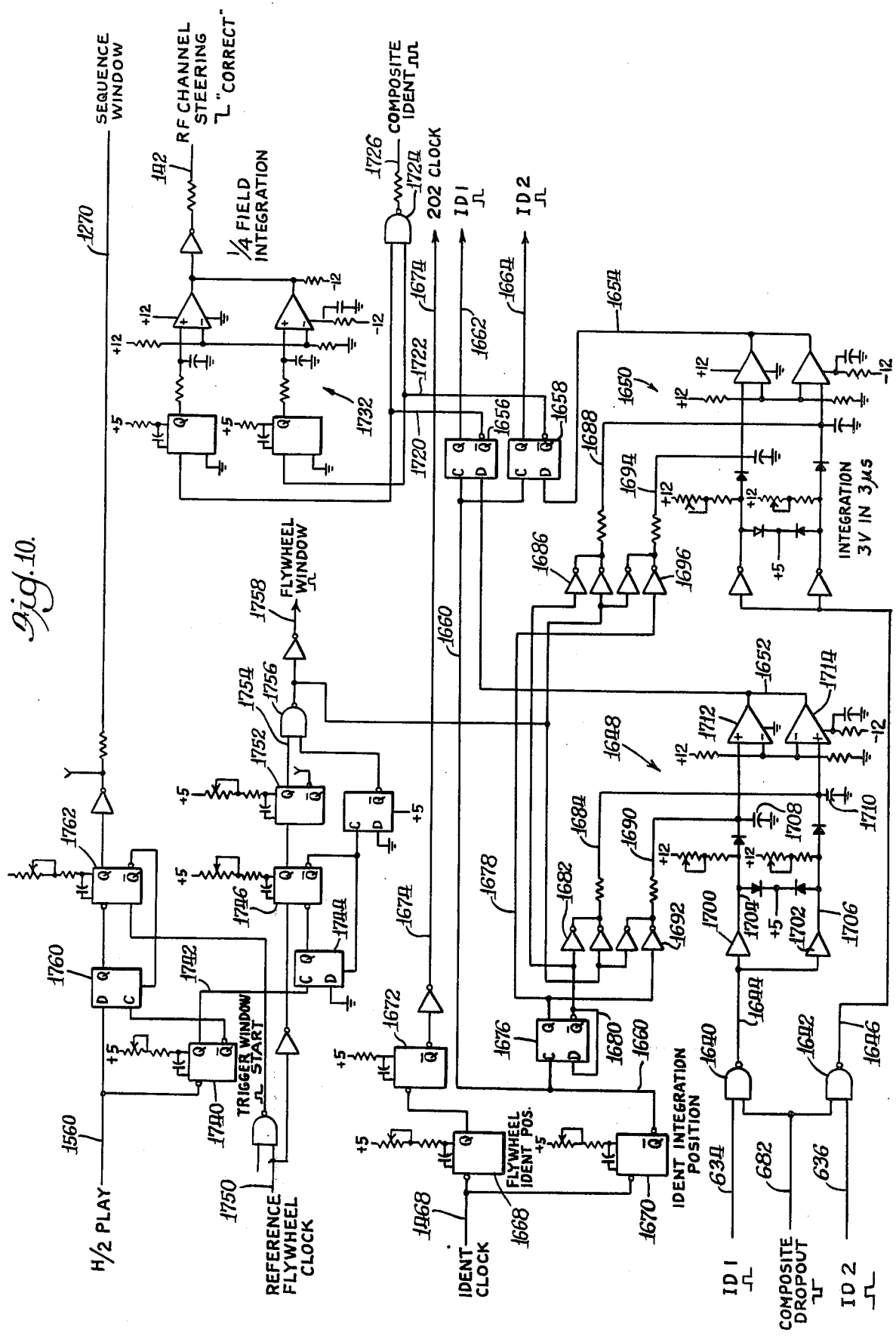
FIG. 10 is an electrical schematic diagram of additional circuitry that is used for controlling the random access memories during a reproducing operation.
Figure 19A:
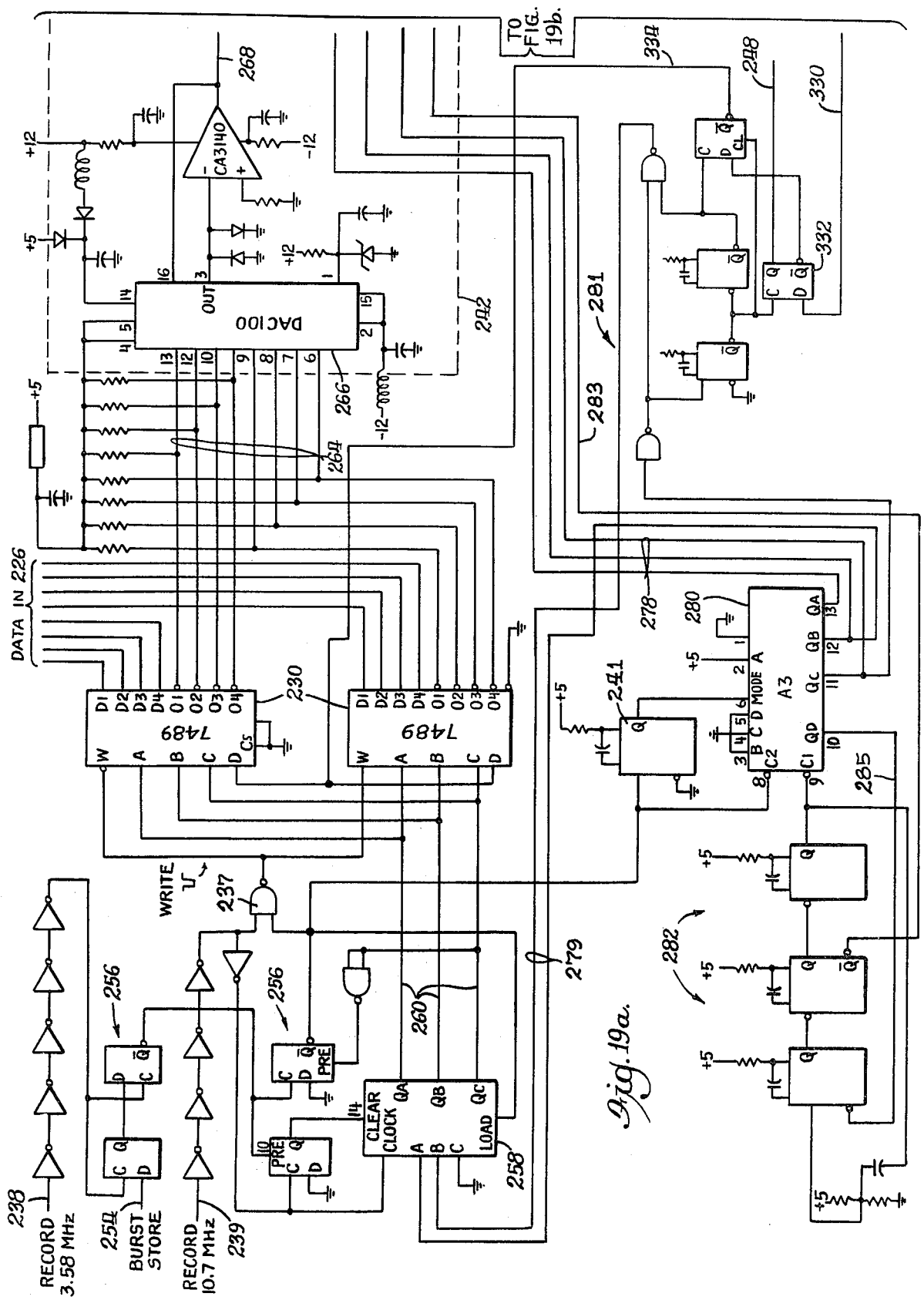
FIGS. 19a and 19b together comprise an electrical schematic diagram of one form of specific circuitry that can be used to carry out the operation of the block diagram of FIG. 11.
Figure 19B:
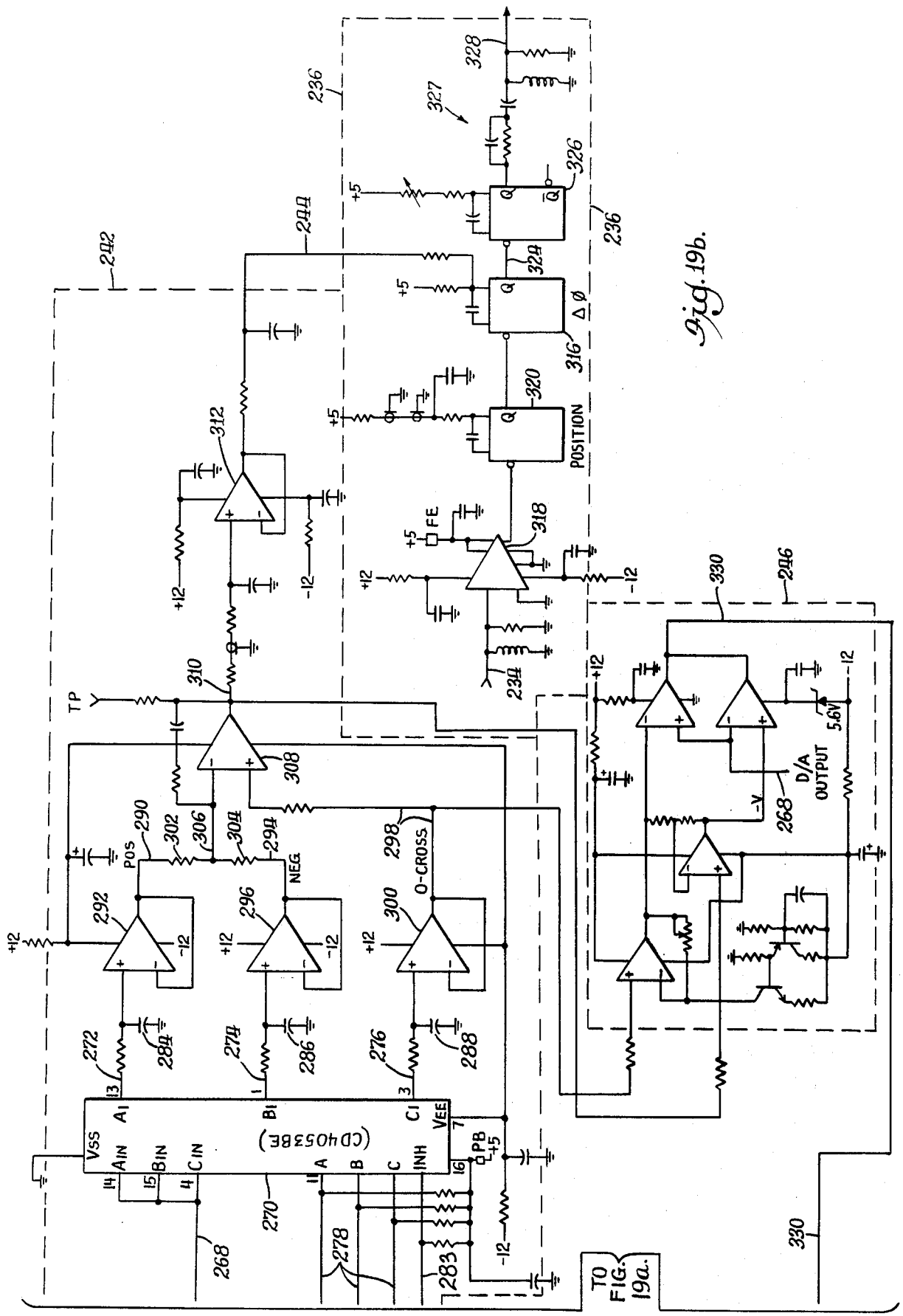

The detailed circuitry that can be used to carry out the operation of the block diagram shown in FIG. 11 is illustrated in FIGS. 19a and 19b which together comprise the schematic electrical diagrams for this circuitry. However, it should be appreciated that the burst data gate as well as the clock generator of the first burst store 228 shown in FIG. 10 is not shown in detail herein, inasmuch as it is identical to circuitry shown in electrical schematics for the TBC-800 Digital Time Base Corrector of Ampex Corporation. The clock generator is shown on Schematic No. 1374028 sheets 1 and 2 contained in Catalog No. 7896382-02 issued October, 1975 for the TBC-800 and is incorporated by reference herein. The phase shifter 236 is merely added after the 3.58 MHz filter and before the tape 3.58 limiter shown on sheet 2 of Schematic No. 1374028 and the horizontal line between the inductor L30 and the resistor R101.

Since the remainder of the circuitry of that schematic produces 3.58 and 10.7 MHz square waves, the phase shifting that is performed by the phase shifter 236 simultaneously adjusts the phase of both of these signals which are used for clocking the A/C converter 36 and for the record clocks elsewhere in the circuitry. Moreover, the first burst store 228 is not incorporated herein as much as it is essentially identical to the burst store of the TBC-800 by Ampex Corporation and is shown on Schematic No. 1374044 sheets 1 and 2 of the Catalog No. 7896382-02 issued October, 1975 wherein sheet 2 of the schematic shows the 8 bit word input being applied to random access memories A36 and A37 which are adapted to store 15 samples comprising five cycles of burst which are used by its clock generator to generate a 3.58 MHz clock that is synchronous with the samples stored therein. A burst store control signal is applied on input terminals 81 and 82 that pass through a resistor and inverter with the output of the inverter A41 pin 12 supplying a burst store command at an H/2 rate, hence, for every second burst, which is applied to the input line 254 shown in FIG. 19a. This burst store command is derived from that used in the first burst store 228 by dividing such command used by the first burst store by two. The burst store command causes the second burst store 230 to load samples of burst using the derived 10.7 MHz record clock received over line 239 from the first burst store 228, as will be described in detail hereinafter. As has been described with respect to the block diagram of FIG. 11, in the event that the first burst store 228 is to be refreshed, then a resample inhibit control signal on line 248 is removed to allow the burst store 228 to receive a write enable signal and, thereby, be loaded. This inhibit control signal is applied to the clear input of a flip-flop labeled A45 on the lower portion of sheet 1 of Schematic No. 1374044 to permit the burst store comprised of the random access memories A36 and A37 to load 15 new samples comprising five cycles of the burst.

Returning to FIG. 19a, the derived record 3.58 and 10.7 MHz clocks received from the phase shifting circuitry via lines 238 and 239, respectively, whereby three samples of a single cycle of burst from the A/D converter 36, in the form of eight bits of data appearing on lines 226, are stored in random access memories 230 forming the second burst store. The flip-flops indicated generally at 256 reclock the burst store command signal on line 254 with the derived record 3.58 MHz clock signal to identify the zero crossing sample and provide delays so that the three samples of burst cycle that are written into memory are taken from the center of the burst sample interval rather than the start or end of it. During the writing of the three burst samples into the memories 230, the address generator controller 258 is clocked by the retimed MHz clock received over line line 239 to issue write address signals over output lines 260, which are connected to the address line inputs of the memories 230. In addition, the flip-flops 256 apply a gating signal to the NAND gate 237 lasting for an interval of three 10 MHz clock cycles to cause it to issue a write enabling command of comparable interval to the memories 230. The memories 230 are responsive to these signals to store three successive burst samples at the 10.7 MHz rate. After the three samples of the single burst cycle have been written into the memories, the address generator controller 258 disables the NAND gate 237 after the last of the three write addresses have been provided, thereby, preventing the further storing of samples present on lines 226.

The stored samples are then read from the memory at a substantially slower rate via output lines 264 into a digital-to-analog converter 266. The converter responsively provides an analog value on line 268 that is applied to a multiplexing switch 270 (FIG. 19b), which applies the three successively occurring analog values from line 268 successively on to lines 272, 274 and 276 according to the address signals placed on address lines 278 by a memory read address generator 280 (FIG. 19a). The memory read address generator 280 together with a number of monostable multivibrators or one-shots, forming a gated clock signal generator indicated at 282, provide timing and read address signals so that each of the three successive stored samples are read from the memories 230 onto lines 264 and the resulting analog values provided by the converter 266 are applied successively to the respective output lines 272, 274 and 276 (FIG. 19b) of the multiplexing switch 270. The application of the analog values on line 268 occurs for a time equal to about 2 microseconds with the successive analog voltage values represented by the three successive samples charging respective capacitors 284, 286 and 288, which define sample and hold circuits for the analog values of the three samples. The reading of the stored three samples of the single color burst cycle is initiated by the gate signal provided by the flip-flops 256. The gate signal activates a one-shot 241 to cause the shift register forming the address generator 280 to activate the lines 278 and 279 to apply read address signals to the memories 230 and the multiplexing switch 270, respectively. The address generator 280 is cleared in response to the gate signal to remove the inhibit applied to the line 285 that extends to the string of one shots indicated generally at 282 and, thereby, enable the one-shots to generate clock signals that are applied to the clock input, Cl, of the address generator 280. The address generator 280 activates the lines 278 and 279 by shifting a high logic state signal (resulting from its being cleared) successively onto its outputs QA-QD in response to the clock signals provided by the string of one shots. The generator 280 cooperates with the time delay circuit indicated generally at 281 and the address generator 285 to provide the proper sequence of read address signals to the memories 230. The gate signal provided by the one-shot 256 is also coupled to the load input of the address generator 258 and places the generator in a condition whereby it is unresponsive to the 10.7 MHz clock signal and any signals on its inputs A-C are coupled directly to its outputs that are connected to the address lines 260. The address lines 278 extending to the multiplexing switch 270 are activated by the address generator for directing the successively received analog values of the samples to the proper output line 272-276. The multiplexing switch 270 is enabled to transfer the analog values by the coupling of a sampling control signal via line 283 to the inhibit input of the switch 270. The sampling signal is generated by the one-shots 282 to occur a selected interval after each activation of one of the outputs QA-QD of the shift register 280 so that the A/D converter 266 has adequate time to convert each digital sample to an analog value for application to the multiplexing switch 270 before the switch is addressed. The clock generator and burst store circuitry 42 has one horizontal line interval to detect and correct any changes that may occur in the locations of the sampling points of the burst. Therefore, the one shots 282 is arranged to provide the clock pulses to the address generator 280 and the sampling control signal to the multiplexing switch 270 during such one television line interval so that the rephasing of the clock signals employed to effect the sampling of the following television line interval is accomplished before its arrival at the input of the A/D converter 36. Termination of the reading of the samples from the memories 230 is accomplished by deactivating the one-shot clock generator 282 by activating the QD output of the shift register generator 280 after the sequence of read address have been provided.

The value of the most positive sample appears at output line 290 of operational amplifier 292, the value of the most negative sample appears on output line 294 of operational amplifier 296 and the analog value of the zero crossing sample appears on line 298 which is the output of operational amplifier 300. The most positive and most negative values on lines 290 and 294 are arithmatically subtracted with one another by being connected together through resistors 302 and 304 with the difference appearing on line 306 that provides one input to a comparator 308, the other input of which is supplied by line 298.

The manner in which the zero crossing detector 242 determines whether samples are being taken at the precise zero phase crossing point, the 120° and 240° phase points can be easily understood by referring to FIG. 22 which shows sampling points at the 0°, 120° and 240° phase points with respect to the single cycle of color burst depicted by the solid line. By applying the analog value of the three samples to the operational amplifiers 292, 296 and 300, the value of the most positive sample, i.e., the 120° phase sample will appear on line 290 and the negative sample will appear on line 294 which, when they are arithmatically subtracted from one another, will equal zero since the magnitude L1 will equal the magnitude L2. Thus, the value on line 306 will be zero when the samples are taken at the precise 120° and 240° phase locations. Similarly, the zero crossing value will appear on line 294 and the comparator 308 will compare zero with zero and produce no DC error correcting voltage.

However, in the event the sampling is not being performed on the precise desired locations as depicted, for example, by the dotted representation of a cycle of color burst in FIG. 22, then the difference between L3 and L4 will result in a voltage on line 306 applied to the comparator 308 and the zero crossing sample will also have a value that is negative as opposed to zero, which will be applied to the other input of comparator 308 and a resulting DC error correcting voltage will be produced on line 310. Thus, by using one or more combinations of three successive samples, an error correcting voltage can be generated that will be used to rephase the 3.58 MHz clock that is used for performing the actual sampling by the A/D converter 36 and to control other circuit components during the recording process. The error voltage produced by the comparator 308 on output line 310 is then applied to a buffer operational amplifier 312 and provides an error correcting signal on line 244 which is connected to a monostable multivibrator or one-shot 316.

As shown in FIG. 19b, the line 234 originates in the clock generator portion of the Time Base Corrector Model No. TBC-800 as previously mentioned and the signal on line 234 is an analog voltage at a frequency of 3.58 MHz. It is applied to a comparator 318 which produces a square wave that is applied to a one-shot 320 that positions the square wave signal and applies it to the one-shot 316. The error voltage on line 244 modulates the length of the output of the multivibrator 316 on line 324 and thereby phase adjusts the 3.58 MHz signal. This phase adjusted 3.58 MHz signal is applied to another monostable multivibrator 326 which produces a square wave. Subsequent circuit components indicated generally at 327 effectively convert the square wave to a sine wave on line 328 which is again converted to a square wave by other circuitry in the clock generator of the TBC-800 and which appears on line 238. It should be appreciated that conversion from a square wave to sine wave and the converse is easily accomplished and the reason that the output signal from the multivibrator 326 is converted to a sine wave is that the clock generator uses the sine wave to produce a synchronized 10.7 MHz signal in the reference clock generator of the TBC-800 and the phase shifting that is performed by the circuitry 236 will therefore simultaneously phase shift the 3.58 as well as the 10.7 MHz signals.

The error voltage from the amplifier 308 appearing on line 310 is also extended downwardly to the limit detector 246 which monitors the voltage levels and provides a signal on line 330 that is applied to a flip-flop 332 having an output line 248 which extends to the circuitry of the TBC-800 which controls the operation of the first burst store 228. When the line 248 is low, it inhibits the application of the write enable signal to the memory of the burst store, thereby inhibiting the refreshing of the first burst store 228. This occurs when the voltage on line 310 is within a predetermined limit. A new series of samples are loaded into the burst store 228 when line 248 is high as a result of the voltage on line 310 being outside the predetermined limit.

As described hereinabove, the second burst store 230 is controlled to receive samples of the color burst associated with every second horizontal line interval of the input color television signal. This simplifies the circuitry required to construct the second burst store. However, the second burst store 230 could be arranged to receive and process the samples of color burst associated with each horizontal line interval of the color television signal for the purpose of correcting the phase of the clock signals provided on lines 238 and 239 for effecting the sampling of the color television signal.

With respect to the digital synchronization sequence that is combined with the video data interval by the adder circuitry 40 to form the processed television signal, as has been broadly described in conjunction with the block diagram of FIG. 1, and referring to the timing diagrams of FIG. 6, the circuitry that inserts the digital synchronization sequence will now be described in conjunction with a block diagram shown in FIG. 12.

The video digital data from the A/D converter 36 appears in the form of eight lines of parallel digital information on lines 38 which are applied to one set of inputs of a 2-to-1 switch 340, which has another set of inputs 342 upon which the digital synchronization sequence is applied. The switch 340 selects either the set of input lines 38 or 342 and passes the data from one set or the other to lines 48 which extend to the circuits 50 and 52. The switch 340 is controlled by a signal on line 344 which is controlled by a clock sequence generator 346. The digital synchronization sequence adder circuitry 40 has a composite sync signal applied on line 348 which originates at the input processing circuitry 32 and the composite sync is separated by a sync separator circuit 350, which provides the vertical sync signal on output line 352 and horizontal synchronization signals on line 354. Both of these separated signals are applied to a field decode and logic circuit 356 and the H horizontal synchronizing signals also are applied to a 1050 counter and logic circuit 358 as well as to a subcarrier phase to horizontal sync synchronization circuit 360.

Since the NTSC four field sequence contains a total of 1,050 horizontal lines, the H sync being applied to the 1050 counter logic enables it to provide unique output signals on lines 364, 366, 368 and 370, which correspond to the first line of each field and which are applied to the field decode and logic circuitry 356 to enable it to provide signals on a frame identification output line 372 as well as on a field identification output line 374. These lines extend to a programmable read only memory (PROM) and signal generator 376 as well as back to the 1050 counter and logic circuitry 358. Line 370 from the 1050 counter and logic 358 is also applied to the PROM and signal generator 376 so as to identify the start of each four field NTSC sequence. A signal on line 375 is also applied to the AND 345 and is effective to provide a control signal thereto that is delayed for the horizontal line interval and is active for the duration of the active video interval which results in the application of a unique digital word being successively asserted on the data stream each 1050th line, i.e., every fourth field, for use by the servo related circuitry 200. Also, eleven lines 377 and 379, which provide the actual horizontal video line number of the 1050 counter 358, extend to the PROM and signal generator 376 for insertion into the synchronization sequence. The synchronization circuitry 360 is effective to synchronize the subcarrier phase to horizontal sync and provides a reset pulse on line 378 that resets a 455 counter and programmable read only memory (PROM) 380, the counter of which has a terminal count equal to the number of subcarrier cycles in two video lines, it being understood that there are 227.5 cycles of 3.58 subcarrier in each video line for an NTSC system.

The counter and PROM 380 are operable to generate basic timing signals for controlling an address counter 382 as well as the clock sequence generator 346 for inserting the digital synchronization sequence into the digital color television signal during the appropriate part of the horizontal interval and, thereby, form the processed color television signal. The PROM circuitry and 455 counter 380 also provide signals on line 384 which specify whether a line is an even or an odd television line and line 384 is connected to the field decode and logic circuitry 356, the PROM and signal generator 376 and to the synchronization circuitry 360. The 455 counter and PROM circuitry 380 also provide clock sequence signals on line 385, sync word control signals on line 386 and a sequence end signal on line 387, all of which are applied to control the operation of the clock sequence generator 346. Additionally, the 455 counter and PROM circuitry 380 provides a window of one subcarrier cycle on line 388 which is applied to the synchronization circuitry 360 for use in synchronizing the subcarrier phase to the horizontal sync signal. The 455 counter and PROM circuitry 380 also provide various 3.58 MHz related control signals that are applied to switching circuitry 196 for supplying the record 3.58 clock to the memory RAM 1 through RAM 4 using the record 3.58 MHz signal that is derived from the phase shift clock generator and burst store circuitry 42 that has been described with respect to the block diagram of FIG. 11. The 455 counter and PROM 380 control the address generator 382 which addresses, via lines 390, the PROM signal generator 376 that generates the ID 1 and ID 2 sequences in the tenth and twelveth cycles (labeled Nos. 9 and 11 in the specific circuitry herein) of the digital synchronizing sequence, as well as the framing information contained in the eleventh cycle thereof. Moreover, it generates the binary coded number 5 which is used in the "005" clock sequence contained in the first nine cycles of the synchronization sequence, all of which have been described herein with respect to FIG. 6. The actual generation of the 005 sequence is accomplished by the PROM and signal generator 376 together with the clock sequence generator 346, with the latter generating zeros at the appropriate times and the PROM signal generator 376 generating the number 5 where it is to be inserted. As will be appreciated from the ensuing description thereof, the PROM and signal generator 376 could be used to generate the entire "005" sequence if desired.

Figure 12:
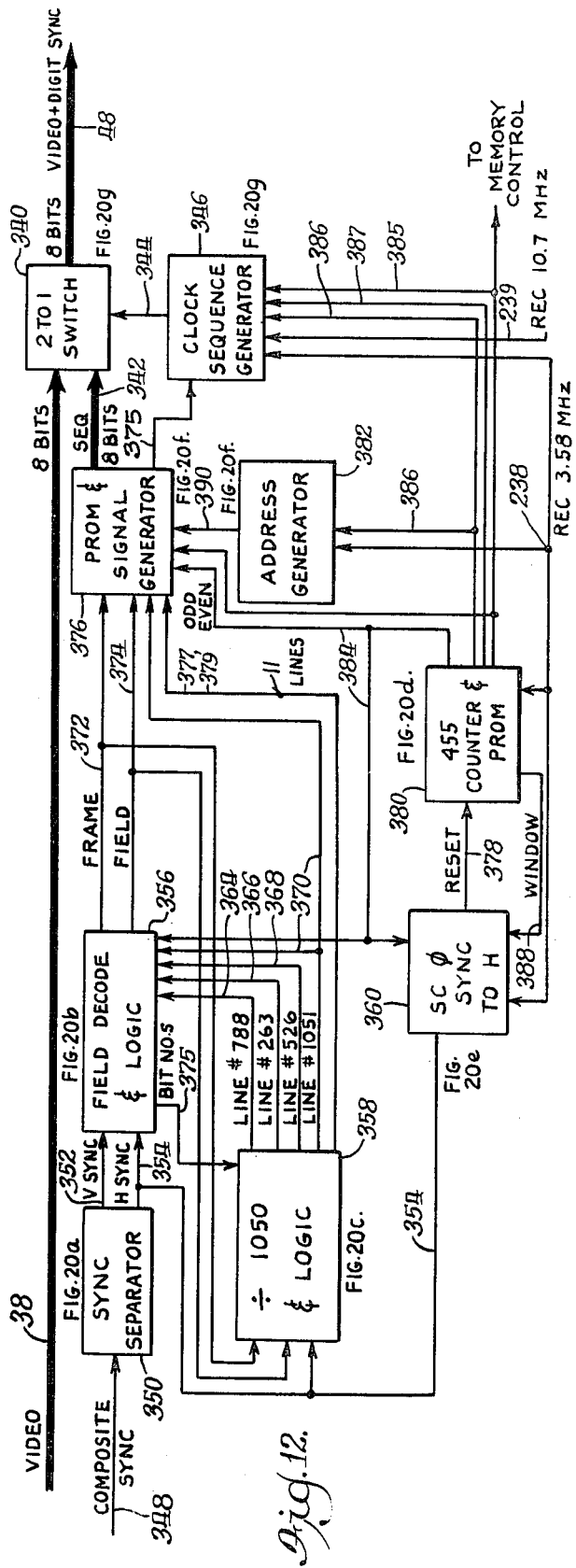
FIG. 12 is a functional block diagram of circuitry for inserting the digital synchronizing sequence that is added in during the horizontal blanking interval as shown in FIG. 6, lines (2), (3) and (4).

The specific circuitry that can be used to carry out the operation of the block diagram shown in FIG. 12 is illustrated in FIGS. 20a, 20b, 20c, 20d, 20e, 20f and 20g, each of which contains circuitry that comprises one or more of the blocks of FIG. 12 and which are interconnected with the illustrated lines between the blocks. Moreover, the schematic circuits specifically illustrated in the particular FIG. 20 drawing are identified adjacent the corresponding block thereof in FIG. 12. The operation of the circuitry will now be broadly described in conjunction with the specific schematic diagrams.

Figure 20A:
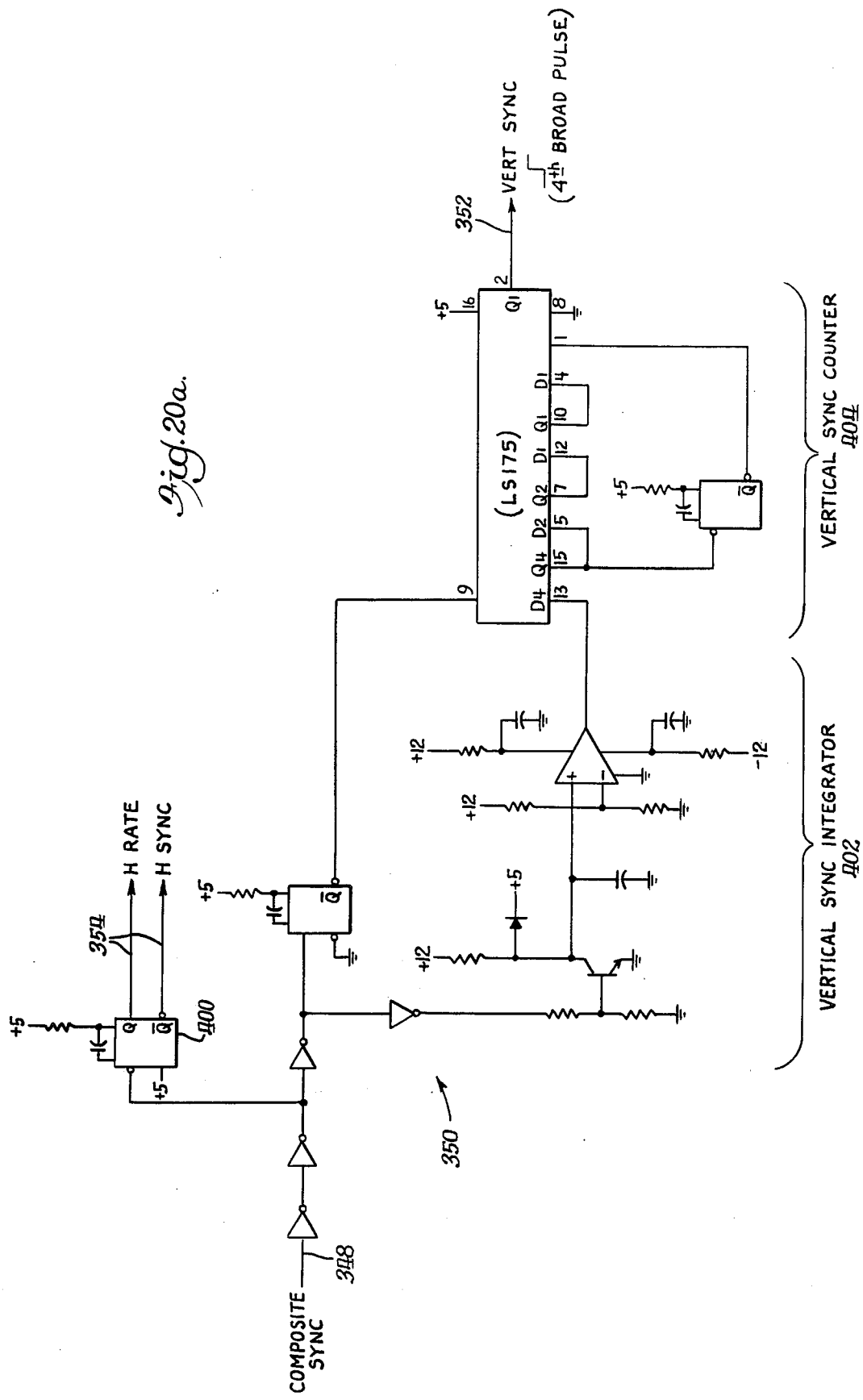

Turning initially to FIG. 20a, the composite sync signal is applied at input line 348 and is used to trigger a monostable multivibrator 400 which has complementary outputs on lines 354 which provide the horizontal rate and horizontal sync signals. The composite sync signal is also applied to vertical sync integrator circuits indicated generally at 402 which is connected to a vertical synchronization counter 404 that has an output line 352 which generates a vertical sync signal at the fourth broad pulse of the vertical sync signal.

Figure 20B:
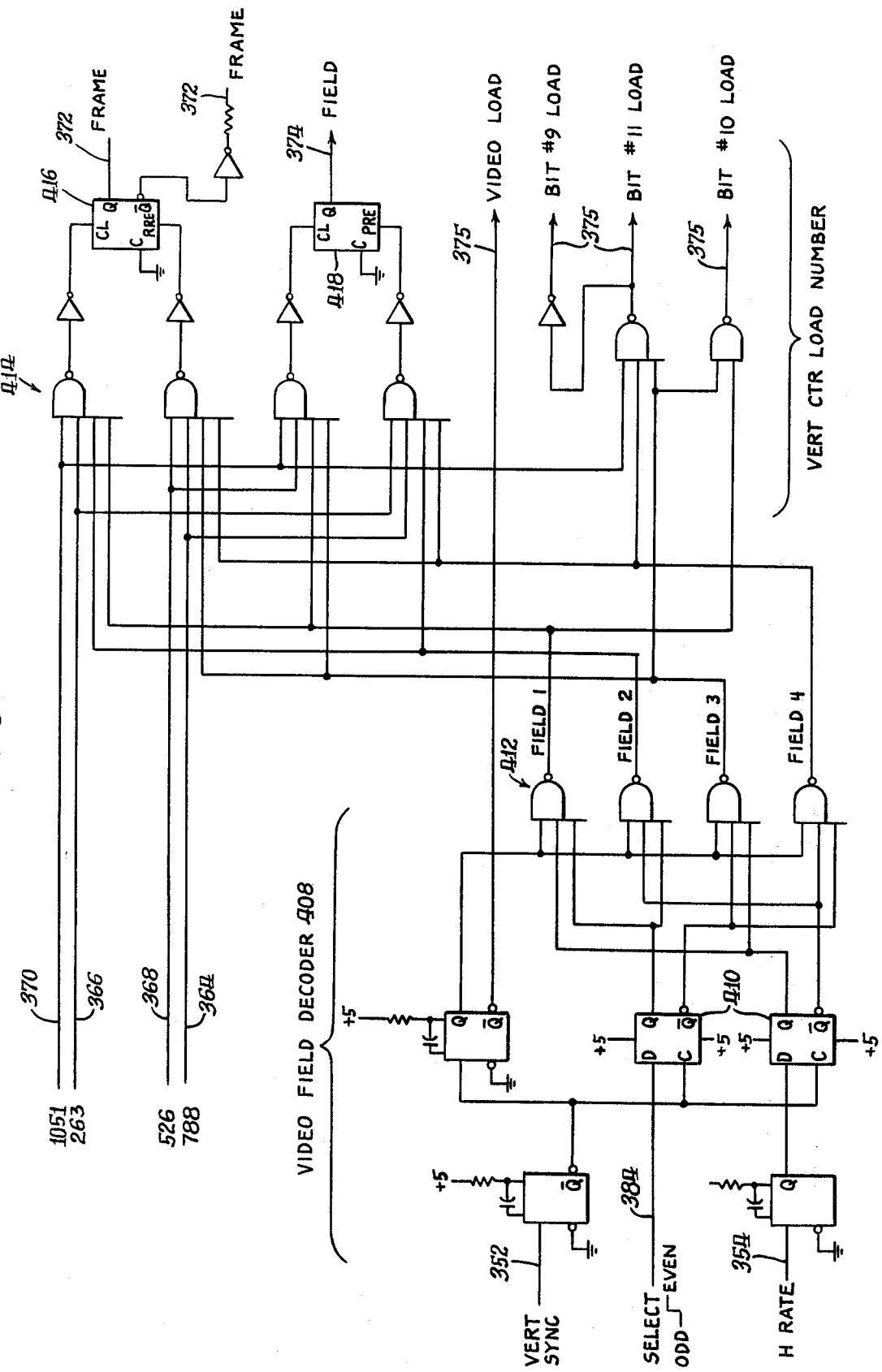

Turning to FIG. 20b, the vertical sync and horizontal rate signals are applied via lines 352 and 354, together with the even or odd line information on line 384 to a video field decoder 408 which includes a pair of flip-flops 410 that have output lines that are connected to logic gates, indicated generally at 412, which provide steering information identifying the four fields of an NTSC sequence, with the outputs of these gates being true for a short 2 microsecond pulse during preselected lines of each of the fields. Thus, the outputs of the logic gates 412 are applied to another set of NAND gates 414 which, together with lines 364, 366, 368 and 370 from the 1050 counter and logic circuitry 358 provide steering and thereby insures that the information is synchronized. The logic gates 414 selectively either clear or preset flip-flops 416 and 418 which have respective output lines 372 and 374 which provide the frame and field identification information for the PROM and signal generator 376. The circuitry of FIG. 20b also provides bit loading numbers as well as a video load signal on lines 375 that are applied to the 1050 counter and logic circuitry 358.

Figure 20C:
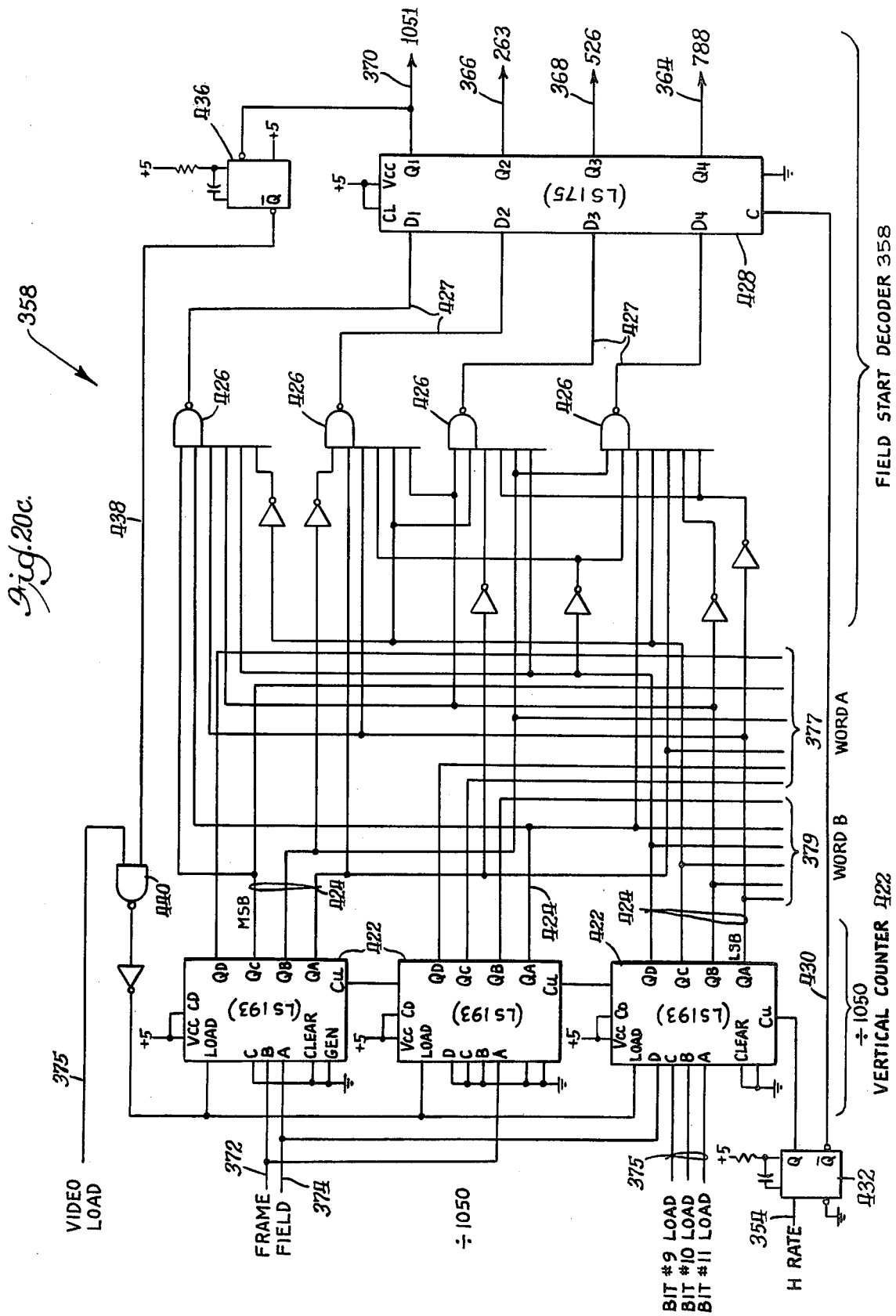

With respect to the 1050 counter and logic circuitry shown in FIG. 20c, the frame and field information lines 372 and 374, and the horizontal sync clock line 354 are connected, together with the video load and bit load lines 375 to a 1050 counter 422 which has selected output lines 424 that extend to logic circuitry indicated generally at 426. Also, the entire 12 lines of the counter, comprising the 6 most significant bit lines 377 and the 6 least significant bit lines 379 are connected to 4-to-1 switches associated with the circuitry shown in FIG. 20f as will be described herein. The logic circuitry 426 has four lines 427 that are connected to flip-flop integrated circuits 428 and the signals applied via lines 427 are clocked through the flip-flops 428 and provide the signals on lines 364, 366, 368 and 370, which identify the horizontal lines 788, 263, 526 and 1051, respectively, which are the first lines of each field in a four field NTSC sequence. The flip-flops 428 merely reclock the signals from the logic 426 in accordance with the horizontal rate being applied on line 430 from a monostable multivibrator 432 that is triggered by the H rate signal on line 354. The outputs on lines 364, 366, 368 and 370 are maintained true only for the duration of the corresponding line occurrence. Line 370 is also connected to a monostable multivibrator 436 which has an output line 438 to a NAND gate 440 which is enabled by the video load line 375 which causes the counter to be reset or reloaded when it has reached the terminal count of 1050.

Figure 20D:
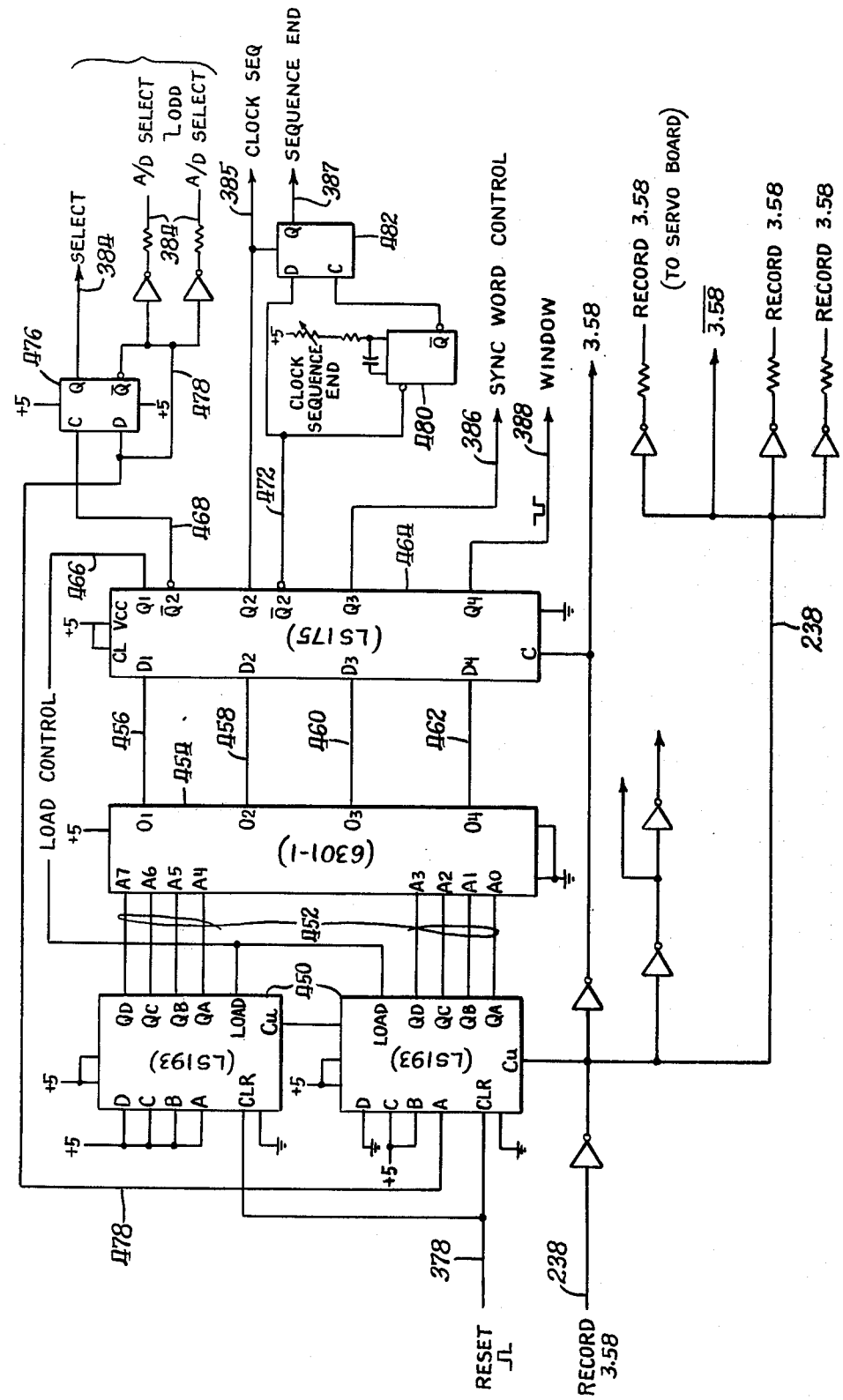

With respect to the 455 counter and PROM circuitry 380 shown in FIG. 20d, a reset pulse on line 378 is applied to a counter 450 which has a terminal count of 455 and which is reset by the reset pulse which is synchronized on the proper odd line as determined by the synchronization circuitry 360. The counter 450 is clocked by a record 3.58 MHz clock on line 238 and has output lines 452 which control a programmable read only memory (PROM) 454 having output lines 456, 458, 460 and 462 on which true signals are asserted at the proper addresses in accordance with the program in the memory at the addresses determined by the signals from the counter on lines 452. The output lines of the PROM 454 are clocked through the flip-flops 464 and provide signals on output lines 466, 468, 386, 472, 385 and 388, which extend to various locations of the circuitry, including the clock sequence generator 346 as well as the PROM and signal generator 376, address generator 382 and the synchronization circuitry 360. More specifically, line 456 from the PROM 454 provides a load pulse which is clocked through the flip-flops 464 with the Q output line 466 providing a load control to the counter 450, while the $\overline{Q}$ output 468 clocks a second D flip-flop 476 which provides the even or odd identification information for a particular television line on output lines 384 and 478. Line 478 is also extended back to an address input of the 455 counter 450 and indexes the counter to alternately load the number 246 and 247 on successive television lines so that at the end of two lines, 455 counts will be produced which correspond to the total number of whole subcarrier cycles that occur in two television lines. Line 458 from the PROM 454 is clocked through the D flip-flop 464 and provides a clock sequence signal on line 385. The $\overline{Q}$ output line 472 is connected to a monostable multivibrator 480 and D flip-flop 482 and provides a sequence end signal on line 387 that is supplied to the clock sequence generator 346. Line 460 from the PROM 454 is clocked through the flip-flop 464 and provides a sync word control signal on line 386 that is applied to the clock sequence generator 346 as well as the address generator 382 that controls the PROM signal generator 376. The output line 462 from the PROM 454 is clocked through a flip-flop 464 and provides a window of one subcarrier cycle on line 388 which is applied to the synchronization circuit 360.

With respect to the PROM signal generator 376, and referring to FIG. 20f, the frame and field information on lines 372 and 374, respectively, are applied to the programmable read only memories PROM 376 together with the line 384 that identifies whether a television line is an even or an odd numbered line and this information is applied to three addresses of the PROM 376. Other address information is generated by a sequence address generator 480 which is clocked by the 3.58 MHz clock on line 238 and is cleared by the sync word control signal on line 386. The address counter 480 has output lines 482 that extend to four address inputs of the PROM 376 and together with a signal generated by line number 1050, being applied to line 370 and sequenced through two monostable multivibrators 483 and 484, is asserted on line 486 that is also applied to one of the address lines of the PROM 376. The first multivibrator 483 delays the triggering of the second multivibrator 484 until the horizontal blanking interval has ended and then the multivibrator asserts an active signal on line 486 for a period corresponding to the video interval. This results in the unique word from the circuit 376 to be inserted into the data stream during the active video for one line of each four fields for use by the servo to obtain vertical synchronizing information. The output information from the PROM 376 appears on lines 488 which are clocked through D flip-flops 490 and provide eight bits of information on lines 341 that are connected to the 4-to-1 switch 491.

The information that is supplied by the PROM and signal generator 376 contains the ID 1 and ID 2 information in the tenth and twelfth cycle locations of the twelve cycle sequence, as well as the frame and field information in the eleventh cycle. In this regard, on odd television lines, the ID 1 is the binary coded decimal number 2 and the ID 2 is the binary coded decimal number 10. Similarly, for even numbered television lines, the ID 1 is the binary coded decimal number 20 and ID 2 is the binary coded decimal number 40. The framing information identifies which frame, whether it is the first or second frame of the NTSC sequence as well as the first or second field thereof. By utilizing both the frame and field information, the specific field of the four field sequence can be determined on a line-by-line basis. As previsouly mentioned, the horizontal line number of the lines for a full four field sequence (or a full 8 field sequence for the PAL or SECAM system) is preferably inserted in the eleventh cycle of the digital synchronization sequence and is done by selective operation of the 4-to-1 switches 491. In this regard, lines 341 supply the data from the PROM 376 and is passed through the switches 491 except during the eleventh cycle when the framing information is asserted. This is accomplished by selectively controlling the switches 491 to sequentially pass the data for word A from lines 377, the data for word B from lines 379 and the data for word C from the remaining input lines 381 generated by circuitry that is not shown.

To control the switching of the switches 491, the clock sequence signal on line 385 is used to trigger a monostable multivibrator 493 at the end of the clocking sequence, i.e., at the end of the first 9 cycles of the synchronization sequence shown in FIG. 6(2). The monostable multivibrator 493 provides a delay equal to one cycle of the sequence, specifically the cycle containing ID 1 and then triggers a second monostable multivibrator 497 which provides a one cycle duration pulse on lines 499 that steers flip-flops 501 and 503 to synchronize the address control signals on lines 505 and 507 extending to the address data selectors 491 with the input data. The flip-flops 501 and 503 have output lines 505 and 507 extending to the 4-to-1 switches 491 and generate the addresses for sequentially selecting lines 377, 379 and 381 during the eleventh cycle and then selects lines 341 for the twelfth cell containing ID 2 and maintains this address until the end of the next clock sequence occurring at the next horizontal line. The flip-flops are clocked by the record 10.7 MHz clock on line 239 so that the three words A, B and C can be inserted in the single cycle of the sequence that occurs at the rate of 3.58 MHz.

The PROM 376 also generates the binary coded number 5 that is used in the nine cycles of clock sequence previously described with respect to FIG. 6. After the data has been clocked through the flip-flops 490 using the 3.58 MHz clock applied via line 238, the data on lines 342 is applied to 2-to-1 switches 340 which are shown in FIG. 20g.

As shown therein, the switches either select lines 342 or lines 348 and presents the data from the selected lines on output lines 492 and the data is reclocked by D flip-flops 495 and appears on lines 48 that extend to the switches 50 and 52 shown in FIG. 1. It should be appreciated that the flip-flops 495 are clocked using the record 10.7 MHz clock signal that is applied on line 239 that extends to the clock input of the flip-flop 495, whereas the data from the PROMs 376 is presented using a clock rate of 3.58 MHz. Thus, if the data presented by the PROM has a duration of one cycle of the 3.58 MHz clock, then it will be clocked onto the lines 48 three times using the 10.7 MHz clock. Thus, the ID 1 and ID 2 information is repeated three times in the data stream on line 48. However, with respect to the "005" clock sequence described with respect to FIG. 6, the number 5 is only asserted on lines 492 by the switch 340 during the final cycle of 10.7 or, stated in other words, during the last ⅓ cycle of the 3.58 clock interval. This is accomplished by using line 496 to enable only the number 5 to be asserted on lines 492 during this desired time period. When line 496 is at a high level, then the switch 340 provides zeros at all output lines 492 and the D flip-flop 494, which is controlled by clock sequence generator 346, is caused to provide this level during the first ⅔ of each cycle of subcarrier during the nine cycles where the "005" clock sequence is to be generated. The sequence end signal on line 387 disables the flip-flop 494 at the end of the nine cycles of the clock sequence. The 2-to-1 switch 340 otherwise selects between the lines 342 and lines 348 by the control of select line 498 which, when low, selects lines 348 and when high, selects line 342. The line 498 is controlled by a flip-flop 500 and is preset by the clock sequence signal on line 385 and is clocked by line 502 that is connected to a monostable multivibrator 504 that is triggered by a sync word control signal on line 386.

The circuitry of FIG. 20g also performs another function that effectively protects the word synchronization detection circuitry in the decoders 138 and 140. In this regard, the word synchronization is detected by detecting the "005" sequence, which comprises 24 consecutive 0's followed by the logical states 101. Because this "005" sequence is provided during the synchronization sequence, it should only be detected during this time and the circuitry of FIG. 20g prevents this sequence from occurring at any time other than during the synchronization sequence. This is accomplished by forcing the least significant bit of the 8 bit digital words to a logical 1 state any time the words contain all logical 0's during the active video portion of the data stream, i.e., at any time other than during the synchronization sequence. This is accomplished by a NAND gate 508 having the data lines 38 applied to the inputs and providing an output signal that is applied to the D input of a flip-flop 509 when all 0's are present on the lines 38. A line 511 from the flip-flop 500 effectively disables the flip-flop 509 during the synchronization sequence so that a logical 1 will not be asserted during the time when the consecutive 0's are to be present. However, during the time when the active video is occurring, whenever all logical 0's are present on the video lines 38, the flip-flop 509 will provide an output signal on line 515 which presets a flip-flop 517 and forces it to a logical 1 as is desired.

The remaining portion of the block diagram shown in FIG. 12 for which specific circuitry has not been described concerns the synchronization circuitry 360 shown in FIG. 20e which provides the reset signal to the 455 counter and PROM 380 at the proper time by insuring that the subcarrier phase is synchronized to horizontal sync. Stated in other words, the circuitry shown in FIG. 20e determines that the phase of the subcarrier is synchronized with respect to horizontal sync by insuring that the H sync is phased to occur in the middle of a subcarrier cycle. The circuitry essentially establishes the even or odd relation of the lines by making a decision with respect to the location of the horizontal sync relative to subcarrier and thereafter maintaining the relationship so that the odd designated lines are always odd and even lines are always even. The circuitry thereby defines whether a line is even or odd and maintains that relationship throughout the recording of the data so that no problems with respect to this relationship will exist during subsequent reproducing.

To accomplish this decision making and referring to FIG. 20e, the horizontal sync signal from the sync separator 350 is applied via line 354 to a centering monostable multivibrator 510 which is capable of moving the phase of the horizontal sync forward or backward as a result of controlling the conduction of a transistor 512 which can vary the pulse width of the output of the one-shot 510. The output of a monostable multivibrator 510 appears on line 513 which is applied to another monostable multivibrator 514 that asserts a relatively narrow pulse on line 516 which is directly connected to a NAND gate 518 and also via line 519 and a number of components 520 which generate a propagation delay. When the signal designating a line as being even or odd appearing on line 284 is also applied to the NAND gate 518, the gate 518 asserts an extremely narrow pulse of 20-30 nanoseconds on line 522 which clocks a flip-flop 524 to which the D input is supplied by the one cycle of subcarrier via line 388. The even or odd defining signal on line 384 is synchronized to the subcarrier and is also applied via inverter 526 to one input of a NAND gate 527 which has other inputs supplied by the line 516 and line 519 from the propagation delay 520 so that NAND gate 527 also produces a narrow 20-30 nanosecond pulse on line 528 which is inverted by inverter 530 and is applied via line 532 to a clock input of a second flip-flop 534, the D input of which is also supplied by the line 388. Thus, the flip-flops 524 and 534 are clocked by signals that are synchronized to H rate which provide timing signals on lines 536 and 538 which are clocked into D flip-flops 540 and 542 using the subcarrier synchronized signal on line 384 and provide four possible conditions at the outputs of the flip-flops 540 and 542, i.e., one or both of the clocks applied via lines 532 and 522 may be inside or outside of the window. The logic and other circuitry indicated generally at 544 examine these possible conditions and provide a signal on line 546 which effectively controls conduction of the transistor 512 to advance or retard the H sync position to clearly select one cycle of subcarrier in the middle of which the horizontal sync is to be located. The 3.58 clock signal on line 238 clocks a flip-flop 550 which has the D input supplied via line 552 from the monostable multivibrator 514. The output 558 of the flip-flop 550 is coupled through a series of components 554, which provide a propagation delay, to one input of a NAND gate 556, which has a second input which is directly supplied by line 558. The NAND gate 556 generates a narrow pulse on line 560 from the signal provided by flip-flop 550, which enables NAND gate 562 to generate the reset pulse that is placed on line 378 when the signal on line 564 is activated by the circuitry 544. Thus, the reset pulse occurs at a time that is precisely in the middle of a subcarrier cycle and thereby always resets the 455 counter at the proper time on an odd line.

Figure 18A:
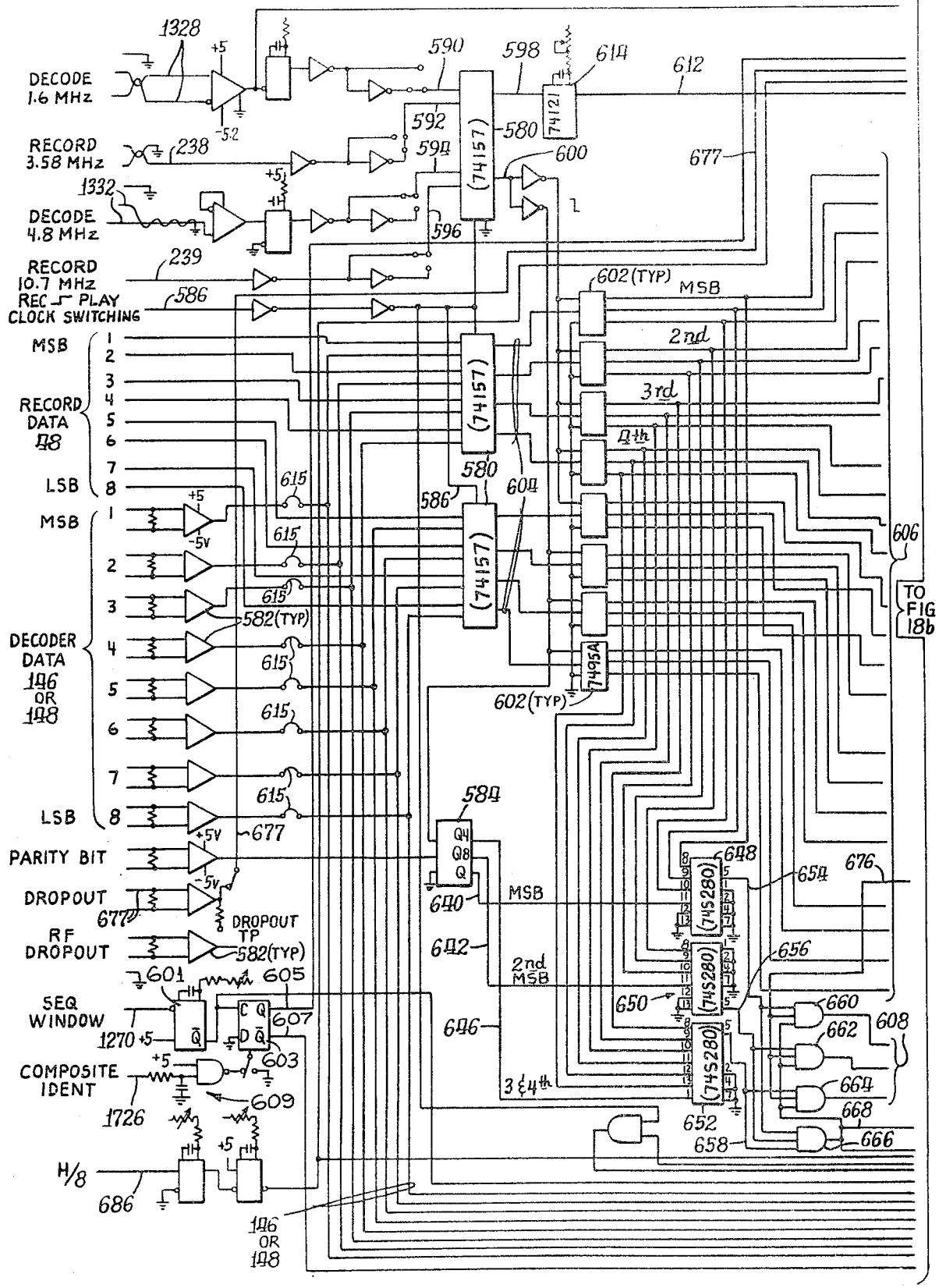
FIGS. 18a and 18b together comprise an electrical schematic diagram of an 8-to-24 bit converter, a 2-to-1 switch, identification number decoders, drop-out processing circuitry and parity checking circuitry.
Figure 18B:
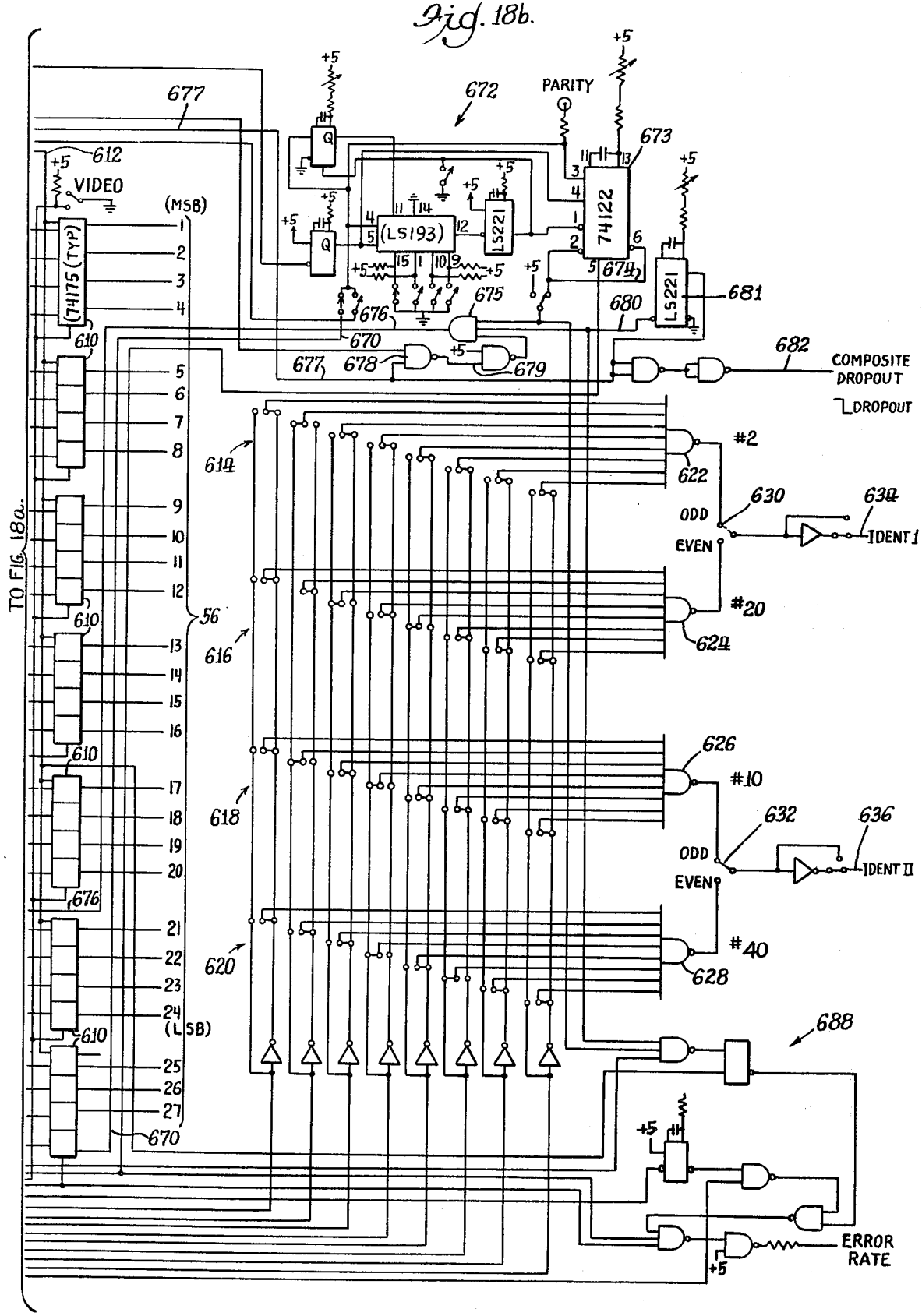

The processed television signal, containing the digital synchronization sequence, is applied on the eight lines 48 that extend to the switches 50 and 52, one of which is shown in detail in FIGS. 18a and 18b which together comprise an electrical schematic circuit diagram of the switch 52 and the line identification decode circuitry that is used to control the switches 128 and 130 via line 142, from logic circuitry 200. Turning initially to FIG. 18a, the eight lines 48 containing the data to be recorded is applied to one set of inputs of a 2-to-one switch 580, which selects between lines 48 or the sets of lines 148 carrying the reproduced data from the decoder, drop-out processing, clock acquisition and deserializing circuitry 140. The lines 148 have MECL level signals which are converted to TTL levels by circuits indicated generally at 582 and all of the inputs except for the parity bit are applied to the alternate terminals of the 2-to-1 switches 580. During recording, the lines 48 are selected and during reproducing the lines 148 are selected. In this regard, it should be appreciated that the entire circuitry shown in FIGS. 18a and 18b is duplicated and that one set of lines from the decoder circuits in one of the channels consist of lines 146 while the lines from the decoder circuit of the other channel consists of lines 148. The selection of either set of input lines to the 2-to-1 switch 580 is controlled by a line 586 which is controlled by logic in response to the selection of either a recording or reproducing operation. When the level on line 586 is low, the lines 48 carrying the processed television signal to be recorded are selected and the signal is passed through the switch 580 for eventual application to the memories RAM 2 and RAM 4. When the level is high, the reproduced processed television signal received from the decoder and passed through the switch 580 for eventual application to the memories.

The data lines 148 also include a parity bit line, but it is not applied to the 2-to-1 switch but is rather connected directly to an input of a shift register 584. The 2-to-1 switch 580 also has clock inputs which include 1.6 MHz and 4.8 MHz reproduce clocks received from the decoder via lines 590 and 1328 and lines 1332 and 594, respectively and 3.58 MHz and 10.7 MHz record clocks received from input clock generator circuit (FIG. 11) via lines 238 and 592 and lines 239 and 596, respectively. As previously described with respect to the block diagram in FIG. 1, the clock rate of the 8-bit parallel data that is received on lines 48 by the 2-to-1 switch 580 for writing into the random access memories 60–66 during the record operation is essentially at the sampling rate of 10.7 MHz while the 9-bit parallel data that is received from the decoders on lines 146 or 148 during the reproduce operation is at the rate of 4.8 MHz. The received data is transmitted to the memories 60–66 as 24-bit parallel data at a 3.58 MHz rate during record operations and at a 1.6 MHz rate during reproduce operations. The four clocks are applied to the 2-to-1 switch 580 which selects between the 3.58 MHz and 10.7 MHz record clocks or the 1.6 MHz and 4.8 MHz reproduce clocks. Thus, one of these sets of clocks, i.e., record or reproduce clocks, appears on line 598 and 600 and are used to control the timing of the components of the circuitry shown in FIGS. 18a and 18b. More specifically, the clock on line 600 controls the shift register 584 and a series of shift registers 602 which have input lines 604 comprising the data from the 2-to-1 switch 580. Each of the shift registers 602 and 584 receives three consecutive bits of data and transfers them to output lines 606 which comprise 24 bits of data. Three output lines 608 from a parity check circuit are also added to the 24 bits of information and the lines 606 and 608 are applied to a series of D flip-flops 610 which reclock the data using the record 3.58 MHz signal on line 612 that is connected to line 598 via a pulse shaping monostable multivibrator 614. The outputs of the flip-flops 610 are lines 56 which are the input lines to the memories RAM 2 and RAM 4. It should be understood as previously mentioned, that while the block diagram in FIG. 1 illustrates the record and reproduce paths as separate paths, the actual conductors are the same, by virtue of the 2-to -1 switch 50. The two paths shown in the block diagram were illustrated in that manner for the sake of clearly identifying the data flow during both operations.

The foregoing description of FIGS. 18a and 18b complete the circuit operation that occurs during a recording operation, but as is evident from the drawing, other circuitry is included therein which comes into operation during reproducing and which will now be described. With the input lines 148 being converted to TTL levels, these lines are applied through jumpers 615 to the 2-to-1 switches and also extend downwardly and to the right to FIG. 18b where they are connected to a series of switches 614, 616, 618 and 620 which are set to decode the appropriate identification number so as to satisfy NAND gates 622, 624, 626 and 628 which respectively provide a true output when the respective ID numbers 2, 20, 10 and 40 are present in the reproduced data at the input line 148. The outputs of the NAND gates pass through switches 630 and 632 and present respective signals on lines 634 and 636 when the ID 1 and ID 2 numbers have been decoded. The signals on lines 634 and 636 are applied to the logic circuitry 200 which will be hereinafter described. Since the circuitry of FIGS. 18a and 18b will be duplicated, the switches 630 and 632 will be set in one position for one of the circuits and in the other for the duplicate circuitry. Since each of the signal channels contains either only even video lines and the other contains only odd lines, the switches 630 and 632 can be appropriately set to decode the numbers 2 and 10 or 20 and 40.

With respect to the use of parity in the apparatus to provide an indication whether the data has been accurately recorded and reproduced, the circuitry shown in FIGS. 18a and 18b performs parity checking and provides an error signal that commands the drop-out compensator to insert data at the location in the data stream where the data is indicated to be missing or incorrect. It should be recalled that the parity bit is added in the data stream by the encoder circuitry 82 before the data is recorded. During reproducing, the signal from the decoder and other circuitry 140 includes a parity bit data which is applied to the shift register 584 and for three successive 8 bit words, provides the most significant bit parity bit on line 640, the second most significant bit parity bit on line 642 and the third and fourth most significant bit parity bit on line 646, which are respectively connected to parity checkers 648, 650 and 652. The output lines 606 from the shift registers 602, as previously mentioned, contain the bit data for three successive samples and the most significant bit data from three successive samples of the data stream is applied to the parity checker 648. Similarly, the data of three successive samples of the second most significant bit are applied to the parity checker 650 and the data of three successive samples of both the third and fourth most significant bits are applied to the parity checker 652.

The logical state of parity bit is selectively added as either a logical 1 or logical 0 so that for three successive samples, including the parity bit, an even number of logical ones (no ones is considered even) obtains, and the parity checkers 648, 650 and 652 merely process the data applied thereto and provide a true signal on outputs 654, 656 and 658 if an even number of ones is received. The signals are respectively applied to AND gates 660, 662 and 664. Also, all three of the output lines are applied to another AND gate 666. If all outputs are true, AND gate 666 provides a high true output on line 668 which enables the other AND gates 660, 662 and 664 in addition to providing a true signal that is clocked through the flip-flops 610 to provide a signal on line 670 that extends to logic circuitry indicated generally at 672, the operation of which will be described hereinafter. If even one of the parity checkers detects a parity error, then all parity channels are forced to provide the same indiction, by virtue of line 668 disabling the AND gates 660, 662 and 664. The outputs of AND gates 660, 662 and 664 comprise the lines 608 which are clocked through the flip-flop 610 and provide signals for use by the drop-out compensator to specify that one or more of the first four most significant bits of three successive samples contains a parity error or that a RF drop-out has occurred and that other data should be inserted therefor.

The parity error signal on line 670 is applied to circuit 672 which effectively integrates the error signal by determining if it exceeds about four closely located groups of three samples. If so, it triggers a monostable multivibrator 673 having an output line 674 which is applied to OR gate 675, the output of which is applied via line 676 to the AND gates 660, 662 and 664 and disables them for a longer tine than is actually indicated by the parity checker outputs, i.e., for another 3 to 6 samples. This is to safeguard against the possibility that random noise could generate a true parity check in a series of bad cycles of data and thereby extends the duration of the parity error signals on lines 608. If random noise which generated a true parity output would be allowed to pass onto lines 608, the bad video data which parity falsely indicated as being good would cause either a flash or a black hole in the displayed video image. While random noise would not generate a significant number of true parity indications, the circuitry 672 disables such occurrence during the presence of a series of detected parity errors.

In accordance with another aspect of the circuitry shown in FIGS. 18a and 18b, in the event that the decoder circuitry 138 or 140 detects an RF drop-out, for example, when information is not reproduced due to an imperfection in the tape or the like, a drop-out indicative signal is generated and applied to line 677, which is converted to TTL levels and then applied to the circuitry 672 shown in FIG. 18b. The signal on line 677 is applied to gate 678 and its output is applied via line 679 to the gate 675 which forces a parity error signal on to line 676. The signal on line 677 also triggers a monostable multivibrator 681, which has output line 680 that is also applied to the OR gate 675. The output provided by the multivibrator 681 extends the duration of the drop-out and the forced parity error signal beyond its actual length, i.e., another six or nine samples for example, to permit internal clocks and the like to resettle after the drop-out has terminated. The signal on line 677 also provides a composite drop-out output signal on line 682 which is extended to logic circuitry 200 and essentially precludes that circuitry from processing the ID 1 and ID 2 signals for acquiring word sync. The H/8 signal applied to line 686 extends to circuitry shown generally at 688 which provides an error rate of the number of parity and drop-out induced errors that are occurring. Since the H/8 signal is the rate at which head switching occurs, and during this time period the errors should not be counted since they are not a true indication of the error rate occurring in the active video signal.

The generation of the drop-out signal provided on line 682 is inhibited during the synchronizing sequence interval by the sequence window signal provided on line 1270 (FIG. 18a) by the circuitry of FIG. 10. The sequence window signal triggers a one-shot 601 to set the following D latch 603 to place on its output lines 605 and 607 inhibit signals that are coupled to the circuitry to inhibit the generation of the drop-out signal. The inhibit condition remains on lines 605 and 607 until the composite ID signal is provided on line 1726 by the circuitry of FIG. 10. The composite ID signal is delayed by delay means so that the inhibit condition is removed from the lines 605 and 607 by resetting the D latch 603 just before the beginning of the video interval portion of the processed television line.

The 27 bits of data on parallel lines 56 are applied to the respective memories RAM 2 and RAM 4 for writing the data therein. Each of the random access memories RAM 1 through RAM 4 comprises specific circuitry, portions of which are shown in detail in FIG. 13. Those portions not shown in FIG. 13 are merely redundant of the general design of the circuitry. The input lines 54 or 56 are separated into three groups of nine lines, each group of which extends to a 256 bit random access memory integrated circuit 800 of which only 6 of the total of 27 are shown. Each set of the lines 54 or 56 is connected to the input terminal of the memory circuitry 800 as shown. Similarly, each of the memory circuits 800 has an output line 802 that extends to a tri-state gate 804 having an output line that is either line 70, 75, 150 or 154 depending upon which RAM is identified. However, the single output lines from each of the memory circuits 800 extends to the 2-to-1 switch 152, as well as to the 24-to-8 bit converters 72. Since the memories are connected to operate in pairs, i.e., memories RAM 1 and RAM 3 have their inputs and outputs interconnected as do memories RAM 2 and RAM 4, the tri-state NAND gates 804 effectively isolate the individual memory circuits 800 from output lines when they are not enabled so that only the outputs from individual memory circuits 800 for one of the random access memories, such as RAM 1 or RAM 3, for example, will be asserted onto the output lines 70 or 74.

Control lines 806, which have inverters therein as shown, enable and disable the tri-state NAND gates 804 at the appropriate times as shown and described with respect to the timing diagrams of FIGS. 4b and 5b. A write enable signal on line 808 is applied to a monostable multivibrator 810 which can be adjusted to position the write pulse with respect to the data and output line 812 is connected to the write enable input of each of the memory integrated circuits 800. The level of output line 812 controls whether a write or read operation can occur with respect to the memory. In the absence of a high write pulse on line 812, the memories are in a condition to read data from storage. When the write pulse is placed on the 812, the memories are conditioned to write data into storage for the duration of the write pulse. The timing for the write enable signal is shown for each of the random access memories RAM 1 through RAM 4 in FIGS. 4b and 5b.

Each of the memory circuits 800 is addressed via eight address lines 814 which are controlled by an address generator 816 so that, for any address generated by the address generator 816, all of the individual random access memory integrated circuits 800 will have the identical address being accessed. Thus, for the 27 bits of data that is input, one bit will be appropriately written into or read out of one of the memory circuits 800 for each address that is generated by the address generator 816. While only two of the address lines from the address generator 816 are shown to be actually connected in the drawing, it should be understood that the other six lines are similarly connected to the remaining address lines that are shown adjacent the memory circuits 800. The address generator 816 is clocked by clock line 818 from a monostable multivibrator 820 that is used to properly time the clocking with respect to the data on the input lines 54 and 56.

A clock signal applied on line 822 is used to trigger the monostable multivibrator 820 with a clock that is determined by the mode of operation, i.e., whether it is writing or reading during a recording operation or writing or reading during a reproducing operation. The clock is either a 3.58 MHz or 1.6 MHz clock and both of these frequency clocks originate from one or two sources. During a record operation, the data is written into the memories 800 at a rate of 3.58 MHz under the control of the record clocks provided by the clock generator circuitry 42. The data to be recorded is read from the memories at a rate of 1.6 MHz determined by a clock signal provided by the encoder circuitry 82. During a reproduce operation, the data is written into memory at the lower 1.6 MHz rate determined by a clock signal that originates from the decoder circuitry 138 or 140. The reproduced data is read from the memories at the rate of 3.58 MHz determined by a clock signal obtained from and synchronized to station reference. The clock on line 822 also is applied to trigger a monostable multivibrator 824 to properly time the write pulses with respect to the data that is present on the input line 54 or 56.

The address generator 816 is controlled during record and reproduce operations by reset signals placed on a line 830. The reset signals reset the counter 816 to zero and thereby insure that the data is written at address zero at the beginning of the digital synchronization sequence. The reset signal on line 830 originates at the logic circuitry 200. During reproducing or playback, the ID 1 and ID 2 control signals appear on lines 832 and 834, respectively, which are inverted and applied to a NAND gate 836 with line 834 being inverted again and applied to one address input of the address generator 816 so as to load it with the proper load number for writing data into the memories. A read reset signal on line 838 from the control logic 200, generates a load signal for loading the address generator 816 to begin reading the data from the memory at the proper time.

Figure 14A:
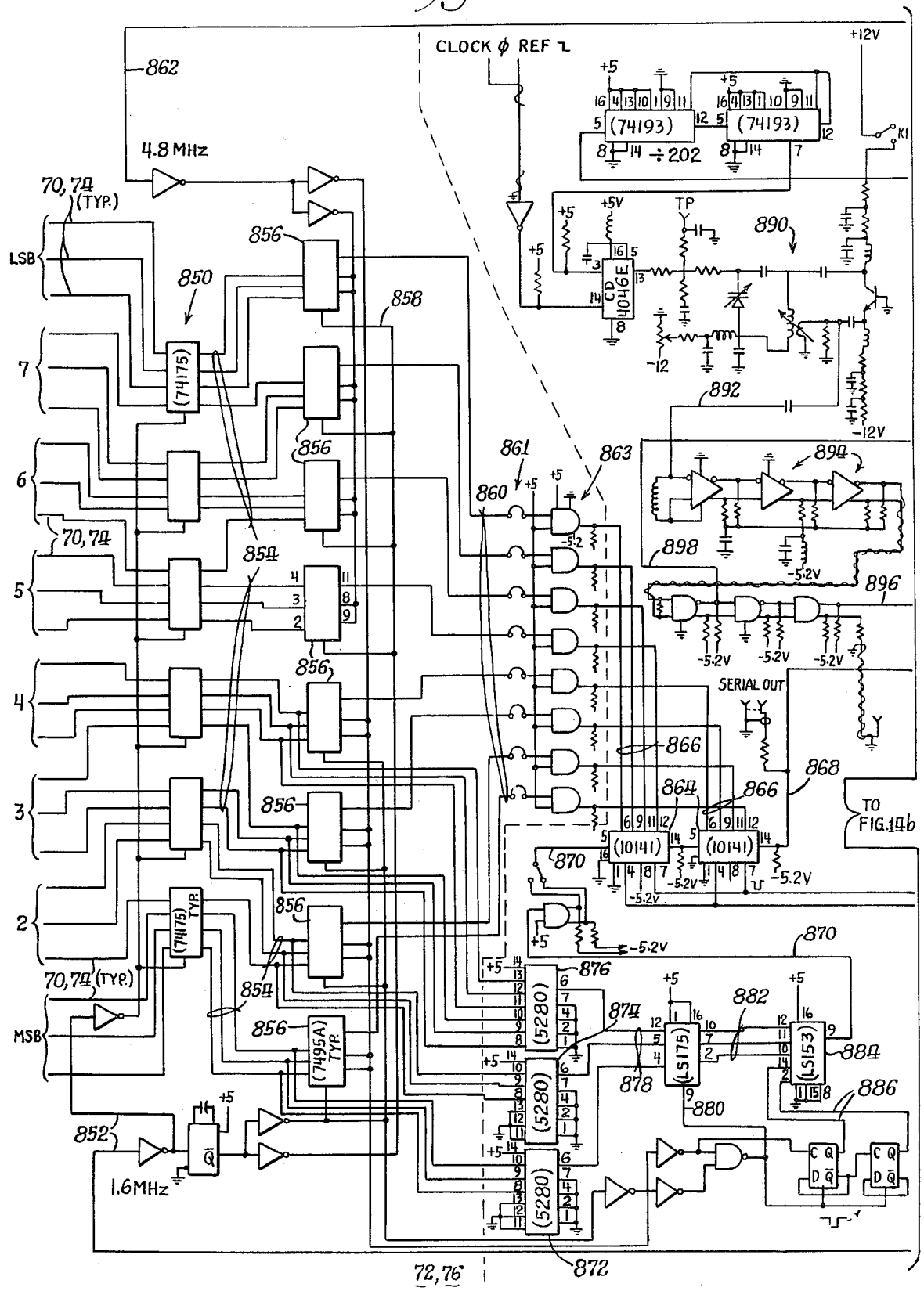

During record operations, the data read from the random access memories RAM 1 through RAM 4 is asserted on lines 70 and 74 that extend to respective 24-to-8 bit converters 72 and 76, one of which is shown in the electrical schematic diagram of FIG. 14a, the 24-to-8 bit converter being the circuitry shown to the left of the generally vertical dotted line. The data on lines 70 or 74 is applied to a series of D flip-flops, indicated generally at 850, which reclocks the data using a 1.6 MHz clock signal on line 852 that is generated by the encoder circuitry shown generally at 900 in FIGS. 14a and 14b. The data that is clocked through the flip-flops 850 appears on lines 854, which extend to a number of parallel-to-serial shift registers 856 which are loaded by a 1.6 MHz clock signal on line 858. The data from the input lines 854 is sequentially clocked out on lines 860 at a three times faster rate determined by a 4.8 MHz clock signal generated by the encoder circuitry 900 and placed on line 862 coupled to the output clock terminal of each of the shift registers 856. Thus, the 24 bits of data being asserted on the input lines 854 is converted to 8 bits of data that is transferred at a rate that is three times faster. The data on lines 860 is passed through jumpers 861 and then through gates 863 and is applied to another parallel-to-serial shift register 864 which has an output line 868 that contains the serialized NRZ data on the input lines 866. The jumpers can be used to change the order of the data bits so that the three most significant bits are not adjacent one another and would therefore not be adjacent one another in the serial data after being converted to serial data. This would decrease the vulnerability to losing all of the most significant bits due to a drop-out having a duration of 2-to-4 bits. If the order of the data is changed, it must be similarly changed back to its proper order during reproducing through the use of the jumpers 615 in the circuitry 50 and 52 (FIG. 18a) as should be understood. The clock rate of the data on the input lines 866 is 4.8 MHz as previously mentioned and comprises 8 bits of data at this rate. To provide a serial output, the data is clocked onto line 868 using a clock signal that is nine times faster than the 4.8 MHz clock signal, i.e., approximately 43 MHz. The clock rate is nine rather than eight times faster because of the addition of a parity bit to each 8 bit word being asserted on input line 870, which originates from parity generating circuitry that will now be described.

The most significant bit, the second, third and fourth most significant bits for three consecutive data words are applied to parity generating circuits 872, 874 and 876, in addition to being applied to the shift registers 856. Thus, the three of the lines 854 which are applied to the parity generator 872 comprise the most significant bits of three successive samples. Similarly, the three lines that are input to the parity generator 874 comprise the second most significant bits for three successive samples and the six lines that are applied to the parity generator 876 comprise the third and fourth most significant bits for three successive samples. The parity generators examine the data on the inputs and assert a low level on each of the output lines 878 in the event that an even number of logical ones occurs in data that is applied to the corresponding parity generator. The three lines 876 are reclocked by the 1.6 MHz clock on line 880 so as to provide the data on lines 882 that are connected to a parallel-to-serial shift register 884. The shift register 884 is clocked by the 4.8 MHz clock on line 886 so that the parity bit from each of the lines 882 is serially asserted on output line 870 that extends to the parallel-to-serial shift register 864. The parity generating circuitry that is shown and described in detail herein is one type of parity that conveniently can be employed in the apparatus. However, it should be understood that the particular significant bits that are examined need not be from three successive samples but may be from three individual samples that are not successive. However, three successive samples are most convenient because they are simultaneously present in the parallel presence of three successive eight bit data words.

The frequencies used by the circuitry, i.e., the 43 MHz clock, the 4.8 MHz clock and the 1.6 MHz clock are produced by an 86 MHz oscillator, indicated generally at 890, that provides the basic timing reference for the operation of the encoder 900. The oscillator 890 provides an output signal on line 892 which is applied to level and shaping circuitry 894 to generate the 86 MHz signal on line 896, as well as line 898, with the 86 MHz clock signal line 896 being used to reclock the serialized data after it has been encoded by encoder 900 in a format that will be hereinafter discussed. The 86 MHz signal on line 898 is applied to a pair of divide-by-2 dividers 902 and 904, the latter of which produces an approximately 43 MHz signal having complementary phases on lines 906 and 908. The complementary phases 43 MHz signals are applied through pulse narrowing logic circuitry 909 and 910 to provide very narrow pulses of opposite phase at the 43 MHz clock rate on lines 911 and 912 which are used by the encoder 900. The divide-by-2 divider 902 has its output connected to the first of three successive divide-by-3 dividers 914 which are used to generate a 1.6 MHz clock on line 916, a TTL level 1.6 MHz clock on line 852 and a 4.8 MHz clock on line 862.

The serialized nonreturn-to-zero (NRZ) data being clocked at a rate of 43 MHz on line 868 is applied to the encoder 900 which encodes the data into a Miller "squared" channel code, which is a self-clocking, DC-free, type of code. The DC-free code avoids the introduction of any possible DC component into the encoded data as a result of a preponderance of one logical state over a period of time. Because the record and reproduce apparatus does not transmit at DC, the presence of a DC component in the encoded data to be recorded can introduce errors in the recovery of the data during the reproducing. In this regard, reference is made to U.S. Pat. No. 4,027,335 by Jerry W. Miller issued May 31, 1977 and entitled "DC-Free Encoding for Data Transmission System", assigned to the same assignee as the present invention. As is comprehensively described therein, the coded format can be characterized as a self-clocking format, which provides for transmitting binary data over an information channel of limited bandwidth and signal-to-noise ratio where the data is transmitted in a self-clocking format that is DC-free.

In limited bandwidth information channels which do not transmit at DC, binary waveforms suffer distortions of zero-crossing location which cannot be totally removed by means of linear response compensation networks, particularly, at the high data rates characteristic of this apparatus. These distortions are commonly referred to as base-line wander and act to reduce the effective signal-to-noise ratio and modify the zero-crossings of the signals and thus degrade bit recovery reliability of the decoder. A common transmission format or channel data code that is utilized in recording and reproducing systems is disclosed in Miller U.S. Pat. No. 3,108,261 issued Oct. 22, 1963. In the Miller code, logical 1's are represented by signal transitions at a particular location, i.e., preferably at mid-cell, and logical 0's are represented by signal transitions at a particular earlier location, i.e., near the leading edge of the bit cell. The Miller format suppresses any transition occurring at the beginning of a one bit interval following an interval having a transition at its center. Asymmetry of the waveform generated by these rules can introduce DC into the encoded signal. The so-called Miller "squared" code used in the present apparatus effectively eliminates the DC content of the original Miller format and does so without requiring either large memory or the necessity of a clock rate change in the encoding and decoding operations. As is described in the aforementioned Miller Pat. 4,027,335 directed to the Miller "squared" format, the data stream can be viewed as a concatenation of variable length sequences of three types: (a) sequences of the form 1111—111 having any number of logical 1's but no logical 0's; (b) sequences of the form 0111—1110 having any odd number of consecutive 1's or no 1's, with 0's occurring in the first and last positions; and (c) sequences of the form 0111—111 having any even number of consecutive 1's preceded by a 0. The sequences of the type (c) occur only if the first bit of the next following sequence is a 0. Sequences of type (a) and (b) are encoded according to the code rules described in the 3,108,261 patent. The sequence of type (c) is encoded according to the code rules that are described in the 3,108,261 patent for all bits except the last logical 1, and for this 1, the transition is simply suppressed. By this suppression, the type (c) sequence viewed in isolation is made to appear the same as the type (b) sequence, i.e., the final logical 1 looks like a logical 0.

By definition, the type (c) sequence is followed immediately by a logical 0 at the beginning of the next sequence. No transition is allowed to separate the type (c) sequence from the following 0. Therefore, the spatial coding is distinctive for decoding purposes and the decoder must merely recognize that when a normally encoded logical 1 is followed by 2 bit intervals with no transitions, then a logical 1 and logical 0 should be provided successively during these intervals. All other transition sequences are decoded as according to the Miller code disclosed in the 3,108,261 patent. Thus, the output on line 86 from the encoder 900 provides the serialized encoded data in the Miller "squared" format that is applied to the amplifiers 88 and 90, for example, and the amplified signal is then forwarded to the transducing heads for recording on the magnetic tape.

During reproducing, the transducing head 96 carried by the head wheel 108 reproduce the signals recorded on the tracks and apply them to preamplifiers 109, one of which is shown in detail in FIG. 15. The input lines 950 are connected to rotary transformers of conventional design and the derived signal is amplified and appears on output lines 111 that are connected to the 2-to-1 switches 110 and 112, which selectively connect one of the lines 109 to output 114 or 116 extending to the equalizers 118 or 120.

Figure 16B:
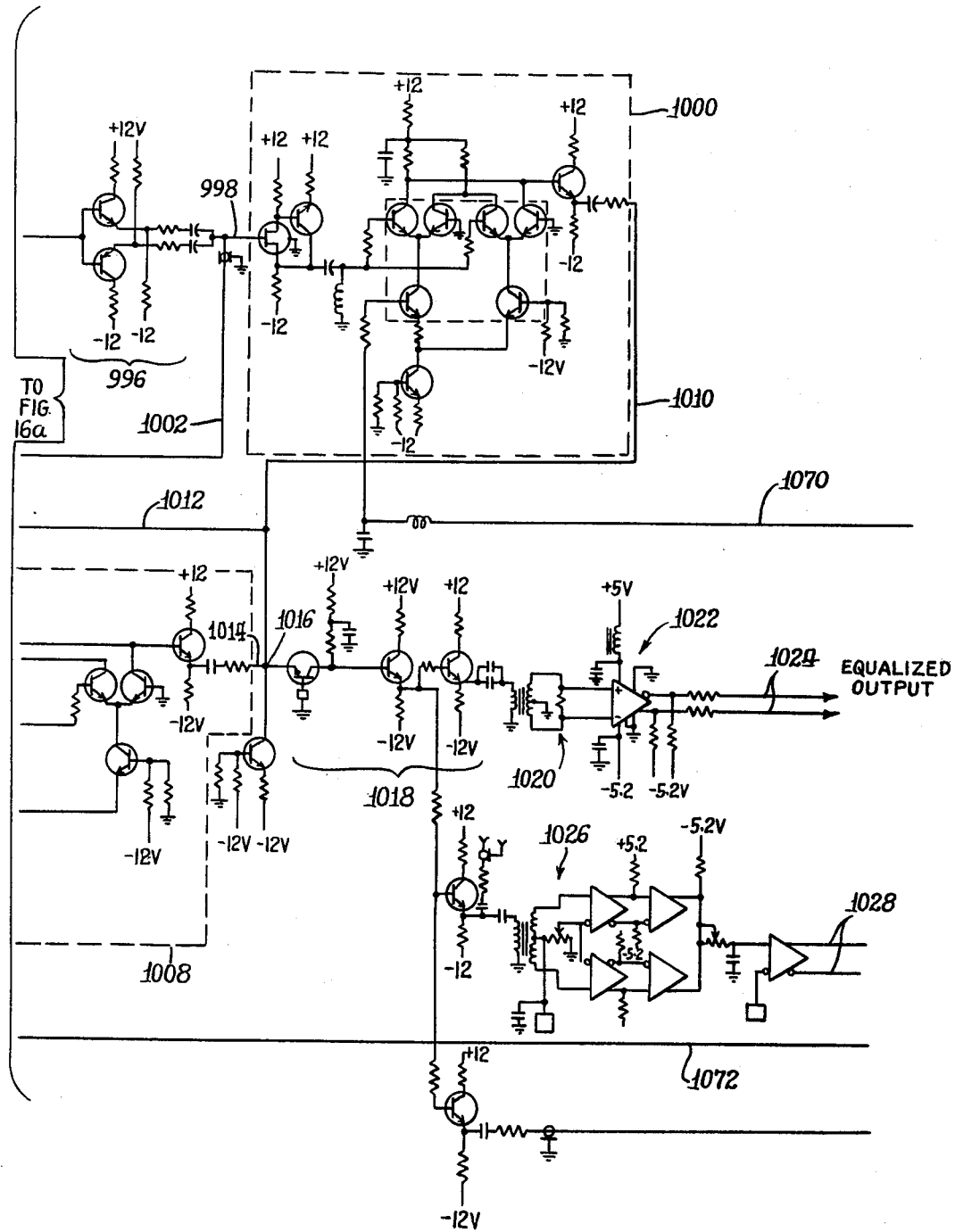

With respect to the specific circuitry that can be used to perform this switching and equalization, reference is made to FIGS. 16a and 16b, which together comprise the electrical schematic circuitry that can be used to carry out these circuit operations. Referring to FIG. 16a, the output of the preamplifiers 109 appears on lines 111, which are shown to extend to diode switches 970 and 972 that are respectively controlled by head switching signals applied to lines 974 and 976. The signals from one of the preamplifiers is passed through the associated switch at the proper time and appears at the line 114 that represents the input to the equalizer, which is shown on the remainder of the drawings of FIGS. 16a and 16b. Line 114 is applied to an amplifier indicated generally at 978 which is connected to a 6 db per octave increasing response controller 980 that includes a low frequency compensator 982 and a high frequency compensator 984, both of which compensate for the non-constant amplitude-frequency response of the reproducing heads. As is well known in the art, the output voltage of a reproduce head and preamplifier combination rises at low frequencies at a rate of 6 db per octave, levels off at mid-band frequencies and falls at high frequencies. Consequently, if an overall flat amplitude response of the playback signal is to be obtained, it is necessary for the equalizer to boost the amplitude at both the low and high frequencies. To effect the boost, the circuitry 980 is applied to an amplifier and line driver 990 which in turn is connected to a low pass filter 992 having a cut off frequency slightly above the half data rate, i.e., 21.5 MHz in the present apparatus. The amplifier and line driver 990 and filter 992 are designed to minimize the effect of any high frequency noise present on the off-tape signal. The low pass filter 992 is connected to a phase equalizer 994 which drives a second line driver 996 (FIG. 16b). The line driver 996 has an output line 998 that is connected to a balanced modulator circuit, indicated generally at 1000, as well as to a delay line 1002 that is connected to another balanced modulator circuit 1004 (FIG. 16b) as well as to a second delay line 1006 that extends to a third balanced modulator 1008. The outputs of the balanced modulators 1000, 1004 and 1008 appear on respective lines 1010, 1012 and 1014 (FIG. 16b) which are connected at a common summing point 1016. The summing point 1016 represents the input of an amplifier 1018 that is connected through a transformer 1020 to a limiter 1022 which provides the equalized output on line 1024. A circuit indicated generally at 1026 detects the presence of an RF drop-out in the recovered signal and provides a drop-out on line 1028.

The circuitry between the output of the line driver 996 and the output 1024 of the equalizer compensates for inter-symbol interference of the Miller "squared" data stream that occurs during reproducing. Inter-symbol interference can broadly be described as a distortion of the location of the zero-crossings in the signal which occur in the data stream, and which are distorted due to the effect of prior and subsequently occurring signal transitions. In other words, the zero-crossing point for a subject transition may be phase advanced or retarded to differing degrees depending upon what occurred immediately prior to or after the zero-crossing point of interest. While it is, at first impression, somewhat unusual to suggest that a future transition can affect a present transition, it must be realized that transitions are the result of the transducing head recording and reproducing signals on and from the magnetic tape or other medium and that three successive transitions are in a sense the past, present and future transitions and that magnetic influence can occur from either adjacent transition while the transducing heads are operating. Referring to FIG. 16c(1), a relatively long wavelength 1030 having three data cells between transitions is shown which is followed by two successive shorter wavelengths 1032 and 1034 which have only one data cell between transitions. As shown in FIG. 16c(2), it is well known that the depth of recording for the signals shown in FIG. 16c(1) are greater for longer wavelengths, i.e., low frequency, than for short wavelengths. Thus, the amplitude is greater for the portion 1036 associated with the longer wavelength 1030 than for either of the portions 1038 and 1040 associated with the shorter wavelength. This depth of recording will therefore distort the location of the zero-crossing point from the transition of the long wavelength to the short wavelength, i.e., the zero-crossing point 1042 shown in FIG. 16c(1) and the distortion will affect the amplitude response as well as the phase response, although the phase response will be more significantly affected. The long wavelength transition may be phase retarded as shown by the dotted line and have a zero-crossing point at location 1044 or phase advanced as shown by the dotted line and have a zero-crossing point at location 1046.

The circuitry located between the output line 998 of the line driver 996 and the summing point 1016 corrects for distortion by algebraically adding correcting signals that are proportional in amplitude and phase displaced relative to the signal that occurred prior in time as well as a signal that occurs later in time. This is accomplished by (a) applying the signal on line 998 through the first delay line 1002 to balanced modulator 1004 which provides an output signal that is delayed from arriving at the summing point 1016 by a first predetermined time corresponding to a nominal value of 1½ data cells; (b) applying the signal through the first delay line 1002 and also through a second delay line 1006 to a balanced modulator 1008 which provides an output signal on line 1014 to the summing point 1016 which is delayed by a greater amount which nominally is about 3 data cells; and (c) applying the signal directly to the balanced modulator 1000 which provides an output signal on line 1010 that is applied to the summing junction 1016 prior to either of the outputs on lines 1012 and 1014. For a given sample in the signal that is present on line 998 at a given time, it will be processed through the balanced modulators and delay lines and will reach the summing point 1016 at three successive points in time as would samples that occurred immediately before and after the subject sample. Thus, by forwarding the signals through the delay lines and balanced modulators, the effect is to phase modify the instant sample with the immediately preceding and succeeding samples. The predominate signal in terms of amplitude is the signal from the balanced modulator 1004 and the outputs from the other balanced modulators 1000 and 1008 are proportionally smaller in amplitude and are algebraically added to the predominate signal to correct for errors in the zero-crossing portion of the predominate signal. Referring again to FIG. 16c(1), by adding a component signal that is phase advanced as shown at point 1046, compensation for the phase retardation of the zero-crossing point shown at point 1044 can be made so that the resulting zero-crossing point is correctly shifted to the location identified as point 1040.

With respect to the operation of the balanced modulators, and referring specifically to the balanced modulator 1004 shown in FIG. 16a, there is a constant current source represented by the transistor 1050 which provides a current on line 1052 that extends to the emitters of transistors 1054 and 1056. The total current is divided and flows through the two paths and the current that flows to the transistor 1056 is equal to the total current less the current that is flowing to the transistor 1054. The base of transistor 1054 is connected to a variable resistor 1058 that can be adjusted to control the output of the balanced modulator circuit 1004. The current flowing through each of the transistors 1054 and 1056 effectively control the gain of the transistors 1060a, 1060b, 1062a and 1062b. Since the collectors of transistors 1060a and 1062b are connected together and are oppositely phased, if the current flowing through transistors 1054 and 1056 are equal, then the gain for transistors 1060a and 1062b will be equal and the current on line 1064 will be zero which will cause transistor 1066 to be nonconducting and provide a zero output on line 1012. However, if they are unequal, there will be a current that varies in phase depending upon which transistor 1062a or 1062b is conducting. The input signal from the delay line 1002 is applied to the base of transistors 1060a and 1062a which will be reflected at the output on line 1012 that will be some proportion of the amplitude of the input signal and also phase shifted in accordance with the preset adjustment of the variable resistor 1058.

Since the other balanced modulators operate substantially similarly, it can be seen that the outputs therefrom can be amplitude adjusted and some proportion of the amplitude of the input signal can be added to compensate for the inter-symbol interference that is present on the data. The amplitude of the added signal generally varies between about 10 to about 15%, but may approach about 30%. In any event, the amplitude should be that which is necessary to adequately perform the compensation. In this regard, the balanced modulator 1000 has a transistor corresponding to transistor 1054 in the balanced modulator 1004 controlled by line 1070 and a similar transistor of the balanced modulator 1008 is controlled by a line 1072, both of which are extended to variable current sources that can be controlled by an operator who can adjust the balanced modulator to vary the phase and amplitude compensation in a manner whereby the inter-symbol interference is minimized.

The equalized data, still encoded in the Miller squared code, is applied on lines 124 and 126 that are connected to two switches 128 and 130, which are adapted to select the outputs of either equalizer and apply the same to one of the decoder, drop-out processing, clock acquisition and deserializing circuits 138 or 140 via lines 132 and 134. The switches 128 and 130 are adapted to reverse the equalizer outputs if such is necessary in the event that the consecutive lines that are being decoded are reversed relative to recording which would ultimately produce a garbled display of the video image, as previously mentioned. The switches 128 and 130 are controlled by a signal on line 142 that is generated by the logic circuitry 200.

Figure 17A:
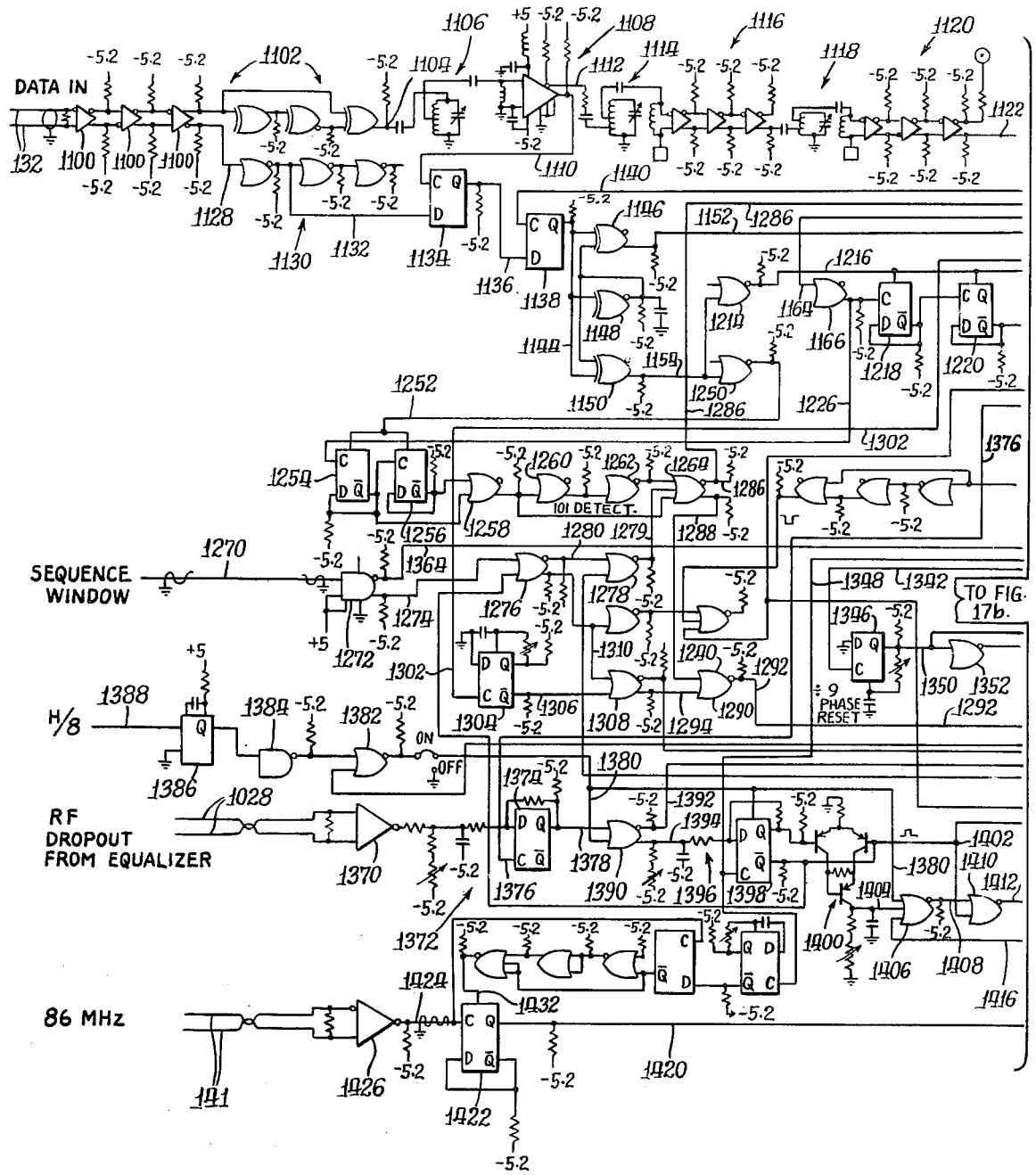
FIGS. 17a and 17b together comprise an electrical schematic diagram of decoder circuitry, drop-out processing circuitry, off-tape clock acquisition circuitry and serial-to-parallel converting circuitry.
Figure 17B:
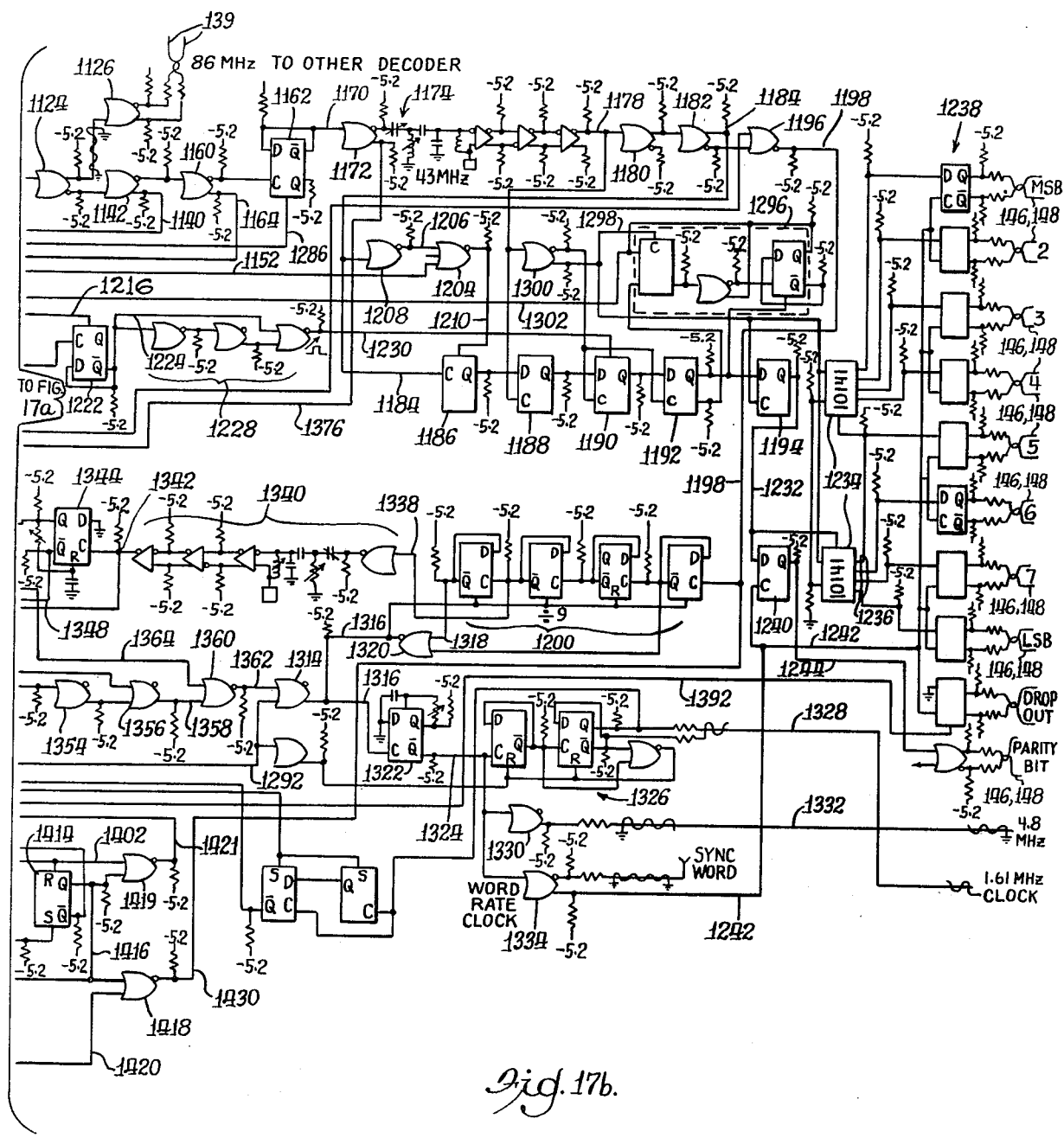

Specific circuitry that can be used to decode the Miller squared encoded data, recover the clocks from the self-clocking data, provide a drop-out processing as well as deserialize the data and convert it back to a 9 bit parallel data is shown in FIGS. 17a and 17b, which together comprise an electrical schematic diagram of this circuitry. Thus, the Miller squared data is input on lines 132 (in MECL form) which occurs essentially at a 43 Mbit rate, since transitions can occur at both the beginning and the middle of the bit cells with the bit cells being at a 43 Mbit rate. While the data is in MECL form at the input, it should be appreciated that the circuitry could be modified to accept the Miller squared data in a form whereby the logic signal transitions are pulses which occur at the beginning or middle of bit cells. Thus, one of the complementary outputs of the last stage of a three stage limiter 1100 is applied to a series of three exclusive-OR (EXCL-OR) gates 1102, which generate a pulse on output line 1104 at each zero-crossing point. The generated pulses are applied to a narrow band pass filter 1106 and subsequently inpput to a limiter 1108, which generates a square wave. The output of the limiter appears on line 1110 as well as on a line 1112, with line 1112 extending to another filter 1114 which is also a narrow band pass filter and the output of the filter 1114 is applied to another limiter 1116 followed by another narrow band pass filter 1118 and yet another limiter 1120 so as to produce the 86 MHz square wave on line 1122 that is connected to a buffer 1124 having complementary outputs. One of the complementary outputs is applied to buffer 1126 which provides the 86 MHz clock on line 139 that can be used by the companion decoder as previously discussed with respect to the block diagram of FIG. 1. The narrow band pass filters of the clock extracting circuitry have a band pass of approximately 2 MHz.

In the event a RF drop-out occurred on one of the channels, then the 86 MHz clock from the other decoder is used to clock the circuitry so as to be able to retain the proper data word synchronization and thereby be able to immediately recover the data when the drop-out terminates. Since it is extremely unlikely that drop-outs would simultaneously occur in both channels, the probability is high that the 86 MHz clock can be recovered by one or the other of the decoders for use in clocking the circuitry.

The series of limiters and narrow band pass filters successively provide a more accurate 86 MHz clock that is used to clock the data that is being received on the lines 132. The complementary output of the first limiter stage 1100 contains the coded data and is applied via line 1128 to a delay means, indicated generally at 1130, which is tapped by line 1132 and applied to the D input of a flip-flop 1134 that is clocked by line 1110. Thus, the encoded data output by the flip-flop 1134 on line 1136 is reclocked by a recovered clock from the data itself and thereby removes some errors that may be present due to propagation and timing delays that are present in the extremely high rate 86 Mbit data. The line 1136 containing the reclocked data is also applied to a D flip-flop 1138 which is clocked by the refined 86 MHz clock signal on line 1140 that is output by a buffer 1142 which has one input supplied by the buffer 1124. The flip-flop 1138 reclocks the data a second time and thereby removes virtually all errors that would be present due to propagation and other timing delays. The reclocked data appears on line 1144 and is applied to three EXCL-OR gates 1146, 1148 and 1150, two of which provide a narrow pulse on respective output lines 1152 and 1154 for each transition that occurs in the data itself.

The other output of buffer 1142 is applied to a buffer 1160, which has one output clocking a divide-by-2 flip-flop 1162 while the other output line 1164 is applied to a buffer 1166. The output of the divide-by-2 flip-flop 1162 is a 43 MHz signal on line 1170 which is passed through buffer 1172, is thereafter filtered by a filter 1174. The filter 1174 forms part of a flywheel circuit which is operable to maintain the clock at the same phase by resisting any instantaneous variation or change of phase of the signal, due to the delay characteristics of the filtering. The phase of the 43 MHz clock would not change until several cycles of a different phased signal occurs. The output of the filter circuit 1174 appears on line 1178 which is passed through a buffer 1180 to another buffer 1182 having output line 1184 containing the 43 MHz clock which is used to clock a shift register comprising D flip-flops 1186, 1188, 1190, 1192 and 1194. The complementary output of the buffer 1182 is applied to OR gate 1196 which has output line 1198 that is used to clock a divide-by-9 divider indicated generally at 1200. The divide-by-9 divider 1200 is formed by 4 flip-flops wired to issue an output on line 1316 for every nine 43 MHz clock signals received over line 1184. The above description generally comprises the extent of the clock generation that is used to decode the Miller "squared" coded data and these clocks are used to clock the circuitry shown in the drawing, thereby utilizing clocks that are derived from the data stream itself.

To decode the Miller "squared" coded data, and referring to FIG. 17a, it is recalled that the EXCL-OR gate 1146 produces a pulse for every data transition, whether it occurs in the middle of a bit cell or at the beginning thereof. The pulses are applied via line 1152 to gate 1204 which has another input line 1206 supplied by gate 1208 that is clocked by line 1184. The gate 1204 essentially functions as a logical 1 detector and provides a true high output pulse on line 1210 whenever a logical 1 is detected and the line 1210 effectively sets the flip-flop 1186 in the first stage of the shift register with a logical "1". The successive flip-flops comprising the shift register are clocked by the 43 MHz clock signal to propagate the logical "1" state therethrough. In accordance with the Miller "squared" code rules used to decode the encoded data, certain logical "1's" are suppressed in the data stream so as to remove the DC component therefrom. To detect the presence of such a suppressed logical "1", the output line 1154 from the EXCL-OR gate 1150 produces a short pulse at each transition, which is passed through the buffer 1214 and provides a reset pulse on line 1216 whenever a transition occurs. An 8 bit counter comprised of three flip-flops 1218, 1220 and 1222 are adapted to provide an output signal on line 1224 when they reach a count of five or more, it being appreciated that the 8 bit counter is clocked by an 86 MHz clock via line 1164, buffer 1166 and line 1226. The count of five intervals of the 86 MHz clock corresponds to 2½ cells of the 43 Mbit signal which is detected and indicates that a logical 1 had been suppressed during the encoding process. If a transition occurs before five counts of the 86 MHz clock, then the counter will be reset whenever the transition has occurred. When the counter provides an output signal on line 1224, it is applied through the gate circuitry 1228 to generate a narrow pulse on output line 1230, which is applied to the set input of the flip-flop 1190 of the shift register and thereby inserts a logical 1 at the proper time where it had been suppressed during the encoding process. The output of the final flip-flop 1194 in the shift register appears on line 1232, which carries the decoded nonreturn-to-zero data that is applied to a serial-to-parallel shift register 1234. This shift register generates the 8 parallel bits of data on lines 1236 that are applied to respective flip-flops 1238 having output lines 146 or 148 that extend to the circuits 50 and 52. The data on line 1232 is also applied to a D flip-flop 1240 which is clocked by line 1242 which is at the sync word rate and is timed so as to obtain the parity bit which is placed on output line 1244. The sync word rate related signal on line 1242 occurs at the rate of 4.8 MHz and is also used to clock the flip-flop 1238 containing the bits of the parallel data.

In addition to acquiring the clock signals from the encoded data, decoding the Miller "squared" encoded data into NRZ data, the circuitry of FIGS. 17a and 17b also operates to acquire the word synchronization, i.e., identify the proper 9 bits of serialized data that include the 8 bits of a single sample, together with the appropriate parity bit, and the word sync detection is accomplished by detecting the digital synchronization sequence that was added by the sequence adder 40 during the recording process. More specifically, the "005" sequence, when serialized and after parity has been added, will appear as 24 consecutive zeros followed by the sequence "101". Referring again to the EXCL-OR gate 1150 shown in FIG. 17a, its output line 1154 is also applied to a buffer 1250, which has an output line 1252 upon which a pulse appears during each transition of the data stream. The signals on line 1252 effectively reset a pair of flip-flops 1254 and 1256 which, together with four successive gates and buffers, 1258, 1260, 1262 and 1264, detect the occurrence of the digital sequence "101". However, the "101" sequence could easily occur at various locations in the active video data interval of the processed television signal and for this reason, an input line 1270 has a sequence window signal that is only true during the time in which the "005" sequence is occurring, i.e., for a period of about 4 to 5 microseconds during each horizontal line, and this signal on line 1270 is applied to gate 1272 having an output line 1274 that is connected to OR gate 1276 which in turn is connected to OR gate 1278 via line 1280. The sequence window signal is generated by the circuitry of FIG. 10. An output line 1279 enables the gate 1264 only during the sequence window so that the true signal on output lines 1286 and 1288 from the gate 1264 can only occur for a "101" sequence detection during the presence of the sequence window. The line 1286 is used to steer the divide-by-2 divider 1162 (FIG. 17b) so that it is reset at the proper time to maintain 43 MHz clock phase correct and to acquire bit synchronization. The other output of the NAND gate 1264, i.e., line 1288, is applied to NAND gate 1290 which provides a signal on output line 1292 provided the other input line 1294 has been enabled. Since the "101" sequence detector is driven by a clock signal on line 1226 (via buffer 1166 and line 1164) which is obtained from the data stream itself, it is always correctly phased with respect to the data stream. The detector will always detect a "101" sequence if it is present provided it is enabled and this occurs during the sequence window. The gate 1290 is enabled only when the occurrence of 20 successive zeros in the bit stream is detected which legitimately occurs during the digital synchronization "005" sequence and this occurs prior to the "101" detection as would be expected.

To detect the occurrence of 20 successive zeros and referring to FIG. 17b, a counter, indicated generally at 1296, examines the data being shifted through the shift register, particularly, the data appearing on the output of the flip-flop 1192 which operates to reset the counter in the event that a logical 1 appears. The counter 1296 is clocked by the 43 MHz clock on line 1298 originating from a buffer 1300. The counter provides an output signal on line 1302 when 20 consecutive zeros have occurred and this signal triggers a monostable multivibrator 1304 (FIG. 17a) which provides a signal on line 1306 that is transmitted through NAND gate 1308 in the event that the gate has been enabled by a true signal on line 1310, which occurs during the occurrence of the sequence window. If the NAND gate 1308 is enabled, then the enabling signal is provided on line 1294 for enabling the gate 1290. The true signal on line 1292 therefore occurs in response to the detection of the "101" sequence during the sequence window which occurs during the horizontal blanking interval of every processed television line and provides the word synchronization signal on line 1292 that is applied to OR gate 1314 (FIG. 17b), which has output line 1316 connected to the reset of the divide-by-9 divider 1200. The output of the divider 1200 appears on line 1318 which is connected to OR gate 1320 which has the effect of resetting itself every 9 counts of the clock as well and, thereby, adapt the four flip-flops forming the counter 1200 to a divide-by-9 counter. The output line 1316 of the gate 1314 also extends to the clock input of a monostable multivibrator 1322 which has an output 1324 that clocks a divide-by-3 divider indicated generally at 1326 which produces an output of 1.6 MHz decoder clock on line 1328. Line 1324 carries a signal that is a 43 MHz line 1324 clock divided by 9, or 4.8 MHz, which extends through buffer 1330 and produces a 4.8 MHz decoder clock signal on line 1332. The line 1324 is also coupled by the buffer 1334 having output line 1242 which carries the 4.8 MHz clock which clocks the flip-flop 1238. The lines 1328 and 1332 comprise the decoder clocks that are used to clock the random access memories RAM 1 through RAM 4, as well as the circuits 50 and 52 during the reproducing operation as previously described.

The output of the divide-by-9 counter is also applied via line 1338 to a flywheel circuit, indicated generally at 1340, which is operable to prevent any sudden step in the word synchronization and is adapted to provide a recurring 4.8 MHz signal at its output on line 1342 for 30 to 40 cycles of word sync. The signal on line 1342 is applied to a flip-flop 1344 that triggers a monostable multivibrator 1346 via line 1348. The monostable multivibrator 1346 merely properly times the signal and has an output on line 1350 which is coupled to a differentiating circuit comprised of delays 1352 and 1354 and gate 1356 which produces a very narrow pulse on line 1358. The pulse activates the gate 1360 during the sequence window when line 1364 is active, which provides an output on line 1362 that will activate the OR gate 1314 for resetting the divide-by-9 counter in the event the "101" sequence detector output on line 1292 is not present for some reason, such as a drop-out or the like.

Thus, the divide-by-9 counter will be properly reset by either the "101" sequence detector, or the flywheel reset circuitry just described even if a clock pulse on line 1198 is temporarily lost. An important effect of the circuit operation is to maintain the sync word at a relatively constant rate over several tens of cycles and not change it due to a loss of a clock count or for the loss of a few occurrences of the "101" detection and the like.

In accordance with another aspect of the operation of the circuitry shown in FIGS. 17a and 17b, each of the decoders is adapted to provide the 86 MHz clock to the other, with the one shown in FIG. 17b providing the 86 MHz clock on line 1391 and the present illustrated decoder similarly receiving the 86 MHz clock from the other decoder on line 141 shown at the lower left of FIG. 17a. This is to compensate for a drop-out that may occur in the RF channel to one of the decoders and, if such occurs, the clock from the other channel can be used to maintain clocking of the circuitry so as to retain the sync word timing. This allows a clock signal to be maintained so that the clock from the subject channel can be reacquired easily upon the reoccurrence of the signal after the drop-out has ended. It should be appreciated that while the detection of the occurrence of an RF drop-out provides an indication of the absence of the clock signal, indications other than the detection of the loss of the RF signal may be conveniently used to cause the clock signal from the other channel to be used.

The detected RF drop-out from the equalizer 118 is applied no line 1028 to a buffer 1370, the output of which is applied to a first integrator stage, indicated generally at 1372, which is reclocked by flip-flop 1374 that is clocked by line 1376 from the buffer 1172 providing the 86 MHz clock. The output of the flip-flop 1374 appears on line 1378 extending to one input of a gate 139, which has the other input supplied by line 1380 that originates from an OR gate 1382. The input to the gate 1382 is supplied via buffer 1384 and a monostable multivibrator 1386 that is triggered by line 1388 which has an H/8 signal, i.e., the head switching signal, so that a drop-out indication with not be generated during this time. This signal prevents switching to the other channel clock during the head switch caused drop-out. Either of the input lines 1378 and 1380 enables the OR gate 1390 and provides a signal on output line 1392 which extends to the output flip-flop 1238 to reset the same, and thereby provide a drop-out indication on output line 146 and for 148 which are used by the circuitry 52 and eventually the drop-out compensator 160. The other output of the NAND gate 1390 is applied via line 1394 to a second integrator indicated generally at 1396 which integrates the drop-out signals and thereby effectively confirms the presence of an actual drop-out. The integrated signal is in turn connected to a flip-flop 1398 that is connected to a stretching circuit 1400. The stretching circuit 1400 has output line 1402 that is connected to the reset terminals of a flip-flop 1414 which has output line 1416 that enables gate 1418 to pass the 86 MHz signal from the other decoder for use in clocking the present decoder circuitry. The stretching circuitry is effective to hold the drop-out indication for a predetermined time beyond the duration of the actual drop-out so as to be sure that the RF signal has fully returned and the 86 MHz clock from the present decoder has been acquired before it is again used.

Thus, when the drop-out signal occurs, a delayed pulse appears on line 1402 which resets the flip-flop 1414 and after the drop-out terminates, a pulse appears on line 1404, although the latter is extended by the stretching circuit 1400, and is applied to gate 1406 which provides an output signal on line 1408 that provides one inut to gate 1410, the other of which is supplied by line 1412. The output line 1412 of the gate 1410 sets the flip-flop 1414 and its output line 1416 then disables NAND gate 1418 so that the 86 MHz clock on the other input line 1420 can no longer be clocked therethrough. However, before returning the operation of the present decoder to the clock derived by the present decoder from the data stream it receives, it is necessary to confirm that it is bit synchronized, i.e., that the 43 MHz clock used to clock the circuitry is properly synchronized to decode the logical ones in the middle of a data cell. Since the 43 MHz clock is derived by dividing the 86 MHz clock by two, the divider 1162 that performs the division is reset at the proper time. This is accomplished by a gate 1419 having input lines 1402 and 1416 being enabled for a time period of about 6 to 12 words occurring between the time of the actual termination of the RF drop-out and the termination of the stretched drop-out and the gate provides a signal on line 1421 which is applied to gate 1278 producing a signal on line 1279 which enables the "101" detector. When this is done, the occurrence of any "101" sequence in active video or in the synchronizing sequence will provide a reset pulse on line 1286 that resets the flip-flop 1162 and properly synchronizes the 43 MHz clock. The 43 MHz clock on line 1420 originates from a divide-by-2 divider 1422 that is clocked the 86 MHz clock on line 1424 from a buffer 1426 that has its input supplied by line 149 carrying the 86 MHz clock from the other decoder. When the line 1416 enables the gate 1418, the 43 MHz clock appears on an output line 1430 which extends to the clock input of the divide-by-9 divider 1200 and therefore supplies the clock in place of that which had been supplied on line 1198 but which is not present due to the drop-out on the channel having the data on line 132. The divide-by-2 divider 1422 is essentially reset by line 1432 that is clocked by the divide-by-9 divider 1200 which effectively switches the clock from the other decoder into the subject decoder at the proper time with respect to the operation of the divider. Thus, through the above described operation, each decoder effectively acquires the clock frequency from the Miller squared encoded data during normal operation and also receives and uses the acquired clock from the other decoder in the event of a drop-out occurring in the subject channel, thereby insuring that the basic word synchronization is maintained during drop-out.

The control of the operation of the random access memories RAM 1 through RAM 4 shown in the block diagram of FIG. 1 is accomplished by the clock generator and switcher circuitry 196 and logic circuitry 200, the detailed circuitry of which is shown in FIGS. 7, 8, 9 and 10.

Figure 9:
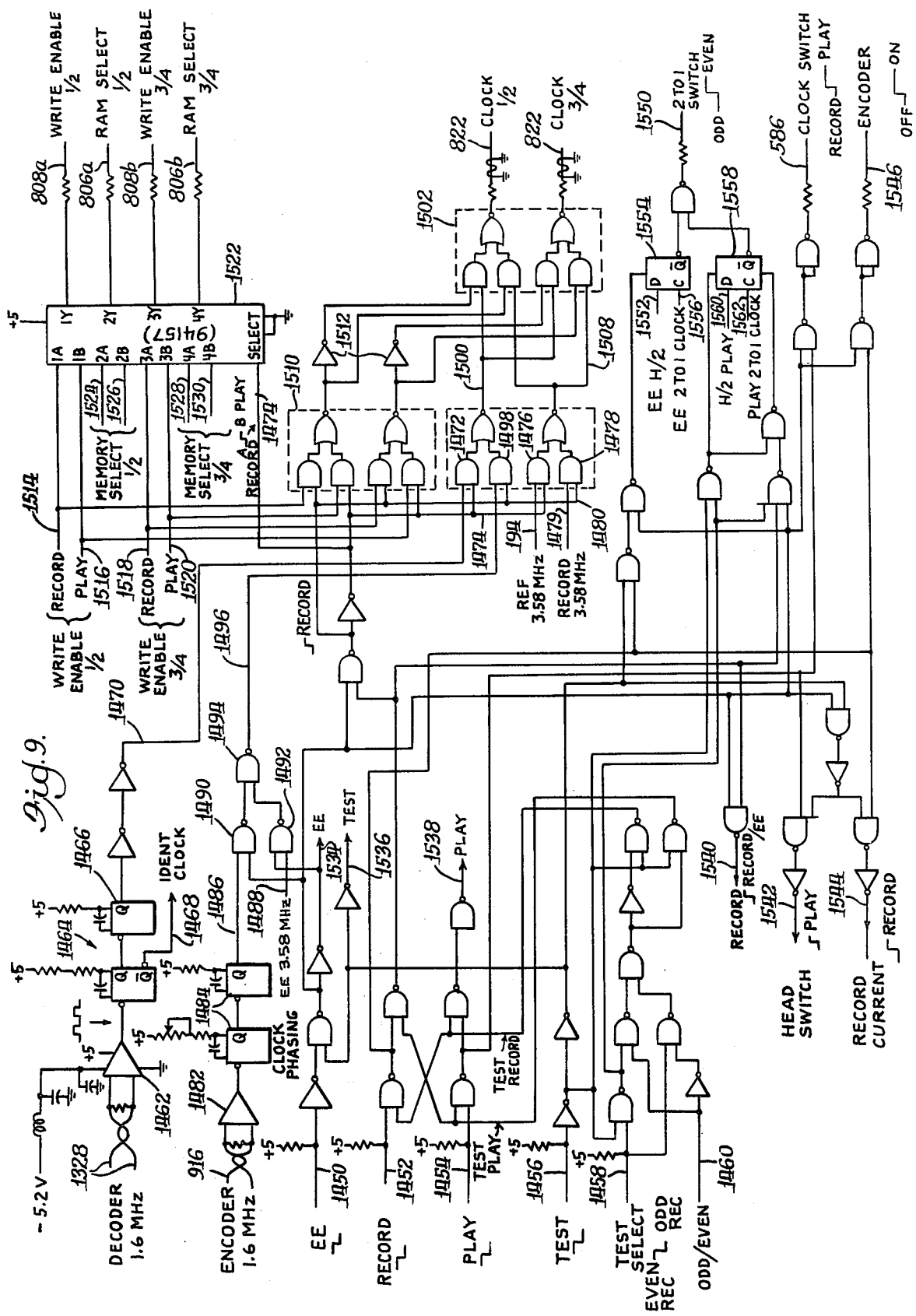
FIG. 9 is an electrical schematic diagram of logic and clock generating circuitry that is used for controlling the operation of the random access memories during either a recording or reproducing operation.

Turning initially to the logic and clock circuitry of the memory control circuitry as shown in FIG. 9, this portion of the circuitry is adapted to apply the appropriate clocks to the memories RAM 1 through RAM 4 depending upon whether a recording or reproducing operation is occurring. Thus, from external switches controlled by an operator, four input lines 1450, 1452, 1454 and 1456 are operable to place the apparatus in one of four modes, i.e., the play mode, the record mode, an EE mode and a test mode. During the EE operation, the data is merely written into the memories and thereafter read out of them using the same clock, bypassing the actual recording and reproducing operations, which essentially provides a test of this part of the circuitry. These four lines together with a test select line 1458, which selects either one pair of interconnected random access memories, i.e., RAM 1 and RAM 3 or the other set, i.e., RAM 2 and RAM 4, together with an even or odd level from a programmable read only memory 1600 (FIG. 7) on line 1460, which is used during testing modes, is applied through various logic circuitry to provide the appropriate signals and clocks for use in controlling the memories. The level of the signal provided on line 1460 during normal record and reproduce operating modes is selected to enable the memory control circuitry to function as described herein to provide the needed memory control signals.

The 1.6 MHz clock from the decoder 138 or 140 is applied to the circuitry on line 1328 and this clock is used to write the data into the memory during a reproducing process. The clock on line 1328 is changed from a MECL level to TTL level by the converter 1462 and is applied to successive monostable multivibrators 1464 and 1466 which adjust the phase of the clock. The monostable multivibrator 1464 has an output line 1468 labeled IDENT clock which extends to the identification processing circuitry of the memory control circuitry shown in FIG. 10. The output of the monostable multivibrator 1466 is applied through line 1470 to AND gate 1472 that is enabled by line 1474 which is high during a reproducing or play operation. Line 1474 also enables gate 1476 which has the reference 3.58 MHz clock on the other input thereof for use in reading the data from memory during reproducing. Similarly, AND gate 1478 is enabled during a recording process via line 1480 and the record 3.58 MHz clock signal will be gated through the gate 1478 for use in writing data into the memory during a record process.

The 1.6 MHz clock from the encoder 82 appears on line 916 which is similarly converted from MECL level to TTL level by a converter 1482 is retimed by two monostable multivibrators 1484 and provides the properly phased 1.6 MHz clock on line 1486 that is used to read data from memory during a recording operation, except in an EE mode where a 3.58 MHz clock on line 1488 is utilized. Gates 1490, 1492 and 1494 effectively gate either of these clock frequencies onto line 1496 that is applied to gate 1498 that is enabled during a recording operation. Thus, the AND gates 1472 and 1498 effectively select either a 1.6 MHz clock from the two sources and utilizes the decoder 1.6 MHz clock for writing the off tape data into the memories during reproducing or the encoder 1.6 MHz clock for reading the data from memories during a recording operation. One of these clocks is applied on line 1500 which is steered through logic, indicated generally at 1502, and supplies the clocks on lines 822 to the memories. It should be appreciated that the circuitry shown in FIG. 9 is duplicated and for one of the circuits the line 822 would supply the clock for memory RAM 1 and the duplicate thereof would supply the clock for the memory RAM 2. Similarly, the other line 822 for one of the circuits would supply the clock for memory RAM 3 while the duplicate thereof would supply the clock for memory RAM 4. Other similar designations ½ and ¾ in other drawings reflect similar usage. The gates 1476 and 1478 effectively select either the record or the reference 3.58 MHz clock for application to line 1508 and is gated through the steering logic 1502 to supply these frequency clocks on lines 822 when they are required. In this regard, the reference 3.58 MHz clock would be used to read the data from the memories in a reproducing process and the record 3.58 MHz clock would be used to write the data into the memories during a recording operation. The steering logic 1502 is also controlled by additional steering logic, indicated generally at 1510, together with inverters 1512. The inputs to the logic 1510 are supplied by the lines 1474 and 1480, which reflect whether the apparatus is in a record or reproduce mode, together with write enable signals on lines 1514, 1516, 1518 and 1520. The write enable signals on lines 1514 and 1518 are supplied by a read only memory 1600 (FIG. 7) that is programmed to supply the appropriate write enable signals during a recording operation and the signals on lines 1516 and 1520 are provided by another read only memory 1816 (FIG. 8) that is programmed to supply the write enable signals during a reproducing operation. Thus, the steering logic 1510 and 1502 together with the inverters 1512 select the proper clocks at the proper time for carrying out the writing and reading of the random access memories RAM 1 through RAM 4 during the recording and reproducing operations in the manner that has been described with respect to the timing diagrams shown in FIGS. 4b and 5b. The write enable lines 1514 through 1520 are also applied to a 2-to-1 switch 1522 which has memory select inputs on lines 1524, 1526, 1528 and 1530 that are supplied by the same read only memories (1600 and 1816) that supply the write enable signals. Lines 1524 and 1528 are used to supply the memory select signals during a recording operation, while lines 1526 and 1530 supply the memory select signals during a reproducing operation. A signal on line 1474 controls the switch 1522 and effectively selects the appropriate write enable and memory select lines during a recording and reproducing operation and provides the signals on output lines 806 and 808 that are connected to the memory circuitry shown in FIG. 13. It should be appreciated that only one memory has been shown in FIG. 13 and that one of the RAM select lines 806 as well as one of the write enable lines 808 shown in FIG. 13 would be connected to either the line 806a or b, of the circuitry shown in FIG. 9, depending upon the identity of the representative memory shown in FIG. 13 as should be readily understood.

Figure 8:
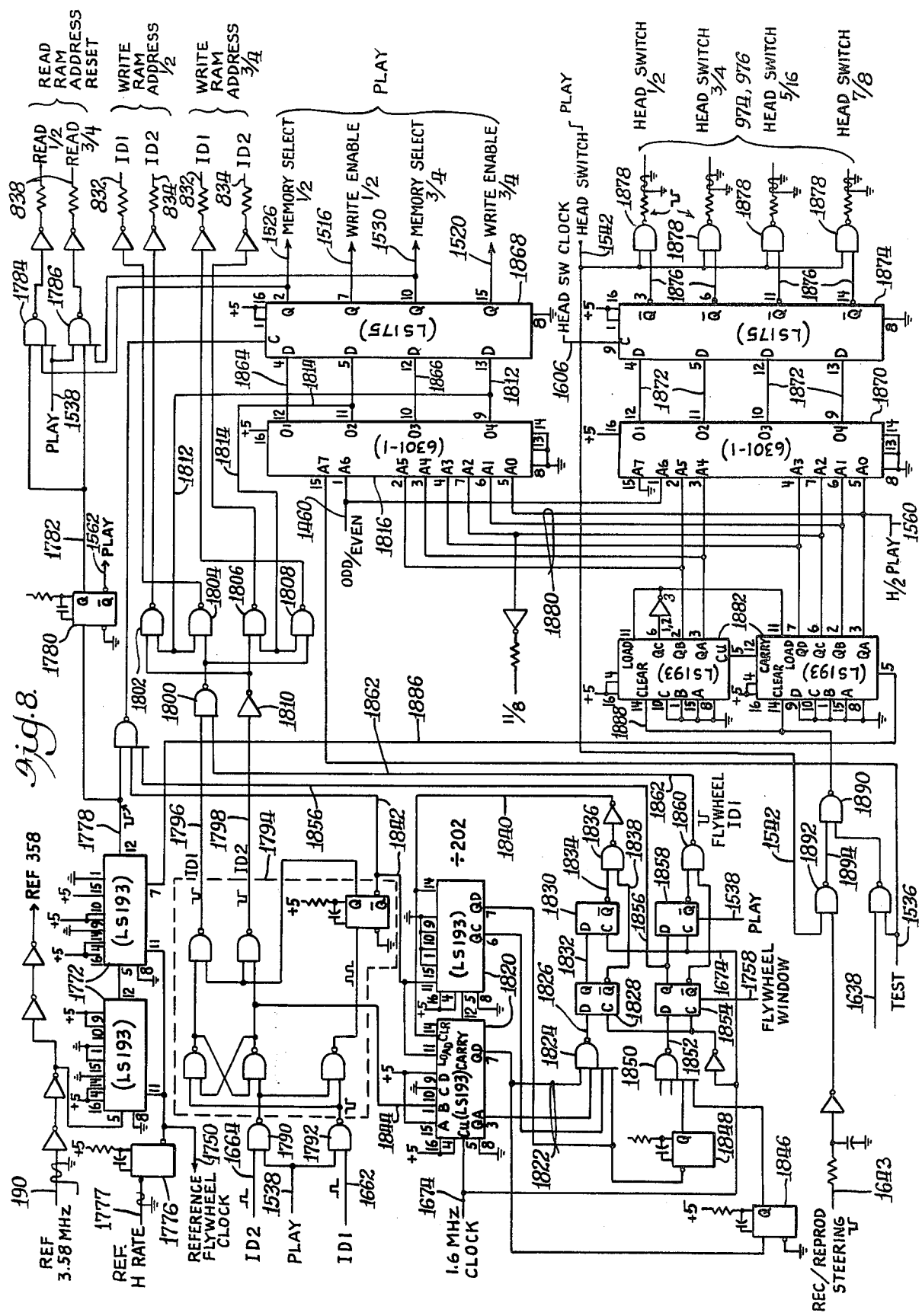
FIG. 8 is an electrical schematic diagram of circuitry for controlling the random access memories during a reproducing operation.

Other signals that are produced by the circuitry shown in FIG. 9 are provided on lines 1534, 1536, 1538 and 1540 which indicate that the EE, test, play and record modes are in process and these signals are applied to other of the memory control circuitry for control thereof as will be hereinafter described. Similarly, a head switch control signal is provided on line 1542 that is high during a reproducing operation and in a similar manner, a record current signal on line 1544 is used by other of the memory control circuit and it is high during a recording operation. The line 586 is used to control the 8-to-24 bit converters 50 and 52 and is high during a reproducing operation and controls the selection of either the 1.6 MHz or 3.58 MHz clock for clocking the data through the converter. Similarly, a control line 1546 is used to switch the encoder on or off by controlling a relay that turns on the 86 MHz oscillator portion of the encoder during a recording operation and disables it during reproducing. The circuitry also provides a signal on line 1550 for controlling the operation of the 2-to-1 switch 152 to select the output of the proper pair of the random access memories during reproducing as well as during the EE mode. Since the switching of the 2-to-1 switch occurs at a line-by-line rate, a H/2 signal that is synchronized to the record clocks is applied on line 1552 to a D flip-flop 1554 that is clocked by a H rate clock on line 1556 that is synchronized to the record clocks and is phase coherent with the 3.58 record clock. The H/2 rate signal on line 1550 for controlling the 2-to-1 switch is used during reproducing and is supplied by a D flip-flop 1558 that has a H/2 signal applied on line 1560 by the address generator 1882 (FIG. 8) and is clocked by line 1562 from the monostable multivibrator 1780 (FIG. 8).

Figure 7:
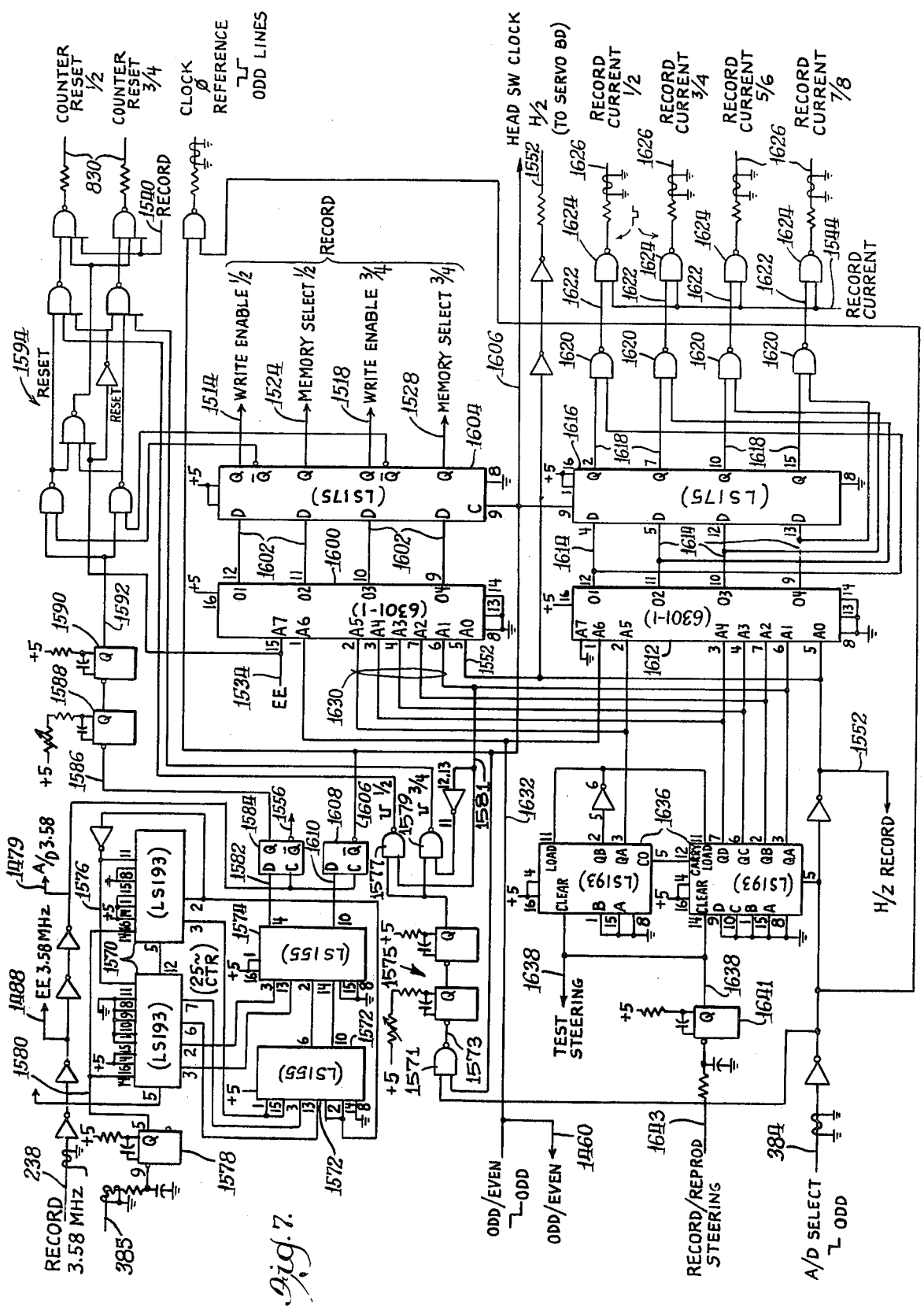
FIG. 7 is an electrical schematic diagram of circuitry for controlling the random access memories during a recording operation.

To control the memories during the recording operation, circuitry shown in FIG. 7 provides the proper write enable and memory select signals for controlling the memories in accordance with the timing diagrams shown in FIG. 4b and also provides signals for controlling the record current for the transducing heads for recording the signals on tape. In contrast to head switching that is done in the reproducing process, record current is applied to the transducing heads and effectively enables them to record the data on tape. As previously mentioned, the record current is sequentially applied to the eight heads in numerical order as they are identified in FIG. 2. Each head records eight video lines per pass across the tape and two heads are always simultaneously recording. Since the heads are equally spaced around the circumference of the head wheel, when head number 1 is half way across the tape, record current will be applied to head number 2. As the head wheel continues to rotate, record current will be applied to head current 3 at the time the record current is removed from head 1.

With respect to the circuitry shown in FIG. 7, the record clock frequency of 3.58 MHz is applied on input line 238 which is used to clock a counter 1570 that operates with selecting circuits 1572 and 1574 to provide a load signal on line 1576 which loads a preselected number so that the counter operates as a 25 cycle counter which corresponds to the amount of delay that is desired in the horizontal blanking interval before writing of the digital synchronization sequence begins. A horizontal sync signal on line 385 from the 455 counter and PROM 380 (FIG. 12) is applied to a monostable multivibrator 1578 which properly times the H sync signal so as to provide an output on line 1580 which clears the counter at the proper time, i.e., at the start of the blanking interval. The selector 1574 has output line 1582 which is applied to a flip-flop 1584 at the terminal count of 25 and provides a pulse on output line 1586 that is properly positioned by monostable multivibrators 1588 and 1590, the latter of which has output line 1592 that is sent through steering logic indicated generally at 1594 that provides the write reset pulses on lines 830 for resetting the appropriate one of the memories RAM 1 through RAM 4. Read reset pulses are also generated by the steering logic 1594. The 455 counter and PROM 380 (FIG. 12) supplies a 7.5 KHz odd/even line identifying signal on line 384 that is inverted and provided to one input of a NAND gate 1571. The second input of the NAND gate 1571 receives an enabling signal from the D flip-flop 1608 in response to the output from the selector 1574 on line 1610 at the end of the aforementioned 25 SC cycle interval. The NAND gate 1571 provides a pulse on its output 1573, which is coupled by a series of monostable multivibrators 1575, indicated generally at 1575, to one input of each of the NAND gates 1577 and 1579. The other inputs of the NAND gates are supplied by the address line 1581 from the address counter 1636. This address line is high when memories RAM 1 and RAM 2 are selected for reading and is low when memories RAM 3 and RAM 4 are selected for reading. Thus, the NAND gates 1577 and 1579 are selectively gated by the memory select signal on line 1581 to pass the H/2 rate pulses received from the NAND gate 1571 to the steering logic 1594, which responsively provides the read reset pulses to the memory selected for reading. In this regard, the entire circuitry shown in FIG. 7 is duplicated and the output designations ½ correspond to the same uses as was described with respect to the circuitry shown in FIG. 9.

To provide the write enable and memory select signals, a programmable read only memory 1600 is provided and it has four output lines 1602, each of which is applied to a D flip-flop 1604 which is clocked by a line 1606 having a horizontal rate clock thereon and the outputs of the D flip-flops 1604 provide the write enable and memory select signals as shown. The clock line 1606 originates from the flip-flop 1608 that is clocked by the 3.58 MHz clock but which has its D input supplied by line 1610 that occurs at a horizontal rate. The signals for providing the record current are also generated by a programmable read only memory 1612 which has output lines 1614 that are clocked by flip-flops 1616 and provide signals on lines 1618 that are gated through gates 1620 onto lines 1622 which are connected to one input of NAND gates 1624 which are enabled by line 1544 when a recording operation is in progress. Thus, the outputs of these gates appear on lines 1626 which extend to the various record current sources associated with the appropriate transducing head.

The read only memories 1600 and 1612 are addressed by address lines 1630, line 1552, the EE mode control line 1534, and line 1632 which is alternately low and high for odd and even numbered video lines. The line 1632 is low for one of the duplicate sets of circuitry shown in FIG. 7, i.e., the circuit that controls memories RAM 1 and RAM 3 and the duplicate circuitry has this line high since it controls the memories RAM 2 and RAM 4. The other addresses are controlled by the operation of an address counter 1636 which generates signals on output lines 1630 for accessing the proper information for generating the appropriate memory select, write enable and record current control signals in accordance with the timing diagram shown in FIG. 4b. The address controller 1636 is essentially a 5 bit or 32 cycle counter which is cleared by a signal placed on line 1638 by the output of a monostable multivibrator 1640. The monostable multivibrator 1640 is triggered by a signal on line 1643 that is connected to a servo control circuit (FIG. 28), which provides a processed H/64 tach reset pulse for every rotation of the head wheel, it being realized that for each rotation of the head wheel there will be 64 lines of data recorded on tape. By synchronizing the counter 1636 with this head wheel, the proper head will have record current applied at the proper time.

To control the operation of the random access memory RAM 1 through RAM 4 during reproducing, in addition to the circuitry described in FIGS. 7 and 9, circuitry particularly adapted for use in controlling this aspect of the operation of the memories is shown in FIGS. 8 and 10. As has been previously mentioned, the digital synchronization sequence that is added prior to every video line includes the ID 1 and ID 2 numbers which are used during the reproducing process to properly time the operation of the memory with respect to the data that is to be written in the memories. As recalled from the discussion of the synchronization sequence adder, each of the numbers ID 1 and ID 2 is written three times in succession within each cycle of subcarrier and the circuitry of FIG. 10 is adapted to process the ID 1 and ID 2 numbers that are decoded by the identification number decoders contained within the 8-to-24 bit converter circuits 50 and 52, to insure that they are valid. Since the identification numbers effectively determine the horizontal sync position during reproducing, it is important that they be reliable or the resulting picture would be horizontally displaced for those lines in which the identification information may be bad. In this regard, the ID 1 and ID 2 signals are applied via lines 634 and 636, respectively, together with a composite drop-out signal on line 682 which will enable NAND gates 1640 and 1642, if there has not been a detected composite drop-out, so that the three successive ID 1 and ID 2 pulses will be gated through the respective gates onto lines 1644 and 1646, respectively. Each of the lines 1644 and 1646 is applied to integrators, indicated generally at 1648 and 1650, which are operable to integrate the pulses and provide an output on lines 1652 and 1654, respectively, if two out of three of the three successive identification pulses occur. The lines 1652 and 1654 are applied to flip-flops 1656 and 1658 which are clocked by clock line 1660, which is obtained from a 1.6 MHz clock received on line 1468 that is derived from the reproduced data by the decoder and retimed by the memory control logic and clock circuitry illustrated in FIG. 9. The 1.6 MHz clock is derived from the reproduced data to be coherent with the data. The identification pulses are therefore reclocked by this clock signal and appear on lines 1662 and 1664. The 1.6 MHz clock on line 1468 is applied to two monostable multivibrators 1668 and 1670 for timing the clock signal and the output of the monostable multivibrator 1668 is applied to a second retiming monostable multivibrator 1672 that supplies a 1.6 MHz clock on line 1674 and is used to clock a 202 count counter. The output of the monostable multivibrator 1670 on line 1660 is also applied to a divide-by-2 divider 1676 having output lines 1680 and 1678 which, respectively, extend through inverters to the integrators 1648 and 1650. More specifically, line 1680 is applied through an inverter 1682 to line 1684 and is also applied to an inverter 1686 which is connected to line 1688 that is connected to the integrator 1650. Similarly, line 1678 is applied to line 1690 via inverter 1692, as well as to line 1694 via inverter 1696.

With respect to the operation of the integrator 1648, which is substantially identical to the operation of the integrator 1650, the ID 1 pulses on line 1644 are applied through inverters 1700 and 1702 which provide separate parallel paths on lines 1704 and 1706 which are respectively connected to capacitors 1708 and 1710. As previously mentioned, the presence of any two of three successive pulses will provide an output from one of two voltage comparators 1712 and 1714 if such occurs. The divide-by-2 divider 1676 alternately changes the level on lines 1690 and 1684 to alternately discharge the capacitors 1708 and 1710, thereby permitting one of the capacitors to be charging during the presence of the set of three ID pulses while the other is discharging. During the presence of the next sets of ID 1 pulses, the other capacitor is charged while the first is being discharged. If any two of the three successive ID 1 pulses are present, then the appropriate one of the voltage comparators 1712 and 1714 will provide an output level on line 1652 that confirms the presence of the identification ID 1 pulses. The integrator 1650 operates in the same manner with respect to detecting the ID 2 pulses.

The reclocking flip-flops 1656 and 1658, which reclock the detected ID 1 and ID 2 pulses, also have output lines 1720 and 1722, both of which are applied to a NAND gate 1724 which provides a signal on line 1726 that indicates the presence of detected ID 1 and ID 2 pulses. This signal is sent to the 8-to-24 bit converter and 2-to-1 switch circuitry 50 and 52 which, when not present, has the effect of commanding that circuit to provide a signal on the parity channels which will cause the drop-out compensators to insert a whole line of information rather than using the data stream data, for the reason that the absence of the detection of the identification pulses indicates that the horizontal timing may be incorrect and the entire line may be horizontally displaced which would disrupt the video image.

Lines 1720 and 1722 also extend to an integrator, indicated generally at 1732, which detects whether the signals from each of the channels is inverted or not and provides a signal on line 142 which is low when they are correct. This line effectively controls the operation of the switches 128 and 130 shown in the block diagram of FIG. 1. A H/2 play signal is applied on line 1560 by the address generator 1882 (FIG. 8) which triggers a monostable multivibrator 1740 which has an output line 1742 that is connected to a flip-flop 1744 having an output connected to a positioning monostable multivibrator 1746 that is triggered by an H rate pulse provided on line 1750 by the monostable multivibrator 1776 (FIG. 8). The output of the monostable multivibrator 1746 is applied to another monostable multivibrator 1752 which provides an output of proper duration on line 1754 which is gated through gate 1756 to provide a flywheel window signal on line 1758 that is used by the reproducing memory control circuitry shown in FIG. 8.

The operation of the monostable multivibrator 1740 also clocks a flip-flop 1760 which triggers a monostable multivibrator 1762 and provides the sequence window signal on line 1270 that is applied to the decoders 138 and 140 which are used to decode the occurrence of the synchronization sequence during reproducing as has been described.

Turning now to the circuitry shown in FIG. 8, it generates the memory select and write enable signals for operating the random access memories RAM 1 through RAM 4 during the reproducing operation, as well as supplies the ID 1 and ID 2 pulses to the memories. It also generates head switching signals for switching between the outputs of the preamplifiers so as to apply the proper output to the equalizers. A reference 3.58 MHz clock signal is applied on input line 190 which is used to clock a counter 1772 that is loaded by a signal on line 1750 that originates from a monostable multivibrator 1776 that is triggered by a station reference H rate signal on line 1777. The output of the counter appears on line 1778 that is supplied to a monostable multivibrator 1780 which has an output line 1782 that is gated through NAND gates 1784 and 1786 to provide the read address signal for the RAM address circuitry on lines 838. The NAND gates 1784 are enabled via line 1538 when the apparatus is in the play or reproducing operational mode and the signal is alternately gated through gates 1784 and 1786 by lines 1526 and 1530 so as to apply the read pulse to either memory RAM 1 or RAM 3. In this regard, the circuitry shown in FIG. 8 is also duplicated and the duplicate circuitry would control memories RAM 2 and RAM 4. The counter 1772 merely delays the occurrence of the H rate pulse on line 1778 for the proper time to have the memory set in its proper position to read the data therefrom in accordance with the timing diagram shown in FIG. 5b. The ID 1 and ID 2 pulses are applied to the NAND gates 1790 and 1792 via lines 1664 and 1662, respectively, and the gates are enabled during reproducing by a signal on line 1538. The circuitry, indicated generally at 1794, merely provides much narrower ID pulses than were present on input lines 1664 and 1662 and these pulses are applied via line 1796 and 1798 to steering logic comprising gates 1800, 1802, 1804, 1806 and 1808, together with inverter 1810. The outputs of the gates 1802 through 1808 provide the identification pulses on output pulses 832 and 834 as shown. The NAND gates 1802 through 1808 are enabled by signals on lines 1812 and 1814 which are two of the outputs from a read only memory 1816 which controls the steering of the identification pulses to the proper memory RAM 1 or RAM 3 or, in the case of the duplicate circuitry, the memory RAM 2 or RAM 4.

As previously explained with respect to the timing diagram of FIG. 6, there are 202 twenty-four bit and twenty-seven bit words that are written in and read from memory during recording and reproducing, respectively, and the 202 cycles represent 190 cycles of active video information together with 12 cycles containing the digital synchronization sequence. When the data is to be written into memory during reproducing, it is written using a 1.6 MHz clock. The 1.6 MHz clock is applied to the circuitry of FIG. 8 via line 1674 extending from the memory control circuitry illustrated in FIG. 10 and is used to clock a divide-by-202 divider 1820 which functions as a 202 cycle counter. At the terminal count of 201 (0 through 201 equals 202 cycles), the four output lines 1822 from the divider are applied to a number 201 decoder 1824, which provides a signal on line 1826 to a flip-flop 1828 that is clocked using the 1.6 MHz clock. The output of the flip-flop 1828 is applied to another flip-flop 1830 via line 1832 and has its $\overline{Q}$ output on line 1834 connected to a NAND gate 1836, the other input of which is applied by line 1838 from the flip-flop 1828. The gate 1836 produces a clear pulse on line 1840 that clears the counter 1820. The presence of the ID 1 signal is effective to load the counter 1820 via line 1842 with the number 9 and the presence of ID 2 has the effect of loading the counter with the number 11 via line 1844. This has the effect of disregarding writing the digital synchronization sequence into memory during reproducing since it is no longer needed for any further processing and the ID pulses effectively synchronize the 202 counter to the data that is present. However, in the event that the ID pulses are missing, then the 202 counter will continue to run through its 202 cycles and two of the output lines of the counter are applied to monostable multivibrators 1846 and 1848, which have their outputs connected to a NAND gate 1850. The NAND gate 1850 decodes the number 8 and provides a signal on line 1852 which is gated through a flip-flop 1854 if the flywheel window signal on line 1758 is present at that time. If it is, then a signal is provided on line 1856, which is clocked through another flip-flop 1858, provided line 1538 is high, which occurs when the apparatus is in the reproduce operation. The signal at the output of the flip-flop 1858 is passed through gate 1860 so as to provide a "flywheel" ID 1 signal on line 1862 which extends to the NAND gate 1800 and will provide the ID 1 signal to the memory. This has the effect of filling in the ID 1 when it is not present from the off-tape information.

The read only memory 1816 has output lines 1864 and 1866 in addition to output lines 1812 and 1814 and these four output lines are clocked through D flip-flops 1868 at the H rate to provide the memory select and write enable signals on lines 1526, 1516, 1530 and 1520 that are used to control the memories during a reproducing operation. In addition to the programmable read only memory 1816, another read only memory 1870 is provided and has output lines 1872 which are clocked through D flip-flops 1874 and onto line 1876 which extend to one input of NAND gates 1878 that are enabled by line 1542 when the apparatus is in the reproducing operational mode. The signals are then gated onto the output lines 974 and 976 for switching the outputs of the preamplifier into the appropriate equalizer. The addressing of the read only memories 1816 and 1870 are provided by address lines 1880 which, together with line 1460 access the information of these read only memories. The address signals on lines 1880 are provided by an address generator 1882 that is essentially a 64 cycle counter that is clocked at H rate by line 1886 from the counter 1772 and is cleared by a signal on line 1888 that is the output of a NAND gate 1890. The record/reproducing steering signal on line 1642 originates from the servo control board and occurs as a signal pulse for each rotation of the head wheel or at a 64 line rate. The signal on line 1643 provided by the servo control circuit (FIG. 28) is applied to a gate 1892 which is enabled during a reproducing operation and applies the signal on line 1894 which extends to the gate 1890 and has the effect of synchronizing the address counter to the rotation of the head wheel so that the proper head switching occurs during operation. One of the address lines 1880 provides the H/2 play signal and is specifically identified as line 1560.

During reproducing, the data that is read from the memories is applied to the 2-to-1 switch 152, a portion of which is shown in detail in FIG. 21. The lines 150 and 154 are applied to the 2-to-1 switch 152 and if the even lines are to be applied to the output lines 156, the control line 1550 (from FIG. 9) is high which selects the signals from lines 154 and when the signal on line 1550 is low, the switch selects the signals from line 150. As is evident from the drawing, only eight of the total 27 lines have been specifically illustrated.

Figure 23:
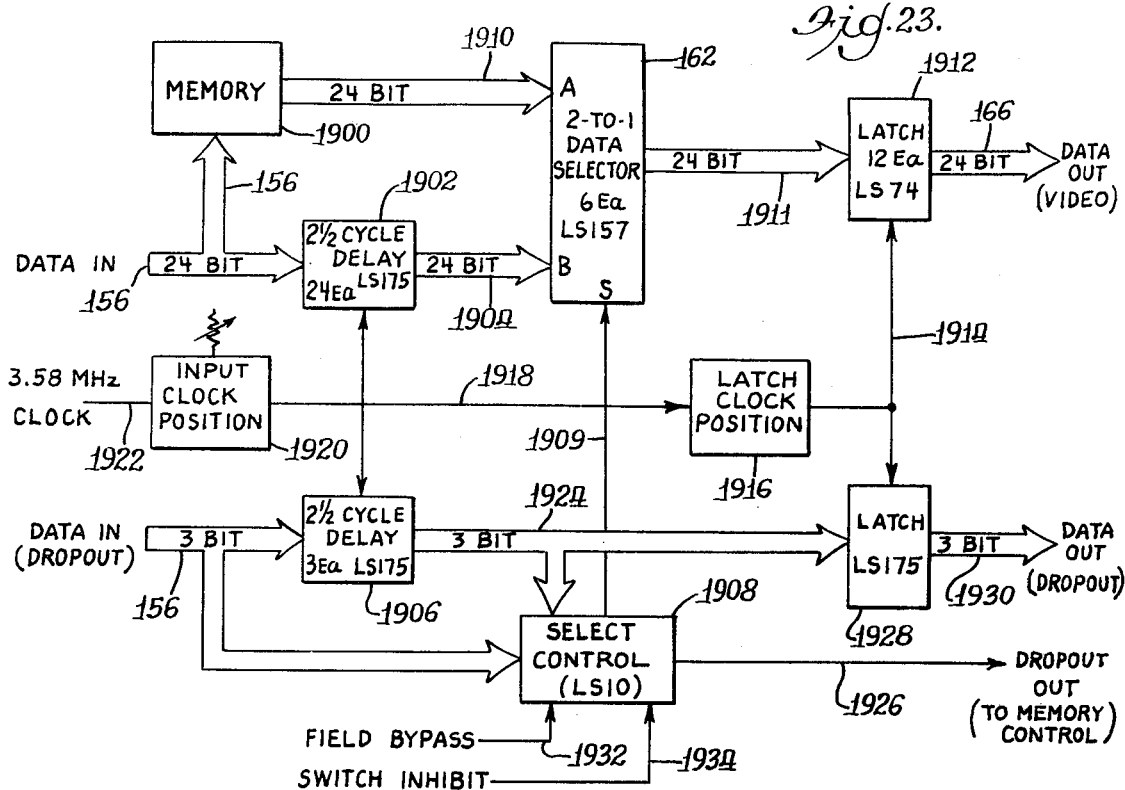
FIG. 23 is a block diagram of a portion of the drop-out compensator that can be used in the present apparatus.

Turning now to one specific embodiment of the drop-out compensator 160 that has been described with respect to the block diagram of FIG. 1 for the entire system, reference is made to FIG. 23 which illustrates a block diagram of the drop-out compensator 160 together with a downstream 2-to-1 data selector switch 162. As shown in FIG. 23, there are 24 bits of parallel data on lines 156 which are applied to a memory 1900 as well as to a $2\frac{1}{2}$ cycle (of the 3.58 MHz clock) delay circuit 1902 that effectively delays the application of the data to the 2-to-1 switch 162 via lines 1904 for the purpose of compensating for internal delays that are inherent in the operation of the memory 1900. The information indicating the existence of a drop-out is also applied via the three parallel lines 156 to a similar $2\frac{1}{2}$ cycle delay circuit 1906 and to a select control circuit 1908 that is operable to select either the video data interval received over line 1904 or the output of the memory 1900 appearing on lines 1910. The select control circuitry 1908 controls the 2-to-1 switch 162 via line 1909, passes the data from the memory 1900 whenever a drop-out or parity error occurs and provides the data that occurred 262 lines or a multiple thereof prior to the data in which the dropout is indicated, so that erroneous active video data will not be passed through the 2-to-1 switch 162 onto the output lines 1911. The output lines 1911 are applied to a latch 1912 that is clocked by a 3.58 MHz clock signal on line 1914 that is provided by an output monostable multivibrator 1916 that properly positions the output data. This clock signal is obtained from line 1918 which is provided by a monostable multivibrator 1920 that properly positions a 3.58 MHz clock signal on line 1922, which is synchronized with the subcarrier and provided by the clock generator circuitry 196. The output of the delay circuit 1906 is provided on line 1924 that extends to the select control circuitry 1908 for the purpose of providing the appropriate command to the 2-to-1 switch and the select control circuitry 1908 has an output line 1926 that extends to the memory 1900 and precludes it from writing bad data therein whenever a drop-out or parity error is present. The lines 1924 are also applied to a latch 1928 that is clocked by the 3.58 MHz clock signal on line 1914 and provides an output on line 1930 that may be used for other circuitry not shown.

The drop-out compensator shown and described herein has the advantage of a recirculating compensator in the sense that the data that is stored in the memory 1900 represents only nondefective data and therefore only nondefective data is available to be read and applied to the output lines 166. During operation, if a drop-out or parity error is detected, the memory is inhibited from writing the defective data at that time. If another drop-out or parity error occurs 262 lines later, the memory will again be inhibited from writing and will read the data that occurred and was written 524 lines previously, i.e., a multiple of 262 lines previously. As soon as nondefective data is present for the memory address locations corresponding to where writing had been inhibited it will, of course, be written into the memory 1900.

The $2\frac{1}{2}$ cycle delay circuits 1902 and 1906 compensate for the inherent delay of $2\frac{1}{2}$ cycles that is provided by the particular memory circuitry 1900, which effectively reads the video data and then immediately writes data. During operation of the memory, reading continually occurs even though a drop-out is present which would preclude writing data therein during operation. Even though writing is inhibited during the presence of a drop-out, the memory 1900 is operated in a manner whereby reading occurs after the inhibited write cycle. Reading from the memory 1900 occurs $2\frac{1}{2}$ cycles subsequently of any writing operation and it is for this reason that the $2\frac{1}{2}$ cycle delay is interposed in the data lines 156 containing the video data. The select control circuitry 1908 is also adapted to inhibit writing of the memory when an operator controlled field bypass line 1932 from the drop-out compensator memory control is active, as well as when a switch inhibit line 1934, also from the drop-out compensator memory control, is active. The switch inhibit line inhibits writing into the drop-out compensator memory during the vertical blanking interval as well as during the horizontal blanking interval because there is no active video information during these times, and the capacity of the memory can be accordingly decreased. It should be appreciated that the drop-out compensator is intended to insert data from the previous field in the event that the active video data is either missing or is incorrect and the purpose of the compensator is to correct the video image and has no purpose with respect to the horizontal and vertical synchronization signals. Accordingly, the switch inhibit line 1934 effectively disables writing into the memory 1900 during the horizontal and vertical intervals.

Figure 24:
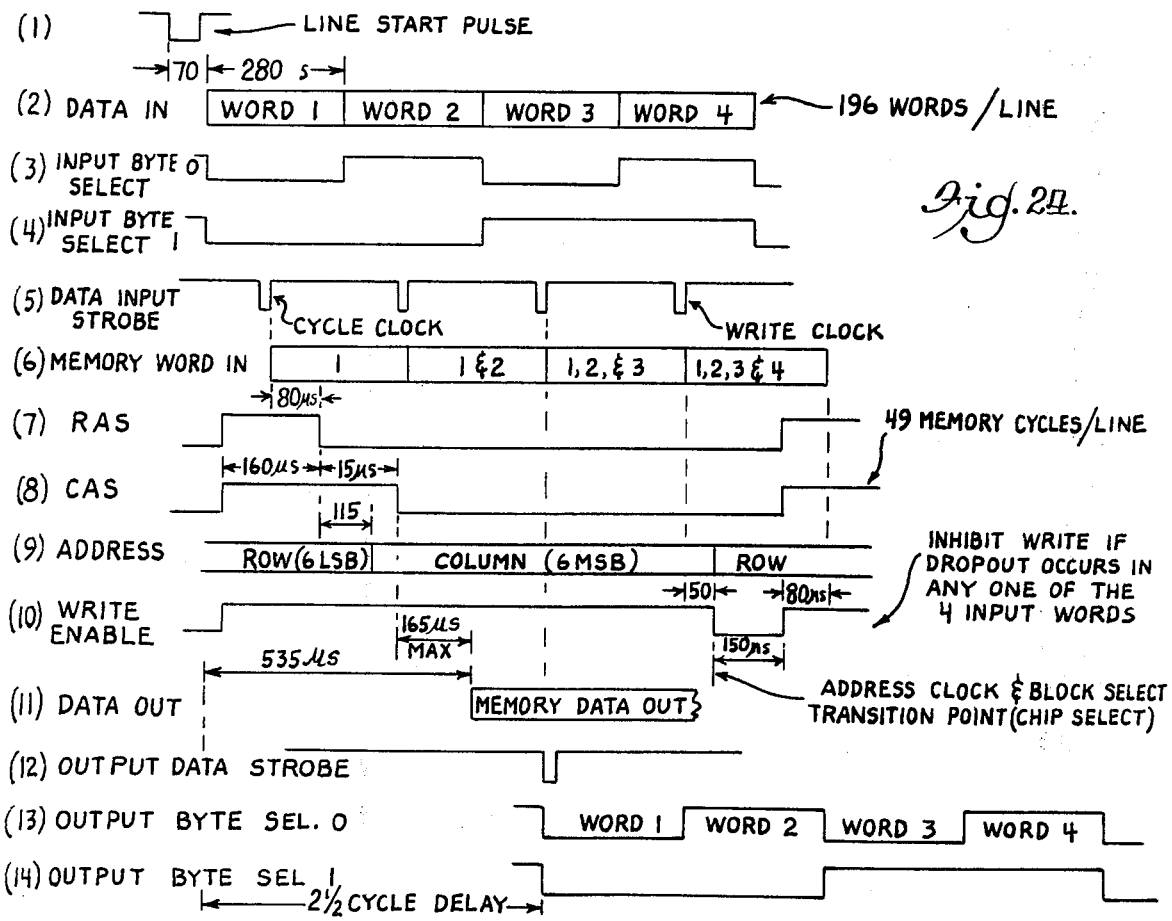
FIG. 24 is a group of diagrams illustrating the relationship of the timing sequences that occur during operation of one embodiment of the drop-out compensator.
Figure 25A:
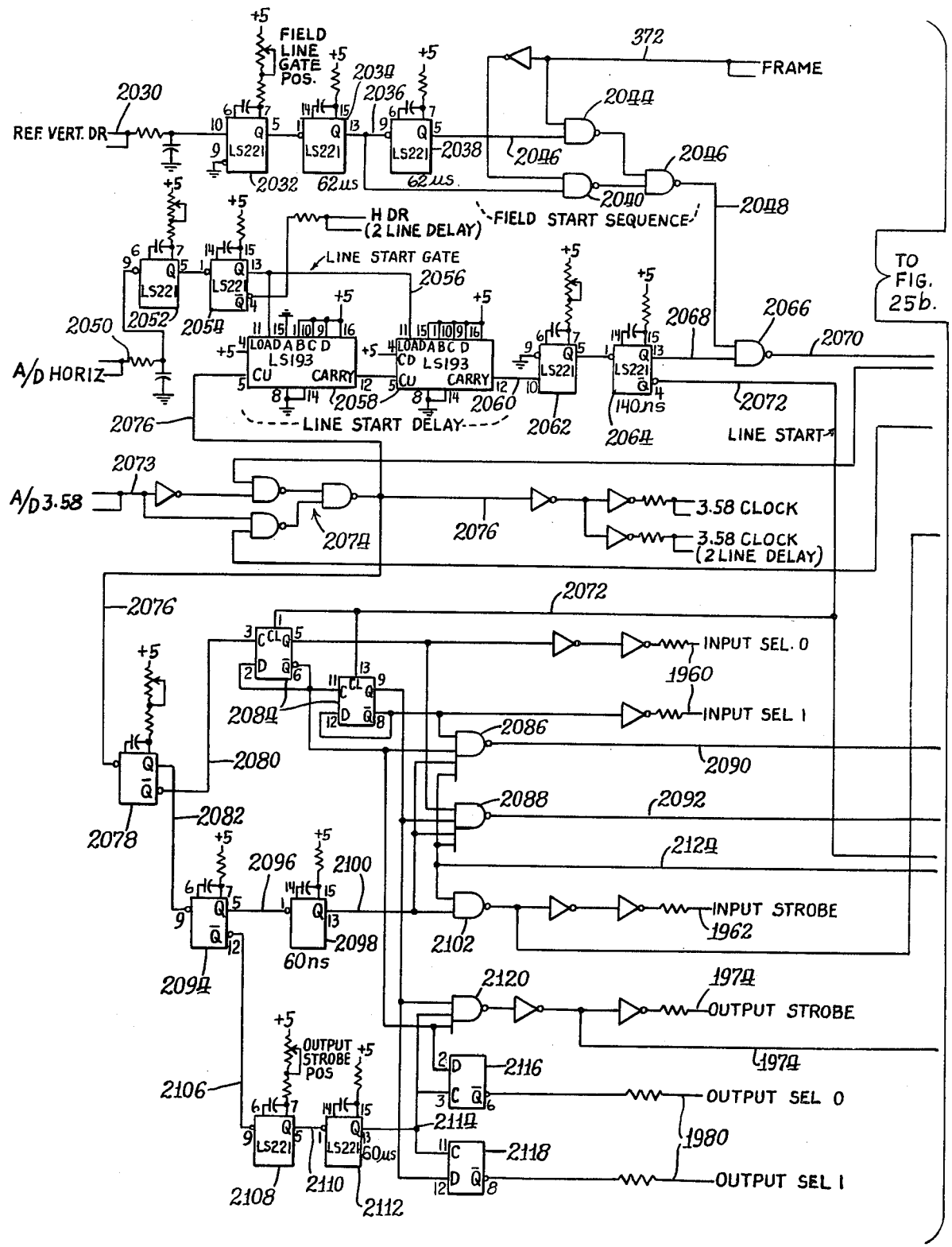
FIGS. 25a and 25b together comprise an electrical schematic diagram of a portion of the memory control circuitry for the memory of the drop-out compensator shown in FIGS. 26A and 26B.
Figure 25B:
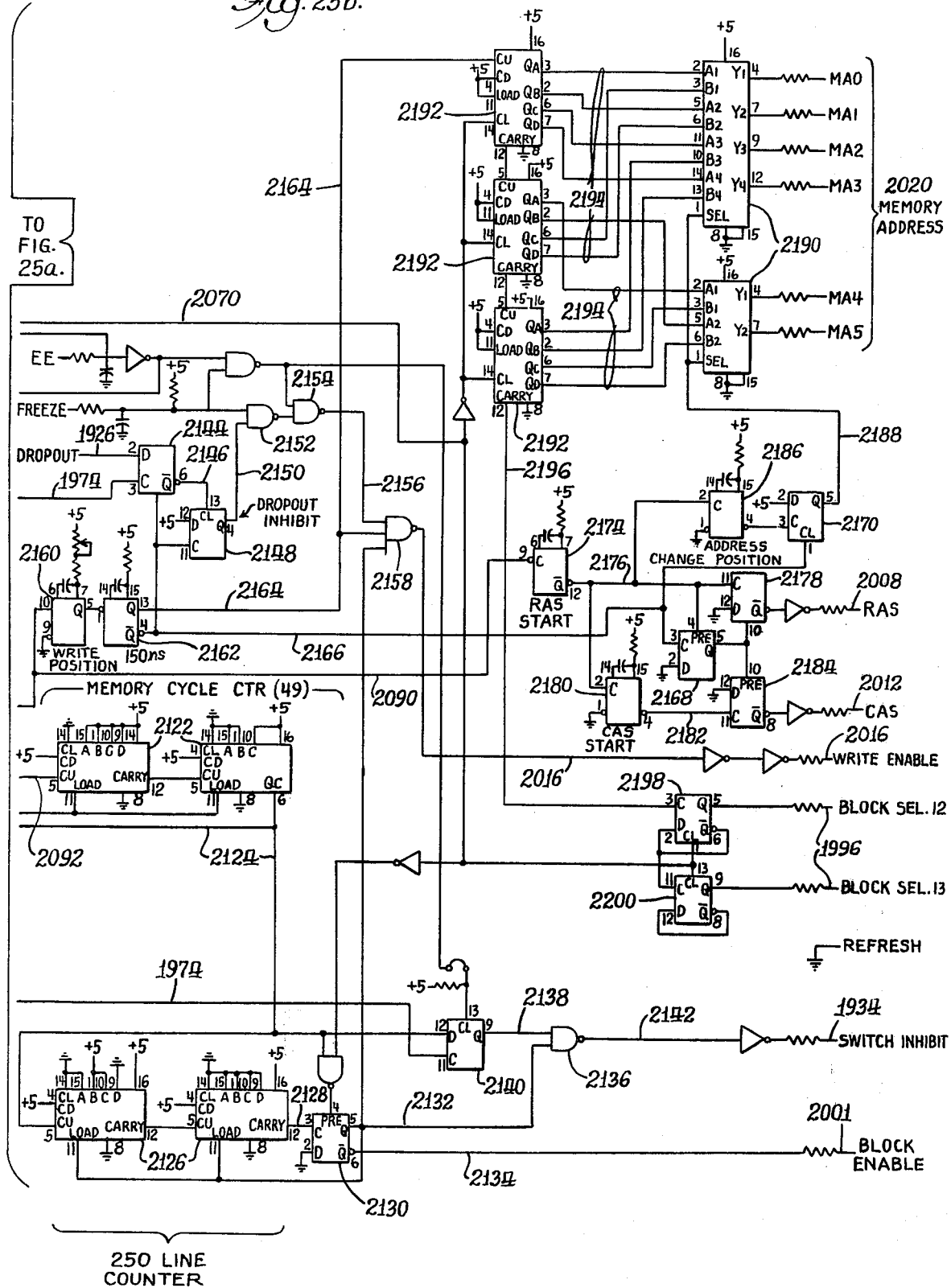
Figure 26A:
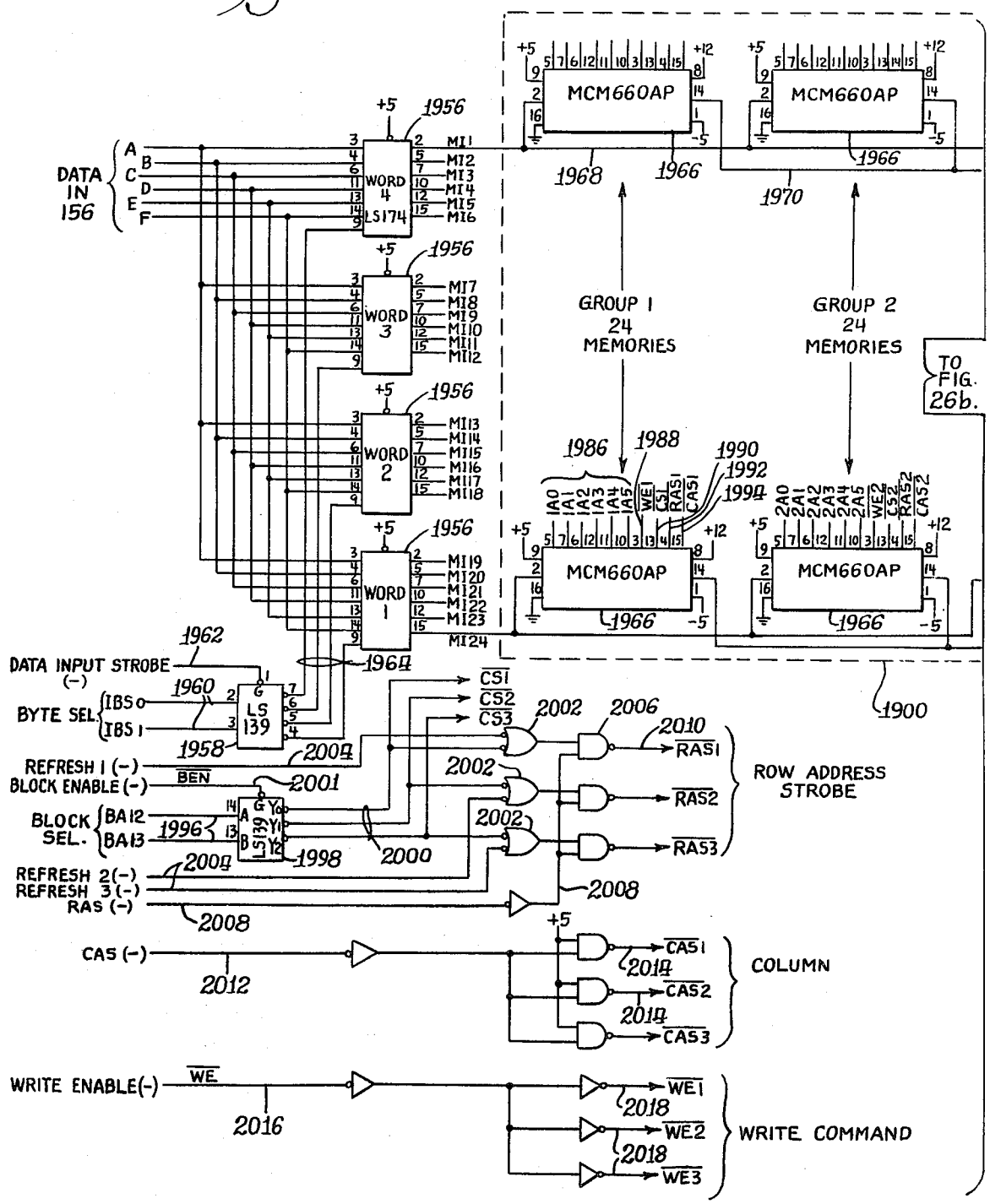
FIGS. 26a and 26b together comprise an electrical schematic diagram of the memory of the drop-out compensator.
Figure 26B:
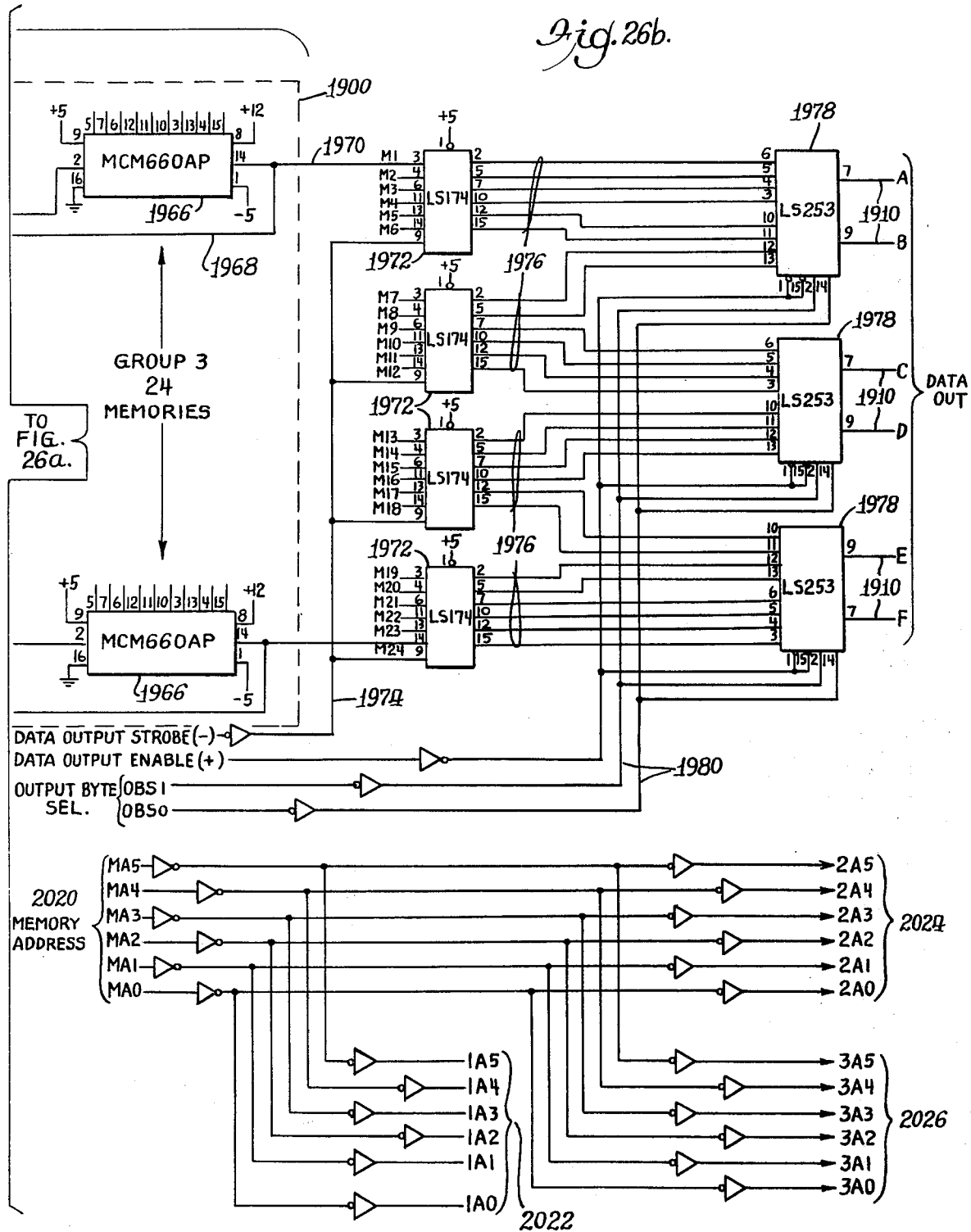
Figure 27B:
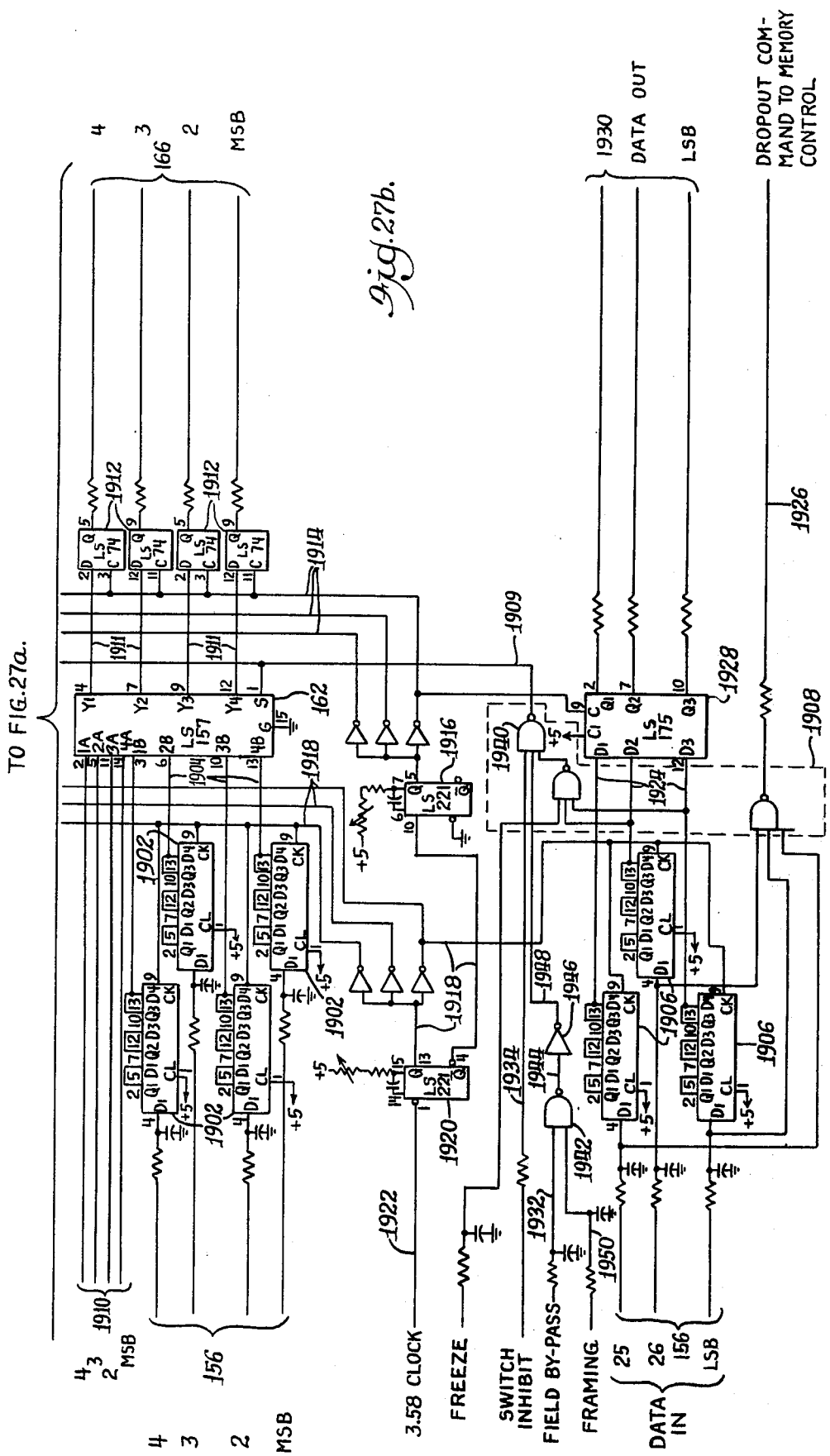

One embodiment of specific circuitry that can be used to carry out the operation of the block diagram of FIG. 23 is shown in FIGS. 26a, 26b, 27a and 27b in conjunction with timing diagrams shown in FIG. 24. The circuits illustrated in those figures receive various control signal inputs from the drop-out compensator memory control illustrated in FIGS. 25a and 25b, which will be described in detail hereinbelow. Turning initially to the data switching portion of the circuitry shown in FIGS. 27a and 27b, the 24 video data lines 156 are applied to the 2½ cycle delay circuits 1902 which comprise four flip-flops for each line that is in a single package and function as a shift register with the output of each shift register being applied to the 2-to-1 switch 162 via lines 1904. Similarly, the 24 data lines 1910 from the memory are applied directly to the 2-to-1 switch 162 as shown. Referring to FIG. 27b, the switch inhibit line 1934 is applied to an AND gate 1940 which has output line 1909 for controlling the operation of the 2-to-1 switch 162. Similarly, the operator controlled field bypass line 1932 is applied to an AND gate 1942 that has output line 1944 connected through an inverter 1946 to line 1948 that extends to the AND gate 1940. The framing line 1950 from the servo (FIG. 28) is also connected to the AND gate 1942 and effectively inhibits the insertion of data from the drop-out compensator when the servo system is attempting to properly frame the tape and the magnetic transducing heads are crossing tracks during the active video. In this regard, when line 1909 is low, the data from lines 1910 is selected by the 2-to-1 switch 162 and when it is high, the data from lines 1904 is selected.

Turning now to the random access memory associated with the drop-out compensator 160, it should be understood that the particular embodiment shown in the block diagram of FIG. 23 represents essentially a 262 line delay and one embodiment of a memory that can be used therein is shown in FIGS. 26a and 26b which together comprise a single electrical schematic diagram. The circuitry for operating the memory shown in FIGS. 26a and 26b is shown in FIGS. 25a and 25b and will be subsequently described. It should be understood that the particular memory shown in the drawings is representative and can be replaced by other memory devices that could operate faster and have greater capacity so as to reduce or eliminate much of the complexity and timing requirements that are present and which will be described. In the memory illustrated in FIGS. 26a and 26b, there are 72 separate integrated circuits, each having a capacity of 4,096 bits and, as is well known, integrated circuits having significantly greater capacity are now available, which would simplify many of the switching and control circuitry that will be described herein. In this regard, the memory 1900 has a total capacity of about 295,000 bits and the detailed circuitry shown in FIGS. 26a and 26b represents only ¼ of the total. As previously mentioned, there are 24 data lines and the circuitry shown in FIGS. 26a and 26b is operable to provide memory for data for 6 of the 24 lines. The operating speed of the memory is less than the 3.58 MHz data rate, which requires grouping of the data into data words that are operated upon by the slower memory integrated circuits. The data words are sequentially applied to latches and then presented to the memories in groups of four words so that the memories operate on the data at about ¼ the data rate of 3.58 MHz, which is compatible with their speed capability.

More specifically, with respect to the circuitry shown in FIGS. 26a and 26b, six of the 24 data lines 156 are applied to four integrated circuit latches 1956, which are flip-flops that operate to latch the data therein for subsequent processing by the memory 1900. A data selector 1958 is adapted to control the latching of the data into the appropriate one of the latches 1956 at the appropriate time which is controlled by two byte select lines 1960 together with a data input strobe signal on line 1962. The two byte select lines 1960 control the selector 1958 so that it selectively activates one of the four output lines 1964 to strobe the data into one of the latches 1956. During operation, the data on lines 156 occurs at the 3.58 MHz data rate and the byte select control lines 1960 are activated at the 3.58 MHz rate so as to sequentially latch the six bits of data for four consecutive words into the four latches 1956 so that after four cycles of the 3.58 MHz clock, 24 bits are loaded into the latches 1956 for subsequent writing into the memory 1900. As is shown in the drawings, the memory 1900 comprises 72 individual integrated circuits 1966, each of which provides 4,096 bits of random addressable memory with the 72 integrated circuits being grouped into three groups of 24 integrated circuits arranged in vertical rows as shown. Each of the output lines, such as the line 1968 from each of the latches 1956 extends to three of the memories 1966 so that depending on which group is activated, the data on the line 1968 can be selectively written into any one of the memories 1966 of the three respective groups. Similarly, output lines 1970 from the individual memories are interconnected and extend to respective output latches 1972 shown in FIG. 26b. Thus, depending upon which group of memories 1966 ae read, the read data appears on line 1970 which is latched into the latches 1972 when the signal on a data output strobe line 1974 is true. The outputs of the latches 1972 appear on lines 1976 which extend to 4-to-1 data selector switches 1978 that are controlled by output byte select lines 1980 to assert the data from one of four possible lines 1976 to the corresponding output line 1910. The output byte select lines 1980 are switched at the 3.58 MHz rate so that the six output lines 1910 are provided with data at the same rate as the data is applied at the input on lines 156, even though the actual processing of the data through the memory occurs at a rate that is ¼ the input and output data rate.

Each of the individual random access memories 1966 has six address lines 1986 as well as a write enable line 1988, a group select line 1990, a row address strobe line 1992 and the column address strobe line 1994. The addresses are applied to the address lines 1986 in two steps, i.e., row address signals are applied to the six address lines, followed by column address signals on the same lines. The row is addressed when the row address strobe 1992 is applied and the column is addressed when the column address strobe signal is applied to line 1994. Thus, the group 1, group 2 or group 3 memories 1966 are written into or read from when the group select lines 1990 for the appropriate group are true. Circuitry is also shown in the lower portion in FIGS. 26a and 26b for controlling the memories 1966. Group select lines 1996 are applied to a selector circuit 1998 having three output lines 2000, any one of which is active at one time for selecting one of the groups of the memories 1966. The lines 2000 also supply one input of NAND gates 2002, the other input of which is provided by lines 2004 which respectively control the refreshing of the respective groups of memories with the output of the gates 2002 being applied to NAND gates 2006, the other input of which is supplied by line 2008 which has the read address strobe signal. The output of the gates 2006 provides the row address strobe signal on line 2010 that occurs for only one group at any one time. A column address strobe signal on line 2012 provides column address strobe signals on lines 2014 that occur simultaneously for each group. Similarly, a write enable command on line 2016 provides write enable commands on lines 2018 that are applied to each group of memories. Because of the manner in which the internal circuitry of the memories operate, only the row address strobe signal needs to be selectively applied so that only one group of memories is selected. After one group has received the row address strobe signal, column address strobe and write enable commands for the nonselected groups are ineffective to cause them to operate. Turning to FIG. 26b, address lines 2020 are connected to simultaneously provide address signals on lines 2022, 2024 and 2026 which extend to the three groups of memories 1966.

Prior to describing the circuitry of FIGS. 25a and 25b which generate the input signals to the memory circuitry shown in FIGS. 26a and 26b, reference is made to the timing diagrams of FIG. 24 which illustrate the timing sequences for writing and reading data into and out of the memories.

It should be understood that the entire data from each video field is not written into the memory because of several reasons, one of which is that writing all of the information necessarily includes data that is not useful in correcting the active video and thereby represents a waste of memory capacity. Moreover, it is not desired to compensate for drop-outs of data that are used by the servo mechanisms, since this can easily cause more problems than are solved and fly wheel circuits and the like which have been previously described are adequate to control the servo operation. Accordingly, it is only desired to write data for the active video information and consequently, the data that occurs during the vertical interval of about 20 lines is not written into memory, nor is any data written into memory during substantial portions of the horizontal interval. Thus, data for 196 cycles of subcarrier for each active video line comprises the totality of the data that is written into memory, this amount essentially providing the active video information of 190 cycles, plus three cycles at each end of the line, which provides some allowance that insures that all of the active video information is written into memory. Thus, in terms of 24 parallel lines of data occurring at a 3.58 MHz rate, wherein the 24 bits comprise three samples per subcarrier cycle, there will be 196 24 bit words per processed television line that are written into memory. Referring to FIG. 24(2), words 1 through 4 are specifically illustrated and it is understood that 196 24 bit words will be present in each line. As previously described with respect to the memory shown in FIG. 26a, the words are multiplexed for operation by the memory 1900 so that the 196 words per line are written into memory using 49 memory cycles, i.e., the data is written into memory and read from memory using 96 bit words at ¼ the 3.58 MHz rate and the timing diagrams shown in FIG. 24 illustrate the manner in which groups of four words are processed by memory. The input byte select signals are shown in FIGS. 24(3) and 24(4) which together generate the two bit binary code for multiplexing the words into the appropriate latches 1956 (FIG. 26a), and FIGS. 24(13) and 24(14) illustrate the output byte select signals for reading the information from the 4-to-1 switches 1978 (FIG. 26b). The address for the memory integrated circuits 1966 is selected by addressing the rows using a six bit address word on the address lines followed by a column address on the same address lines and FIG. 24(7) illustrates the row address strobe followed by the column address strobe in FIG. 24(8). The timing shown in FIG. 24(7) through FIG. 24(11) are in nanoseconds and represent basic tolerances which permit the memory to operate within its timing capability to produce valid information. The end of the CAS pulse effectively initiates the read cycle, the data being valid within 165 nanoseconds of the end of the CAS pulse, as shown in FIG. 24(11). The occurrence of the next output data strobe (FIG. 24(12)) then latches the data from memory, and as shown, the time period from the beginning of word 1 being written into memory and the first opportunity it can be read from memory represents a 2½ cycle delay as shown at the bottom of the drawing. As is evident from FIGS. 24(7) and 24(8), the addresses are maintained for a period of four words and after reading occurs, writing is performed as shown by the occurrence of the write enable pulse shown in FIG. 24(10) which occurs after the fourth word has been latched into the latches 1956. If a drop-out occurs during the presence of any one of the four words, then writing is inhibited and the data in the memory is not updated.

As previously mentioned, the data during the 20 lines of vertical interval is not written into the memory so that only 242 lines forming the video data interval are written into memory rather than the total of 262.5 lines forming a television field. By providing four lines on each end of the vertical interval to provide a centering tolerance, a capacity of 250 lines need only be required to provide an actual effective delay of 262 lines. Accordingly, when writing is to be performed, the memory is inhibited until line 17 of the field, at which time the memory is activated and 250 lines are then written into the memory before it has been inhibited for 13 additional lines whereupon the second field of a frame will be written into memory beginning with line 279. It is important that the memory begin on an odd line for the subsequent field if it had begun on an odd line in the initial field. Thus, as has been described, when line 17 of the first field is the first line to be written, writing line 279 of the second field conforms to this requirement which is necessary in order for the proper phase of the subcarrier to be maintained.

To carry out the operation of the memory in accordance with the timing requirements that have been described, the circuitry shown in FIGS. 25a and 25b operates to provide the necessary signals that are used by the circuitry shown in FIGS. 26a and 26b to operate the input latches, memory circuits, output latches and other circuit components. Turning initially to FIG. 25a, a station reference vertical signal is applied on line 2030 that is connected to the input of a positioning monostable multivibrator 2032, the output of which is connected to the input of another monostable multivibrator 2034 that is connected via line 2036 to the input of a third monostable multivibrator 2038 and a NAND gate 2040. The other input of the NAND gate 2040 is supplied by a frame signal on line 372 from the digital synchronization sequence adder circuitry 40. Line 372 is also connected to a NAND gate 2044 that has as its other input line 2046 that is supplied by the monostable multivibrator 2038. The outputs of the gates 2040 and 2044 are connected, respectively, to the two inputs of a gate 2046 that produces a single pulse on line 2048 that occurs at the first line of each field, and this pulse is used to begin the field start sequencing that is used by other circuitry as will be described.

A reference horizontal sync pulse that is synchronized with subcarrier is applied on line 2050 which is properly positioned by the cascaded monostable multivibrators 2052 and 2054, with the output line 2056 of the latter extending to counters 2058 which operate to provide a predetermined delay that is approximately four or five cycles of subcarrier. The delayed pulse appears on line 2060 and is also applied to cascaded monostable multivibrators 2062 and 2064, the former of which properly positions the delayed pulse while the latter provides a pulse having a 140 nanosecond pulse width. The output line 2068 of the monostable multivibrator 2064 is connected to a gate 2066 so that the single pulse that is produced on line 2048 is passed at the proper time relative to horizontal sync and produces a field start signal on line 2070 as well as a start signal line on line 2072.

The field start signal on line 2070 effectively clears the address counter that addresses the memory circuits 1900. A reference 3.58 MHz clock on line 2073 is gated through gates indicated generally at 2074 and provides a clock signal on line 2076 for use by the counters 2058 and also as the input to a monostable multivibrator 2078 that positions the phase of the clock and provides a rephased 3.58 MHz clock signal on lines 2080 and 2082 that control the remainder of the circuitry shown in FIGS. 25a and 25b. More specifically, the line 2080 is applied to a pair of flip-flops 2084 which are connected to function as a divide-by-4 counter and generate the input byte select signals on lines 1960. The flip-flops 2084 are reset by line 2072 so as to synchronize the word counter every 49 counts, i.e., at the beginning of the video interval portion of every line. The output lines of the flip-flops 2084 are also decoded by NAND gates 2086 and 2088 and produce signals on lines 2090 and 2092 which comprise the main clocking for the reading and writing operations that are done by the memory. The signal on line 2090 comprises a pulse that occurs at the first word of the four word sequences and the signal on line 2092 comprises the write clock and occurs at the fourth word of every four word sequence. The output line 2082 from the monostable multivibrator 2078 is used to trigger a monostable multivibrator 2094 that is used to properly position the input strobe and output line 2096 triggers a monostable multivibrator 2098 that provides a 60 nanosecond output pulse on line 2100 that extends to a gate 2102 that provides the data input strobe signal on line 1962. Similarly, the $\overline{Q}$ output line 2106 of the monostable multivibrator 2094 extends to a monostable multivibrator 2108 that properly positions the output strobe signal and output line 2110 triggers a monostable multivibrator 2112 which provides a 60 nanosecond pulse on line 2114 that clocks flip-flops 2116 and 2118 which have output lines 1980 for generating the output byte select signals. Line 2114 also extends to a NAND gate 2120 which, together with outputs from the flip-flops 2084, generate the output strobe signal on line 1974.

The line start signal on line 2072 is also applied to a 49 count counter 2122 to load the same and the counter 2122 is clocked by line 2092 which has a pulse every fourth word when the gate 2088 is enabled. When the 49 count memory counter 2122 reaches the terminal count, then the signal on line 2124 disables gate 2086 as well as gate 2088 until the video interval portion of the next television line is received. The signal on line 2124 also clocks a 250 line counter 2126 that has output line 2128 extending to a flip-flop 2130. The flip-flop 2130 has output lines 2132 and 2134, the former of which extends to one input of a gate 2136, the other input of which is supplied by line 2138 from a flip-flop 2140 that is clocked by output strobe line 1974. The signal on line 2138 provides line blanking whereas the signal on line 2132 provides field blanking of either 12 or 13 lines and the output of the gate 2136 is provided on line 2142 that is inverted and provides the switch inhibit signal on line 1934 (see FIG. 27b).

If a drop-out has been detected and a drop-out command signal has been generated on line 1926 which extends to a flip-flop 2144, the 3.58 Mhz output strobe signal on line 1974 will clock the drop-out command signal on line 1926 through the flip-flop 2144 onto line 2146. The passed through drop-out command signal clears a flip-flop 2148 and its output line 2150 will have a signal that is gated through gate 2152 and gate 2154 to provide a drop-out disable signal on line 2156 that will disable gate 2158 and preclude the write enable signal from being asserted on line 2016. Thus, if a drop-out appears for any one of the four words, the write enable will not be asserted, which will prohibit bad data from being written into the memory. The signals on line 2090 which occur every fourth word also trigger a monostable multivibrator 2160 which properly positions the signal and its output is connected to another monostable multivibrator 2162 that provides a 150 nanosecond pulse on line 2164. The $\overline{Q}$ output line 2166 of the monostable multivibrator 2162 is applied to clock a flip-flop 2168 as well as to the clear input of a flip-flop 2170. If the drop-out inhibiting signal is not present on line 2156, then the signal on line 2164 will be gated through gate 2158 and produce the write enable signal on line 2016 at the proper time after the fourth word has been written into the input latches 1956. Line 2090 is also applied to a monostable multivibrator 2174 and triggers the same to provide the RAS start on line 2176, which clocks a flip-flop 2178 that provides the RAS pulse on line 2008. The output line 2176 also triggers a monostable multivibrator 2180 which has an output line 2182 that clocks a flip-flop 2184 that produces the CAS pulse on line 2012. Line 2176 also triggers yet another monostable multivibrator 2186 that has an output which clocks the flip-flop 2170 to change the address from one set of six inputs to the other set of six inputs via line 2188 that is the select line for a pair of 2-to-1 integrated circuits 2190 containing 2-to-1 switches. The switches have six output lines 2020 that are connected to the address inputs of the memory chips 1966. The addresses are provided by address generators 2192 which have 12 output lines 2194 that are connected to the 2-to-1 switches 2190 and the address generator 2192 is clocked by line 2164 which is incremented every fourth word in the manner that has been described with respect to FIG. 24. A line 2196 from the address generator 2192 is applied to the clock input of a flip-flop 2198 that cooperates with a flip-flop 2200 to generate the block select signals on line 1996 for selecting the proper group of rows of memory as previously described. The field start signal on line 2070 clears the address generator 2192 as well as the flip-flops 2198 and 2200 at the beginning of every field.

Figure 28:
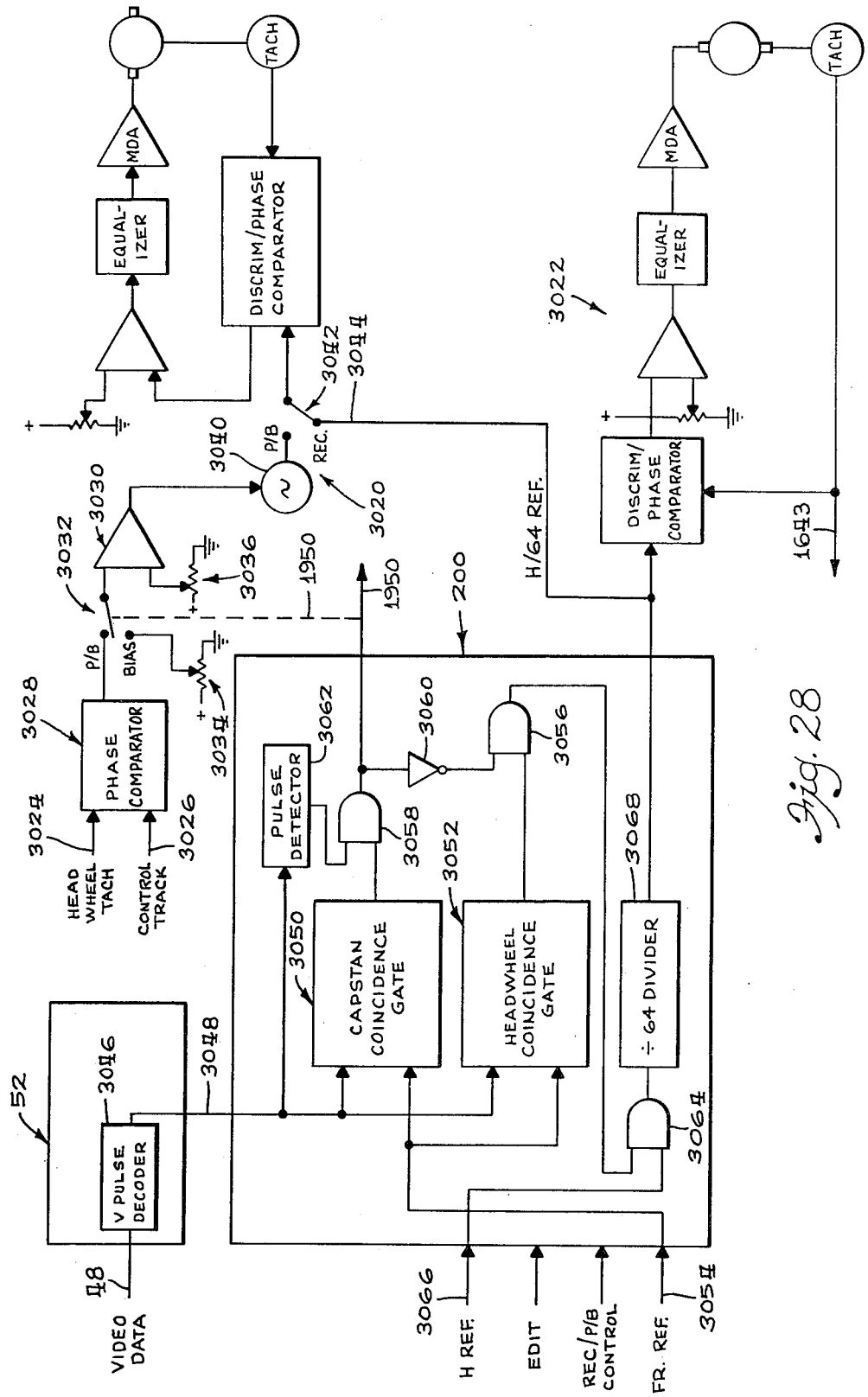
FIG. 28 is a block diagram illustrating the servo control system of the recording and reproducing apparatus described herein.

Referring to FIG. 28, there is exemplified a servo system of generally conventional capstan and head wheel servo loops 3020 and 3022, respectively, employed to maintain synchronous control of the tape movement and of the head wheel rotation during the record and reproduce operations. Typical of servo loops 3020, 3022 are those described in the Ampex Corporation, AVR-1 Videotape Recorder, Operation and Maintenance Manual, catalog No. 1809214, issued July, 1976, particularly in pages 6-4 through 6-31 and 6-45 through 6-84, which description is incorporated by reference herein.

As previously described, the usual off-tape horizontal and vertical sync information typically used to provide servo control during reproduce operations are not available. Instead, the servo system is controlled by employing the horizontal line interval related signal extracted from the reproduced data, i.e., the unique digital word series at line interval 1050, that is inserted in the stream of processed television data during the record operation by the sequence adder circuitry 40 of previous mention shown in, for example, FIGS. 1 and 12.

In FIG. 28, the conventional head wheel tach pulses and 246 Hz (NTSC standard) control track signal off tape, are applied to a phase comparator 3028 via lines 3024, 3026 respectively. The output of the latter is applied to a differential amplifier 3030 (which performs a comparison) via a playback contact of a playback/-frame bias switch 3032. The frame bias contact of the switch 3032 is coupled to a fixed frame bias source 3034. The second input to the amplifier 3030 is coupled to a fixed reference voltage 3036. The switch 3032 is controlled by a signal on a line 1950 from playback circuitry within the logic and servo feedback circuit 200 of previous mention. A voltage controlled oscillator 3040 is coupled to the output of the differential amplifier 3030 and thence to a playback contact of a switch 3042, whose record contact is coupled to the H/64 reference signal on a line 3044 derived from a horizontal (H) reference signal on a line 3066, further discussed below. Switch 3042 is in turn coupled to the capstan servo loop 3020.

In generally conventional fashion, during the record mode the capstan and head wheel servos 3020, 3022 are locked together in response to the H/64 reference signal on line 3044.

In the reproduce mode, the series of unique digital words, which identify the frames to derive vertical sync, are extracted via, for example, a vertical pulse decoder 3046 in the converter/switch circuit 52, which may be similar to the decoding gates 622, 624 of FIG. 18b. The extracted series of digital words are fed via a line 3048 (corresponding to lines 634, 636 of FIG. 1) to capstan and head wheel coincidence gates 3050, 3052 respectively. The latter gates also recieve the frame reference (FR. REF.) sync signal from the sync generator 192 of previous mention via a line 3054. Gate 3050 is coupled to an AND gate 3056 via an AND gate 3058 and an inverter 3060, wherein AND gate 3056 is also coupled to the head wheel coincidence gate 3052. AND gate 3058 also is coupled to a pulse detector circuit 3026 which detects the presence of the frame-identifying unique digital words on the line 3048.

The AND gate 3056 in turn is coupled to an AND gate 3064 which also receives the horizontal reference (H-ref) sync signal from the sync generator 192 via a line 3066. A divide-by 64 ($\div 64$) divider 3068 is coupled to the AND gate 3064, and provides the H/64 signal to control the servo loop of the head wheel servo 3022.

During the reproduce process, the series of unique digital words which identifies line one of the first of the fields of the four-field sequence in the NTSC format, are compared with the frame reference signal. When the capstan gate 3050 detects that the tape is not properly synchronized with the frame reference, AND gate 3058 provides a logic level, on line 1950 which activate the switch 3032 to connect the amplifier 3030 to the fixed frame bias source 3034 which, in turn, runs the capstan off frequency to properly position the tape with respect to the frame reference. The capstan coincidence gate 3050 then detects the tape sync condition, the switch 3032 is returned to the playback position, and the capstan is locked to the head wheel tach.

If the head wheel coincidence gate 3052 detects that the head wheel is not properly synchronized with the frame reference signal, it generates additional pulses which are fed to the $\div 64$ divider 3068 to drive the head wheel into proper sync via the head wheel servo loop 3022. When the head wheel achieves sync with the frame reference signal, the head wheel servo is locked to the horizontal reference related H/64 signal and the servo system is color framed to provide synchronous reproduction of the processed television signal.

The pulse detector 3062 detects the presence of the unique digital words and prevents eratic operation of the servos in the absence of the frame-identifying digital words.

From the foregoing description, it is apparent that several read only memories are included in the apparatus and the programming for these memories is shown in the following chart. The memories are all of the type which have four output lines and the output code is in hexadecimal format which is well known. For each of the read only memories herein, the addresses are specified together with the hexadecimal output that is generated at the corresponding address.

CHART I

Outputs—Addresses for ROM 376 (top)

4—46, 110, 174, 238
8—44, 108, 172, 236
0—0-12, 14, 32-43, 64-76, 78, 96-107, 128-140, 142, 160-171, 192-204, 206, 224-235

Outputs—Addresses for ROM 376 (bottom)

1—46, 110, 174, 238
2—44, 108, 172, 236
4—12, 76, 140, 204
5—14, 78, 142, 206
A—0-11, 32-43, 64-75, 96-107, 128-139, 160-171, 192-203

Outputs—Addresses for ROM 454

5—255
9—13-24
B—25-27
D—0-12, 248-254
E—217

Outputs—Addresses for ROM 1600

3—2, 6, 10, 14, 18, 22, 26, 30, 34, 38, 42, 46, 50, 54, 58, 62, 67, 71, 75, 79, 83, 87, 91, 95, 99, 103, 107, 111, 115, 119, 123, 127, 130, 134, 138, 142, 146, 150, 154, 158, 162, 166, 170, 174, 178, 182, 186, 190, 195, 199, 203, 207, 211, 215, 219, 223, 227, 231, 235, 239, 243, 247, 251, 255

5—129, 131, 133, 135, 137, 139, 141, 143, 145, 147, 149, 151, 153, 155, 157, 159, 161, 163, 165, 167, 169, 171, 173, 175, 177, 179, 181, 183, 185, 187, 189, 191, 192, 194, 196, 198, 200, 202, 204, 206, 208, 210, 212, 214, 216, 218, 220, 222, 224, 226, 228, 230, 232, 234, 236, 238, 240, 242, 244, 246, 248, 250, 252, 254

7—3, 7, 11, 15, 19, 23, 27, 31, 35, 39, 43, 47, 51, 55, 59, 63, 66, 70, 74, 78, 82, 86, 90, 94, 98, 102, 106, 110, 114, 118, 122, 126

C—0, 4, 8, 12, 16, 20, 24, 28, 32, 36, 40, 44, 48, 52, 56, 60, 65, 69, 73, 77, 81, 85, 89, 93, 97, 101, 105, 109, 113, 117, 121, 125, 128, 132, 136, 140, 144, 148, 152, 156, 160, 164, 168, 172, 176, 180, 184, 188, 193, 197, 201, 205, 209, 213, 217, 221, 225, 229, 233, 237, 241, 245, 249, 253

D—1, 5, 9, 13, 17, 21, 25, 29, 33, 37, 41, 45, 49, 53, 57, 61, 64, 68, 72, 76, 80, 84, 88, 92, 96, 100, 104, 108, 112, 116, 120, 124

Outputs—Addresses for ROM 1816

2—1, 5, 9, 13, 17, 21, 25, 29, 33, 37, 41, 45, 49, 53, 57, 61, 64, 68, 72, 76, 80, 84, 88, 92, 96, 100, 104, 108, 112, 116, 120, 124, 128, 132, 136, 140, 144, 148, 152, 156, 160, 164, 168, 172, 176, 180, 184, 188, 193, 197, 201, 205, 209, 213, 217, 221, 225, 229, 233, 237, 241, 245, 249, 253

3—0, 4, 8, 12, 16, 20, 24, 28, 32, 36, 40, 44, 48, 52, 56, 60, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 192, 196, 200, 204, 208, 212, 216, 220, 224, 228, 232, 236, 240, 244, 248, 252

8—3, 7, 11, 15, 19, 23, 27, 31, 35, 39, 43, 47, 52, 56, 69, 73, 77, 81, 85, 93, 97, 101, 105, 109, 113, 117, 121, 125, 60, 130, 134, 138, 142, 146, 150, 154, 158, 162, 166, 170, 174, 65, 178, 182, 186, 190, 195, 199, 203, 207, 211, 215, 219, 223, 227, 231, 235, 239, 243, 247, 251, 255

C—2, 6, 10, 14, 18, 22, 26, 30, 34, 38, 42, 46, 50, 54, 58, 62, 67, 71, 75, 79, 83, 87, 91, 95, 99, 103, 107, 111, 115, 119, 123, 127, 131, 135, 139, 143, 147, 151, 155, 159, 163, 167, 171, 175, 179, 183, 187, 191, 194, 198, 202, 206, 210, 214, 218, 222, 226, 230, 234, 238, 242, 246, 250, 254

Outputs—Addresses for ROM 1612

7—48–71, 120–127
B—32–47, 104–119
D—16–31, 88–103
E—0–15, 72–87

Outputs—Addresses for ROM 1870

7—48–71, 120–127
B—32–47, 104–119
D—16–31, 88–103
E—0–15, 72–87

The specific electrical schematic diagrams also contain a large number of integrated circuits, and these integrated circuits where appropriate, include the model number in parentheses, utilizing model numbers from well known sources of such components. Where such model numbers are provided, the pin numbers are also shown adjacent thereto. For typical flip-flop circuits, monostable multivibrator circuits, AND gates, NAND gates, OR gates NOR gates, inverters and the like, such components are well known and for this reason, neither model numbers nor pin numbers for them have been provided.

From the foregoing detailed description, it should be understood that a recording and reproducing apparatus of superior design has been described and illustrated which offers many significant advantages over present commercial FM recording and reproducing systems. The use of digital data throughout the recording and reproducing processing provide extraordinarily reliable operation even at the significantly higher frequency at which the information is being clocked, recorded and reproduced. The system utilizes only two channels and operates at a clock rate of about 43 Mbits which is significantly faster than comparable FM recorders and represents a marked improvement in the state of the art. Furthermore, the apparatus has been described as arranged to employ quadruplex type record and reproduce apparatus. It should be appreciated that other types of record and reproduce apparatus can be employed as well. The characteristics of other record and reproduce apparatus may alter the timing and control of the signal processing circuitry because of the nature of the operation of such apparatus. However, the nature of and the manner of making such alterations will be readily apparent to those skilled in the art. Also, the apparatus has been described as arranged to receive and process analog color television signals. Should it be desired to employ the apparatus to process, record and reproduce other signals, such as digital data signals, component television signals and monochrome television signals, it would be necessary only to modify the input processing circuitry 32, the analog-to-digital converter 36 and clock generator and burst store circuitry 42, as well as the timing and control of the signal processing circuitry, to adapt the signal processing circuitry to the characteristics of the signals to be processed. In addition, those skilled in the art will appreciate that other forms of digital storage devices, for example, shift registers, can be utilized to perform the operations of the memories 60–66. While the apparatus has been described as arranged to record and reproduce color television signals at a rate less than real time, if the conservation of magnetic recording media is not in important consideration, the record and reproduce operations can be performed at the input data rate. However, by still discarding a portion of the horizontal blanking interval of each television line, or other periodic synchronization interval associated with other data signals, the time base correction feature is retained, although the apparatus is modified to record and reproduce at the input data rate.

It is of course understood that although preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. Apparatus for providing substitute digital data in a stream of current television digital data, said apparatus having an input for receiving said data stream of current television digital data and an output for providing one of either the current or substitute digital data, comprising:

means for storing said current data received at said input;

means for controlling said storing means to store current data therein in place of data that was received at said input and stored previous to said received current data, said controlling means being responsive to the occurrence of horizontal and vertical blanking intervals in the received current data and being responsive to an error signal indicating the current data is defective to inhibit storing of the received current data, said controlling means being responsive to said error signal for controlling said storing means to provide stored data at the output that represents video data at the same location within a line interval that occurred at least one multiple of 262 line intervals previous to said defective current data; and, switching means for providing said stored data at the output in response to receiving said error signal.

2. Apparatus as defined in claim 1 wherein said storing means comprises a random access memory means having a capacity sufficient to store data representing the video data portion of at least about 250 successive line intervals.

3. Apparatus as defined in claim 1 wherein said controlling means inhibits said storing means during at least about 17 line intervals of each of said vertical blanking intervals.

4. Apparatus as defined in claim 1 wherein said stream of digital data includes parity information associated therewith at least before said input, said apparatus including:

means for examining said parity information and generating said error signal in response to the detection of incorrect parity; and means for examining said stream of digital data and generating said error signal in response to the detection of a dropout of said stream.

5. Apparatus for providing substitute digital data in at least one stream of television data, said apparatus having an input for receiving new data and an output for providing one of said new data or substitute data, said apparatus comprising:

means for storing new data received at said input, said storing means having sufficient data storage capacity to store the video data portion of substantially a television field, said video data portion comprising all of said television field except that occurring during the horizontal and vertical blanking intervals;

means for controlling said storing means to write said new data therein in place of data that was received at said input and stored more than substantially one television field previous to the received new data, said controlling means being responsive to the occurance of either the horizontal and vertical blanking intervals or of an error signal indicating that said data is defective to inhibit writing of the received new data, said controlling means controlling said storing means to read stored data that represents video data substantially at the same location within a line as that of the new data received at said input, said read data occurring an even number of line intervals previously relative to the line interval in which the substitute data is inserted; and switching means for switching the substitute data read from said storing means into said data stream at the output in response to receiving said error signal.

6. Apparatus as defined in claim 5 wherein said substitute data occurs at the same relative location along the line interval at least one multiple of 262 line intervals previous to the line interval in which the substitute data is inserted.

7. Apparatus as defined in claim 5 wherein said storing means comprises a random access memory means having a capacity sufficient to store data representing the video data portion of at least about 250 line intervals.

8. Apparatus as defined in claim 5 wherein said controlling means inhibits said storing means during at least about 17 line intervals of each of said vertical blanking interval.

9. Apparatus for providing dropout compensation in a stream of television data when said data is defective, comprising:

means for storing data of at least the video data portion of a predetermined number of line intervals;

means for controlling said storing means to selectively write data therein and to read data therefrom, said controlling means being responsive to the occurrence of either an error signal indicating that said data is defective or the vertical and horizontal blanking intervals to inhibit the writing of data in said storing means;

switching means for selecting the data from said storing means for insertion into said data stream in response to said error signal.

10. Apparatus as defined in claim 9 wherein said predetermined number of line intervals is 262 line intervals.

11. Apparatus as defined in claim 9 wherein said storing means comprises a random access memory means having a capacity sufficient to store data representing the video data portion of at least about 250 line intervals.

12. Apparatus for compensating for defective data in a data stream of current television data, said apparatus receiving said television data at an input thereof and providing current data at the output thereof when said current television data is not defective and providing substitute data if said current television data is defective, comprising:

means for storing selected portions of said current television data received at an input thereof, said storing means having sufficient capacity to store and thereby subsequently provide stored data at an output thereof that occurred 262 line intervals previous to the current television data being received at said input;

means for controlling said storing means to alternately write the selected portions of received data into said storing means and read data therefrom, the data being read from said storing means having been written in said storing means at least one multiple of 262 line intervals previous to the current data being received at the input;

means for providing a predetermined delay of the current data and having an input that receives current data simultaneously with said storing means and an output, the duration of said delay being substantially equal to the time required to accomplish a writing and reading operation in said storing means;

switching means connected to the output of said delay means and said storing means for selecting the data from said storing means for inserting as substitute data in place of current data in said data stream in response to receiving a signal indicating that said current data is defective.

* * * * *